US012624478B2

(12) United States Patent
Yang et al.

(10) Patent No.: US 12,624,478 B2
(45) Date of Patent: May 12, 2026

(54) TENSILE JAMMING FIBERS

(71) Applicant: Yale University, New Haven, CT (US)

(72) Inventors: Bilige Yang, New Haven, CT (US);
Robert Baines, New Haven, CT (US);
Xiaonan Huang, New Haven, CT (US);
Rebecca Kramer-Bottiglio, New
Haven, CT (US); Dylan Shah, New
Haven, CT (US)

(73) Assignee: Yale University, New Haven, CT (US)

( * ) Notice: Subject to any disclaimer, the term of this
patent is extended or adjusted under 35
U.S.C. 154(b) by 29 days.

(21) Appl. No.: 18/691,687

(22) PCT Filed: Sep. 30, 2022

(86) PCT No.: PCT/US2022/077370
§ 371 (c)(1),
(2) Date: Mar. 13, 2024

(87) PCT Pub. No.: WO2023/056434
PCT Pub. Date: Apr. 6, 2023

(65) Prior Publication Data
US 2024/0392478 A1     Nov. 28, 2024

Related U.S. Application Data

(60) Provisional application No. 63/250,402, filed on Sep.
30, 2021.

(51) Int. Cl.
*D01F 8/14*          (2006.01)
*A41D 19/00*        (2006.01)
(Continued)

(52) U.S. Cl.
CPC ........... *D01F 8/14* (2013.01); *A41D 19/0024*
(2013.01); *D01D 5/42* (2013.01); *A41D
2500/50* (2013.01);
(Continued)

(58) Field of Classification Search
CPC ............................. B25J 15/12; B25J 15/0023
See application file for complete search history.

(56) References Cited

U.S. PATENT DOCUMENTS

2015/0351936 A1* 12/2015 Mosadegh ........... B25J 15/0023
623/64
2016/0252110 A1* 9/2016 Galloway ............... A61F 5/013
60/327

(Continued)

OTHER PUBLICATIONS

Brancadoro M, Manti M, Tognarelli S, Cianchetti M. Fiber Jam-
ming Transition as a Stiffening Mechanism for Soft Robotics. Soft
Robot. Dec. 2020;7(6):663-674. doi: 10.1089/soro.2019.0034. Epub
Apr. 6, 2020. PMID: 32250723. (Year: 2020).*
(Continued)

*Primary Examiner* — Larissa Rowe Emrich
(74) *Attorney, Agent, or Firm* — Riverside Law LLP

(57)          ABSTRACT

The present invention relates to fiber jamming systems
capable of tuning tensile stiffness of soft systems within
seconds without the use of high voltage or temperature
changes. The systems employ segmented fibrils of inter-
spersed segments of stretchable and non-stretchable mate-
rials. Applying a vacuum to the fibrils in an enclosed volume
elicits a large interfacial shear resistance to tensile displace-
ment. In the absence of a vacuum, the fibrils are free to
stretch and bend in any direction.

25 Claims, 25 Drawing Sheets

(51) Int. Cl.
  *B25J 15/00* (2006.01)
  *B25J 15/12* (2006.01)
  *D01D 5/42* (2006.01)
(52) U.S. Cl.
  CPC ............ *B25J 15/0023* (2013.01); *B25J 15/12*
    (2013.01); *D10B 2331/04* (2013.01); *D10B*
    *2331/30* (2013.01); *D10B 2401/061* (2013.01);
    *D10B 2401/062* (2013.01); *D10B 2501/041*
    (2013.01)

(56) References Cited

U.S. PATENT DOCUMENTS

2017/0341334 A1    11/2017  Corrigan
2019/0015233 A1*    1/2019  Galloway ................ B25J 15/12
2020/0170873 A1     6/2020  Walsh
2024/0117794 A1*    4/2024  Chellattoan ............. F03G 7/008

OTHER PUBLICATIONS

A. Firouzeh, M. Salerno and J. Paik, "Soft pneumatic actuator with adjustable stiffness layers for Multi-DoF Actuation," 2015 IEEE/RSJ International Conference on Intelligent Robots and Systems (IROS), Hamburg, Germany, 2015, pp. 1117-1124, doi: 10.1109/IROS.2015.7353510.

B. Aktaş and R. D. Howe, "Tunable Anisotropic Stiffness with Square Fiber Jamming," 2020 3rd IEEE International Conference on Soft Robotics (RoboSoft), New Haven, CT, USA, 2020, pp. 879-884, doi: 10.1109/RoboSoft48309.2020.9116030.

B. Shih et al., "Custom soft robotic gripper sensor skins for haptic object visualization," 2017 IEEE/RSJ International Conference on Intelligent Robots and Systems (IROS), Vancouver, BC, Canada, 2017, pp. 494-501, doi: 10.1109/IROS.2017.8202199.

Boley JW, van Rees WM, Lissandrello C, Horenstein MN, Truby RL, Kotikian A, Lewis JA, Mahadevan L. Shape-shifting structured lattices via multimaterial 4D printing. Proc Natl Acad Sci U S A. Oct. 15, 2019;116(42):20856-20862. doi: 10.1073/pnas.1908806116. Epub Oct. 2, 2019. PMID: 31578256; PMCID: PMC6800333.

Brackenbury J, "Fast locomotion in caterpillars"; Journal of insect physiology. Jun. 1, 1999;45(6):525-33.

Brancadoro M, Manti M, Tognarelli S, Cianchetti M. Fiber Jamming Transition as a Stiffening Mechanism for Soft Robotics. Soft Robot. Dec. 2020;7(6):663-674. doi: 10.1089/soro.2019.0034. Epub Apr. 6, 2020. PMID: 32250723.

Brancadoro Margherita , Manti Mariangela, Grani Fabrizio , Tognarelli Selene , Menciassi Arianna , Cianchetti Matteo; "Toward a Variable Stiffness Surgical Manipulator Based on Fiber Jamming Transition"; Frontiers in Robotics and AI, vol. 6—2019, 2019; https://www.frontiersin.org/journals/robotics-and-ai/articles/10.3389/frobt.2019.00012; 10.3389/frobt.2019.00012.

Brancadoro, M., Manti, M., Tognarelli, S., and Cianchetti, M. (2018). "Preliminary experimental study on variable stiffness structures based on fiber jamming for soft robots," in 2018 IEEE International Conference on Soft Robotics (RoboSoft) (Livorno: IEEE).

Chapman G, "The Hydrostatic Skeleton in the Invertebrates"; Biological reviews. Aug. 1958;33(3):338-71.

Cianchetti, Matteo, et al.; Soft Robotics Technologies to Address Shortcomings in Today's Minimally Invasive Surgery: The STIFF-FLOP Approach 2014; Soft Robotics; 122-131; 10.1089/soro.2014.0001.

Connolly F, Walsh CJ, Bertoldi K. Automatic design of fiber-reinforced soft actuators for trajectory matching. Proc Natl Acad Sci U S A. Jan. 3, 2017;114(1):51-56. doi: 10.1073/pnas.1615140114. Epub Dec. 19, 2016. PMID: 27994133; PMCID: PMC5224361.

D. S. Shah, E. J. Yang, M. C. Yuen, E. C. Huang, R. Kramer-Bottiglio, Jamming Skins that Control System Rigidity from the Surface. Adv. Funct. Mater. 2021, 31, 2006915. https://doi.org/10.1002/adfm.202006915.

D. S. Shah, M. C. Yuen, L. G. Tilton, E. J. Yang and R. Kramer-Bottiglio, "Morphing Robots Using Robotic Skins That Sculpt Clay," in IEEE Robotics and Automation Letters, vol. 4, No. 2, pp. 2204-2211, Apr. 2019, doi: 10.1109/LRA.2019.2902019.

D. Shah, B. Yang, S. Kriegman, M. Levin, J. Bongard, R. Kramer-Bottiglio, Shape Changing Robots: Bioinspiration, Simulation, and Physical Realization. Adv. Mater. 2021, 33, 2002882. https://doi.org/10.1002/adma.202002882.

Deimel R, Brock O. A novel type of compliant and underactuated robotic hand for dexterous grasping. The International Journal of Robotics Research. 2016;35(1-3):161-185. doi:10.1177/0278364915592961.

E. Brown,N. Rodenberg,J. Amend,A. Mozeika,E. Steltz,M.R. Zakin,H. Lipson, & H.M. Jaeger, Universal robotic gripper based on the jamming of granular material, Proc. Natl. Acad. Sci. U.S.A. 107 (44) 18809-18814, https://doi.org/10.1073/pnas.1003250107 (2010).

E. Hawkes and B. An and N. M. Benbernou and H. Tanaka and S. Kim and E. D. Demaine and D. Rus and R. J. Wood , Programmable matter by folding, Proceedings of the National Academy of Sciences, 107, 28, 12441-12445, 2010, 10.1073/pnas.0914069107.

Efrati E et al., "Buckling transition and boundary layer in non-Euclidean plates"; Physical Review E. Jul. 10, 2009;80(1):016602.

Efrati E et al., "Elastic theory of unconstrained non-Euclidean plates" Journal of the Mechanics and Physics of Solids. Apr. 1, 2009;57(4):762-75.

Fitzgerald, S.G.; Delaney, G.W.; Howard, D. A Review of Jamming Actuation in Soft Robotics. Actuators 2020, 9, 104. https://doi.org/10.3390/act9040104.

Gladman AS, Matsumoto EA, Nuzzo RG, Mahadevan L, Lewis JA. Biomimetic 4D printing. Nat Mater. Apr. 2016;15(4):413-8. doi: 10.1038/nmat4544. Epub Jan. 25, 2016. PMID: 26808461.

Hinchet, Ronan & Shea, Herbert. (2019). High Force Density Textile Electrostatic Clutch. Advanced Materials Technologies. 5. 1900895. 10.1002/admt.201900895.

I. Choi, N. Corson, L. Peiros, E. W. Hawkes, S. Keller and S. Follmer, "A Soft, Controllable, High Force Density Linear Brake Utilizing Layer Jamming," in IEEE Robotics and Automation Letters, vol. 3, No. 1, pp. 450-457, Jan. 2018, doi: 10.1109/LRA.2017.2761938.

J. K. Lee, N. Stoffel and K. Fite, "Electronic packaging of sensors for lower limb prosthetics," 2012 IEEE 62nd Electronic Components and Technology Conference, San Diego, CA, USA, 2012, pp. 86-91, doi: 10.1109/ECTC.2012.6248811.

J. Zhou, J. Yi, X. Chen, Z. Liu and Z. Wang, "BCL-13: A 13-DOF Soft Robotic Hand for Dexterous Grasping and In-Hand Manipulation," in IEEE Robotics and Automation Letters, vol. 3, No. 4, pp. 3379-3386, Oct. 2018, doi: 10.1109/LRA.2018.2851360.

Jadhav S et al., "Variable Stiffness Devices Using Fiber Jamming for Application in Soft Robotics and Wearable Haptics"; Soft Robotics. Feb. 2022.

Jiang, A., Ranzani, T., Gerboni, G., Lekstutyte, L., Althoefer, K., Dasgupta, P., & Nanayakkara, T. (2014). Robotic Granular Jamming: Does the Membrane Matter? Soft Robotics, 1(3), 192-201. https://doi.org/10.1089/soro.2014.0002.

John Brackenbury, 1997. "Caterpillar kinematics," Nature, Nature, vol. 390(6659), pp. 453-453, December.

Junius Santoso et al; "Single chamber multiple degree-of-freedom soft pneumatic actuator enabled by adjustable stiffness layers"; 2019 Smart Mater. Struct. 28 035012.

K. C. Galloway, P. Polygerinos, C. J. Walsh and R. J. Wood, "Mechanically programmable bend radius for fiber-reinforced soft actuators," 2013 16th International Conference on Advanced Robotics (ICAR), Montevideo, Uruguay, 2013, pp. 1-6, doi: 10.1109/ICAR.2013.6766586.

K. Suzumori, S. Iikura and H. Tanaka, "Applying a flexible microactuator to robotic mechanisms," in IEEE Control Systems Magazine, vol. 12, No. 1, pp. 21-27, Feb. 1992, doi: 10.1109/37.120448.

Kier, W.M. and Smith, K.K. (1985) Tongues, tentacles and trunks: The biomechanics of movement in muscular-hydrostats. Zoological Journal of the Linnean Society 83: 307-324.

(56)        References Cited

OTHER PUBLICATIONS

Kim, S.Y., Baines, R., Booth, J. et al. Reconfigurable soft body trajectories using unidirectionally stretchable composite laminae. Nat Commun 10, 3464 (2019). https://doi.org/10.1038/s41467-019-11294-7.

Kriegman S et al., "Automated shapeshifting for function recovery in damaged robots", arXiv preprint arXiv:1905.09264. May 22, 2019.

Lee DY et al., "Origami Wheel Transformer: A Variable-Diameter Wheel Drive Robot Using an Origami Structure"; Soft robotics. Jun. 1, 2017;4(2):163-80.

Lin HT et al., "GoQBot: a caterpillar-inspired soft-bodied rolling robot"; Bioinspiration & biomimetics. Apr. 26, 2011;6(2):026007.

Liu K et al., "Robotic surfaces with reversible, spatiotemporal control for shape morphing and object manipulation"; Science Robotics. Apr. 7, 2021;6(53).

Liyu Wang, Yang Yang, Yonghua Chen, Carmel Majidi, Fumiya Iida, Erin Askounis, Qibing Pei; Controllable and reversible tuning of material rigidity for robot applications, Materials Today, vol. 21, Issue 5, 2018, pp. 563-576, ISSN 1369-7021, https://doi.org/10.1016/j.mattod.2017.10.010.

M. Ishida, D. Drotman, B. Shih, M. Hermes, M. Luhar and M. T. Tolley, "Morphing Structure for Changing Hydrodynamic Characteristics of a Soft Underwater Walking Robot," in IEEE Robotics and Automation Letters, vol. 4, No. 4, pp. 4163-4169, Oct. 2019, doi: 10.1109/LRA.2019.2931263.

M. Manti, V. Cacucciolo and M. Cianchetti, "Stiffening in Soft Robotics: A Review of the State of the Art," in IEEE Robotics & Automation Magazine, vol. 23, No. 3, pp. 93-106, Sep. 2016, doi: 10.1109/MRA.2016.2582718.

Martinez RV, Branch JL, Fish CR, Jin L, Shepherd RF, Nunes RM, Suo Z, Whitesides GM. Robotic tentacles with three-dimensional mobility based on flexible elastomers. Adv Mater. Jan. 11, 2013;25(2):205-12. doi: 10.1002/adma.201203002. Epub Sep. 7, 2012. PMID: 22961655.

Matthew A. Robertson, Jamie Paik ,New soft robots really suck: Vacuum-powered systems empower diverse capabilities.Sci. Robot. 2, eaan6357(2017). DOI:10.1126/scirobotics.aan6357.

McEvoy MA, Correll N. Thermoplastic variable stiffness composites with embedded, networked sensing, actuation, and control. Journal of Composite Materials. 2014;49(15):1799-1808. doi:10.1177/0021998314525982.

N. G. Cheng et al., "Design and Analysis of a Robust, Low-cost, Highly Articulated manipulator enabled by jamming of granular media," 2012 IEEE International Conference on Robotics and Automation, Saint Paul, MN, USA, 2012, pp. 4328-4333, doi: 10.1109/ICRA.2012.6225373.

Nguyen CT et al., "Multiple-degrees-of-freedom dielectric elastomer actuators for soft printable hexapod robot"; Sensors and Actuators A: Physical. Nov. 1, 2017;267:505-16.

Nikolaos Vasios, Yashraj Narang, Buse Aktaş, Robert Howe, Katia Bertoldi,; Numerical analysis of periodic laminar and fibrous media undergoing a jamming transition,; European Journal of Mechanics—A/Solids, vol. 75, 2019, pp. 322-329, ISSN 0997-7538, https://doi.org/10.1016/j.euromechsol.2019.02.002.

Pezzulla M et al., "Geometry and mechanics of thin growing bilayers"; Soft matter. 2016;12(19):4435-42.

R. Xie, M. Su, Y. Zhang and Y. Guan, "3D-PSA: a 3D Pneumatic Soft Actuator with Extending and Omnidirectional Bending Motion," 2018 IEEE International Conference on Robotics and Biomimetics (ROBIO), Kuala Lumpur, Malaysia, 2018, pp. 618-623, doi: 10.1109/ROBIO.2018.8665051.

Ranzani T et al., "A bioinspired soft manipulator for minimally invasive surgery"; Bioinspiration & biomimetics. May 13, 2015;10(3):035008.

Reyssat E, Mahadevan L. Hygromorphs: from pine cones to biomimetic bilayers. J R Soc Interface. Oct. 6, 2009;6(39):951-7. doi: 10.1098/rsif.2009.0184. Epub Jul. 1, 2009. PMID: 19570796; PMCID: PMC2838359.

Runciman M, Darzi A, Mylonas GP. Soft Robotics in Minimally Invasive Surgery. Soft Robot. Aug. 2019;6(4):423-443. doi: 10.1089/soro.2018.0136. Epub Mar. 28, 2019. PMID: 30920355; PMCID: PMC6690729.

S. Diller, C. Majidi and S. H. Collins, "A lightweight, low-power electroadhesive clutch and spring for exoskeleton actuation," 2016 IEEE International Conference on Robotics and Automation (ICRA), Stockholm, Sweden, 2016, pp. 682-689, doi: 10.1109/ICRA.2016.7487194.

S. Rich, S. H. Jang, Y. L. Park, C. Majidi, Adv. Mater. Technol. 2017, 2, 1700179. https://doi.org/10.1002/admt.201700179.

S. Tadokoro, S. Yamagami, M. Ozawa, T. Kimura, T. Takamori and K. Oguro, "Soft micromanipulation device with multiple degrees of freedom consisting of high polymer gel actuators," Technical Digest. IEEE International MEMS 99 Conference. Twelfth IEEE International Conference on Micro Electro Mechanical Systems (Cat. No. 99CH36291), Orlando, FL, USA, 1999, pp. 37-42, doi: 10.1109/MEMSYS.1999.746748.

S. Timoshenko, "Analysis of Bi-Metal Thermostats," J. Opt. Soc. Am. 11, 233-255 (1925) https://opg.optica.org/josa/abstract.cfm?URI=josa-11-3-233.

Shah, D.S., Powers, J.P., Tilton, L.G. et al. A soft robot that adapts to environments through shape change. Nat Mach Intell 3, 51-59 (2021). https://doi.org/10.1038/s42256-020-00263-1.

Shahaf Armon et al. , Geometry and Mechanics in the Opening of Chiral Seed Pods. Science333, 1726-1730(2011). DOI:10.1126/science.1203874.

Steltz E et al., "Jamming as an enabling technology for soft robotics", Electroactive Polymer Actuators and Devices (EAPAD) Apr. 9, 2010 (vol. 7642, p. 764225.

Sumbre G et al., "Octopuses Use a Human-like Strategy to Control Precise Point-to-Point Arm Movements"; Current Biology. Apr. 18, 2006;16(8):767-72.

Sumbre G, Fiorito G, Flash T, Hochner B. Neurobiology: motor control of flexible octopus arms. Nature. Feb. 10, 2005;433(7026):595-6. doi: 10.1038/433595a. PMID: 15703737.

T. L. Buckner, M. C. Yuen, S. Y. Kim, R. Kramer-Bottiglio, Enhanced Variable Stiffness and Variable Stretchability Enabled by Phase-Changing Particulate Additives. Adv. Funct. Mater. 2019, 29, 1903368. https://doi.org/10.1002/adfm.201903368.

Tonazzini, A., Mintchev, S., Schubert, B., Mazzolai, B., Shintake, J. and Floreano, D. (2016), Variable Stiffness Fiber with Self-Healing Capability. Adv. Mater., 28: 10142-10148. https://doi.org/10.1002/adma.201602580.

W. H. Choi, S. Kim, D. Lee and D. Shin, "Soft, Multi-DoF, Variable Stiffness Mechanism Using Layer Jamming for Wearable Robots," in IEEE Robotics and Automation Letters, vol. 4, No. 3, pp. 2539-2546, Jul. 2019, doi: 10.1109/LRA.2019.2908493.

W.M. van Rees, E. Vouga, & L. Mahadevan, Growth patterns for shape-shifting elastic bilayers, Proc. Natl. Acad. Sci. U.S.A. 114 (44) 11597-11602, https://doi.org/10.1073/pnas.1709025114 (2017).

Wang, X., Wu, L., Fang, B., Xu, X., Huang, H. and Sun, F. (2020), Layer jamming-based soft robotic hand with variable stiffness for compliant and effective grasping. Cogn. Comput. Syst., 2: 44-49. https://doi.org/10.1049/ccs.2020.0003.

Y.-J. Kim, S. Cheng, S. Kim and K. Iagnemma, "A Novel Layer Jamming Mechanism With Tunable Stiffness Capability for Minimally Invasive Surgery," in IEEE Transactions on Robotics, vol. 29, No. 4, pp. 1031-1042, Aug. 2013, doi: 10.1109/TRO.2013.2256313. keywords: {Jamming; Manipulators;Electron tubes;Rubber;Minimally invasive surgery;Layer jamming;minimally invasive surgery (MIS);snake-like manipulator;tunable stiffness}.

Y. S. Narang, J. J. Vlassak, R. D. Howe, "Mechanically Versatile Soft Machines through Laminar Jamming"; Adv. Funct. Mater. 2018, 28, 1707136. httpVasios N et al., European Journal of Mechanics-A/Solids. May 1, 2019;75:322-9ps://doi.org/10.1002/adfm.201707136.

Y. Sun, Y. S. Song and J. Paik, "Characterization of silicone rubber based soft pneumatic actuators," 2013 IEEE/RSJ International Conference on Intelligent Robots and Systems, Tokyo, Japan, 2013, pp. 4446-4453, doi: 10.1109/IROS.2013.6696995.

(56)        References Cited

OTHER PUBLICATIONS

Yael Klein et al. ,Shaping of Elastic Sheets by Prescription of Non-Euclidean Metrics.Science315,1116-1120(2007). DOI:10.1126/science.1135994.
Yahya Elsayed, Augusto Vincensi, Constantina Lekakou, Tao Geng, C. M. Saaj, Tommaso Ranzani, Matteo Cianchetti, and Arianna Menciassi; Finite Element Analysis and Design Optimization of a Pneumatically Actuating Silicone Module for Robotic Surgery Applications; Soft Robotics 2014 1:4, 255-262.
Yang Y et al., "Hybrid Jamming for Bioinspired Soft Robotic Fingers"; Soft robotics. Jun. 1, 2020;7(3):292-308.

* cited by examiner

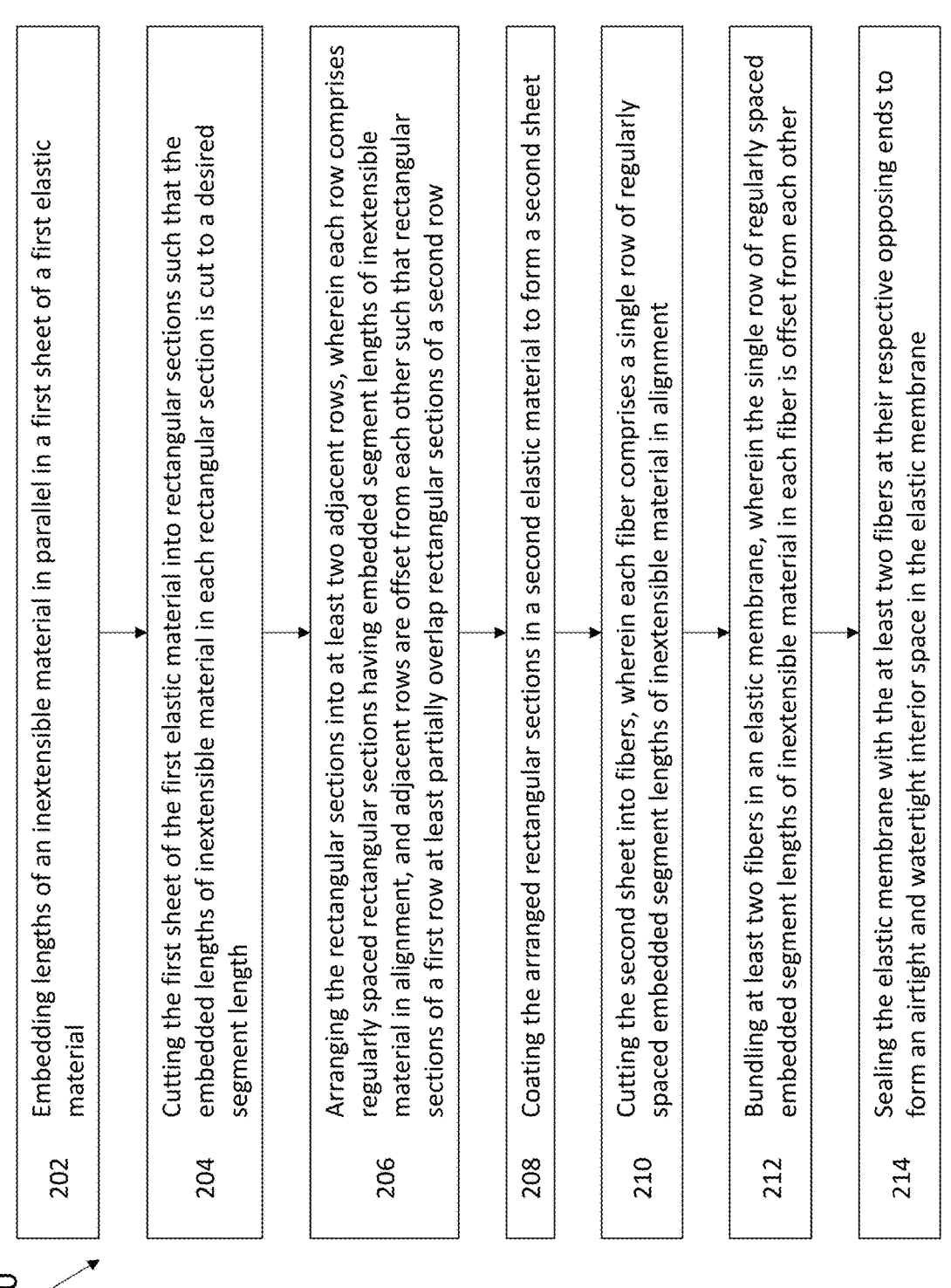

200

202    Embedding lengths of an inextensible material in parallel in a first sheet of a first elastic material 204    Cutting the first sheet of the first elastic material into rectangular sections such that the embedded lengths of inextensible material in each rectangular section is cut to a desired segment length 206    Arranging the rectangular sections into at least two adjacent rows, wherein each row comprises regularly spaced rectangular sections having embedded segment lengths of inextensible material in alignment, and adjacent rows are offset from each other such that rectangular sections of a first row at least partially overlap rectangular sections of a second row 208    Coating the arranged rectangular sections in a second elastic material to form a second sheet 210    Cutting the second sheet into fibers, wherein each fiber comprises a single row of regularly spaced embedded segment lengths of inextensible material in alignment 212    Bundling at least two fibers in an elastic membrane, wherein the single row of regularly spaced embedded segment lengths of inextensible material in each fiber is offset from each other 214    Sealing the elastic membrane with the at least two fibers at their respective opposing ends to form an airtight and watertight interior space in the elastic membrane

Fig. 3

Unjammed
Jammed extension bowl arch saddle

Fabricate polyester-silicone composite

Wind fiber          Apply elastomer          Cut into sheet          Laser-cut into patches Fabricate segmented elastic fibers (SEFs)

Type A
Type B
Type A

Arrange patches          Coat with silicone          Cut into fibers

Combine into jamming bundle

Bond at ends

Bundle the fibers          Coat silicone          Lay on guide blocks          Seal membrane, trim excess

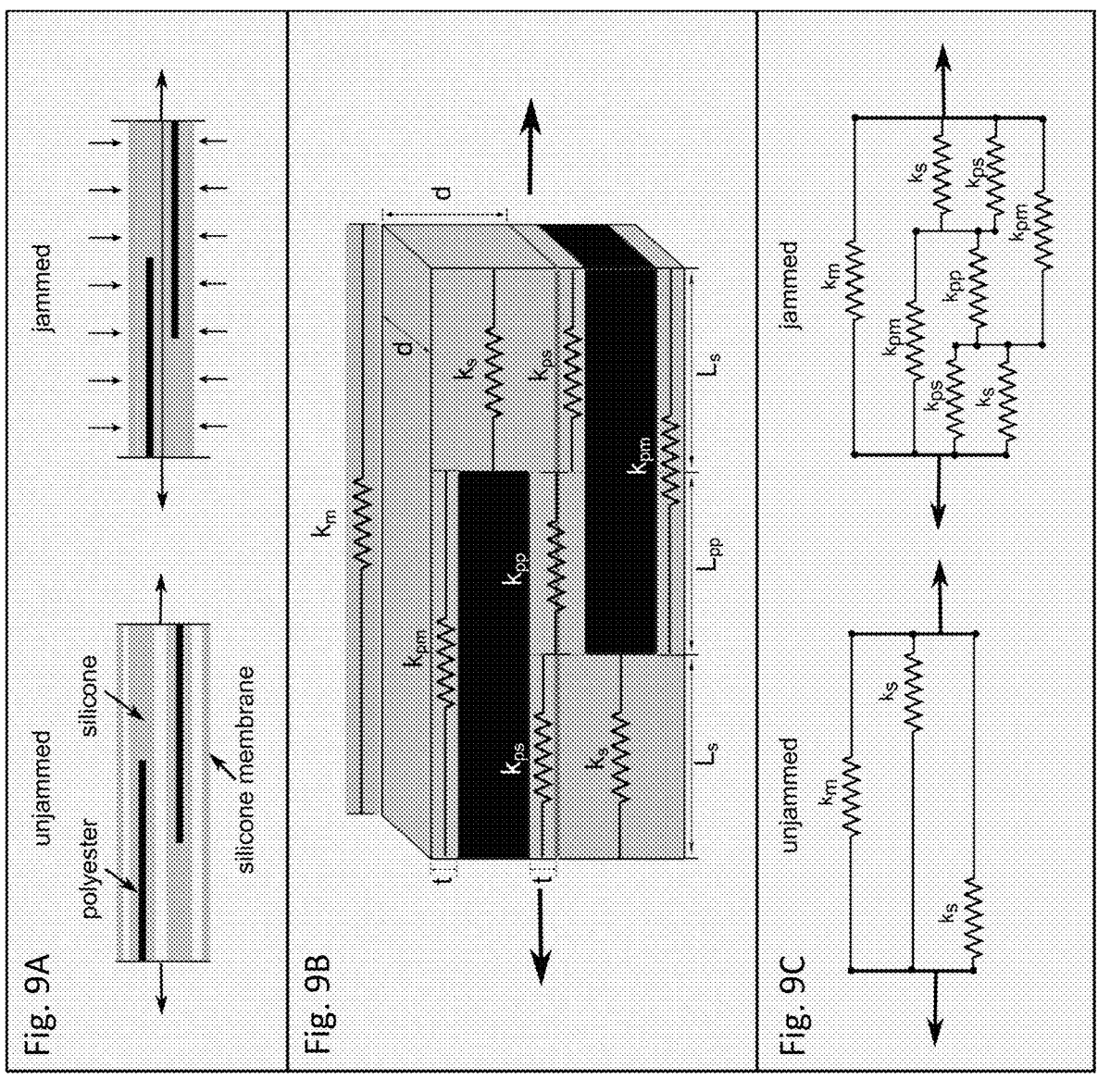

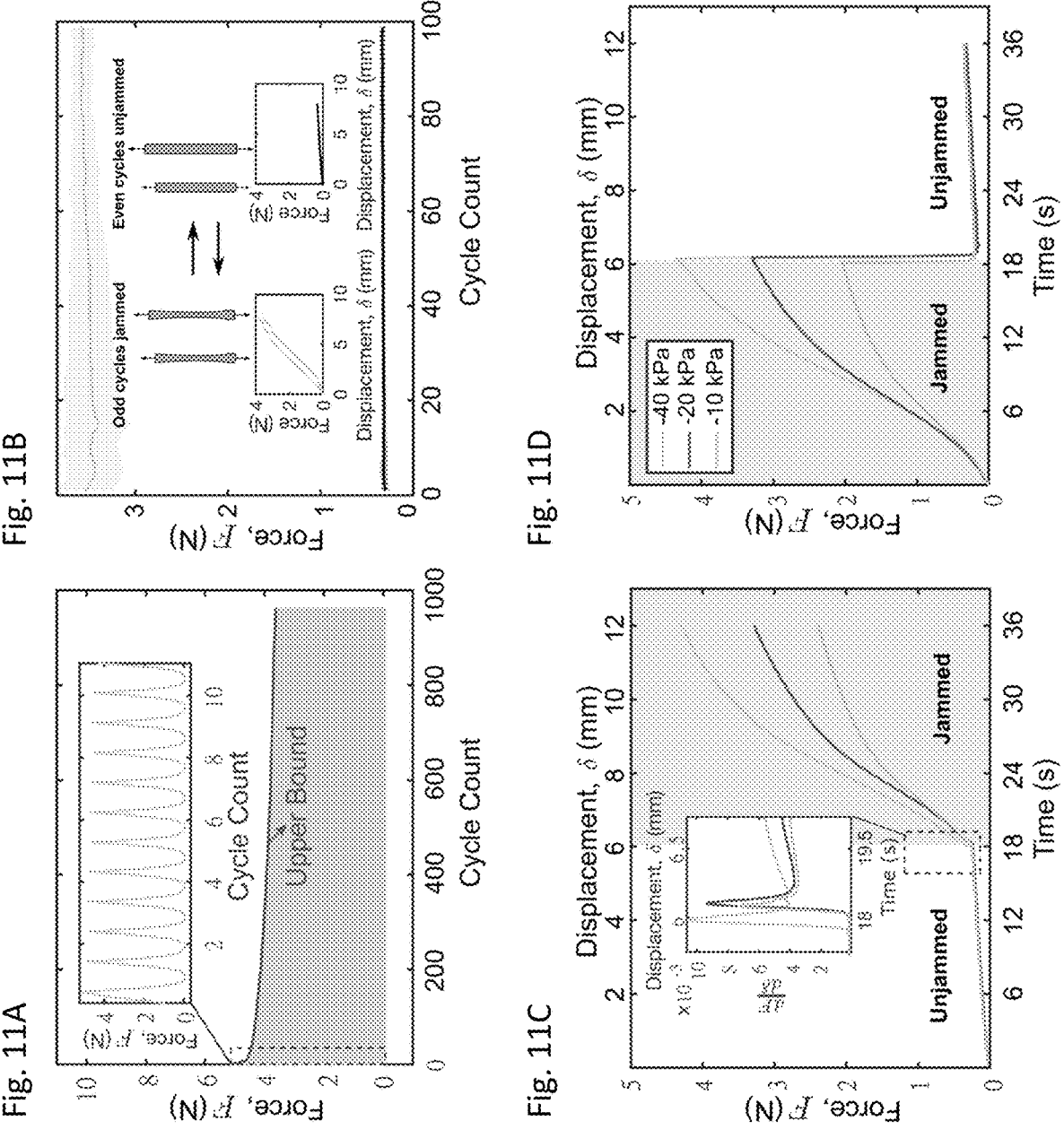

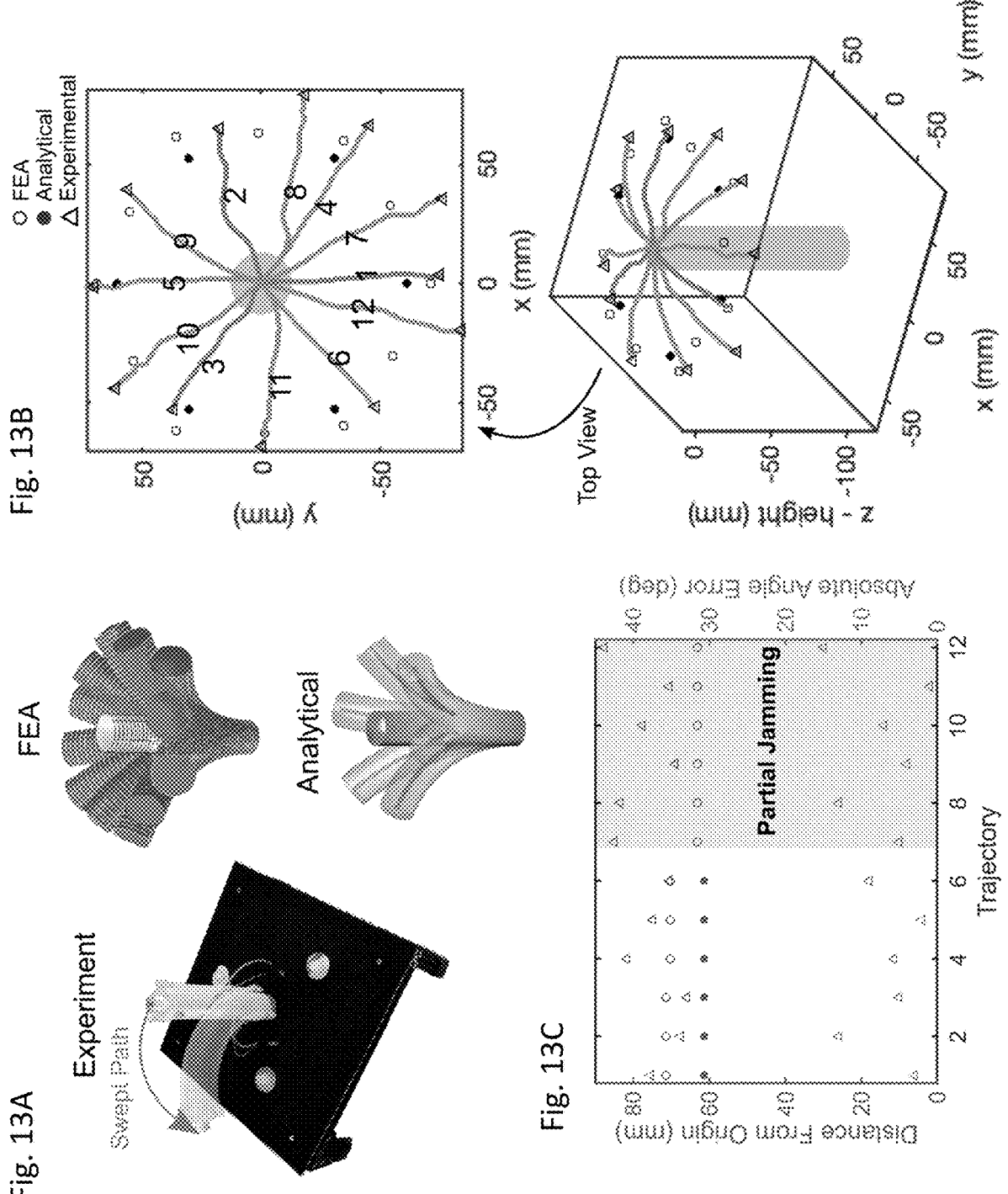

| Configuration | $(x,y,z)_{feet}$ (mm) |
|---|---|
| 1 | (0.04, -71.06, -6.77) |
| 2 | (61.52, 35.56, -6.77) |
| 3 | (-61.56, 35.46, -6.77) |
| 4 | (59.84, -34.37, -13.15) |
| 5 | (-0.15, 69.01, -13.15) |
| 6 | (-59.68, -34.64, -13.15) |
| 7 | (32.68, -53.88, -3.96) |
| 8 | (63.01, 1.36, -3.96) |
| 9 | (30.32, 55.24, -3.96) |
| 10 | (-32.68, 53.88, -3.96) |
| 11 | (-63.01, -1.36, -3.96) |
| 12 | (-30.32, -55.24, -3.96) |
| 13 | (15.20, -63.98, -3.95) |
| 14 | (63.01, -18.83, -3.95) |
| 15 | (47.81, 45.15, -3.95) |
| 16 | (-15.20, 63.98, -3.95) |
| 17 | (-63.01, 18.83, -3.95) |
| 18 | (-47.81, -45.15, -3.95) |
| 19 | (45.15, -47.81, -3.95) |
| 20 | (63.98, 15.2, -3.95) |
| 21 | (18.83, 63.01, -3.95) |
| 22 | (-45.15, 47.81, -3.95) |
| 23 | (-63.98, -15.2, -3.95) |
| 24 | (-18.83, -63.01, -3.95) |

—— Single fiber Jammed

—— Two fibers Jammed

≡ Fibers with differential pressures

Three-finger gripper

Modular actuator

Two-segment arm

Unjammed
Jammed

Pinching-Grasp    Outward-Hook    Inhand-Twist

| | | Pressure, $P$ (kPa) | | | |
| --- | --- | --- | --- | --- | --- |
| | | 0 | -10 | -20 | -40 |
| $\gamma = 60\%$ | N4 | 0.0145 | 0.0332 | 0.0577 | 0.0987 |
| | N6 | 0.022 | 0.089 | 0.1054 | 0.1387 |
| | N8 | 0.035 | 0.248 | 0.302 | 0.387 |
| | N10 | 0.046 | 0.3 | 0.46 | 0.514 |
| $\gamma = 70\%$ | N4 | 0.0226 | 0.20 | 0.2915 | 0.369 |
| | N6 | 0.034 | 0.2287 | 0.4122 | 0.5879 |
| | N8 | 0.035 | 0.27 | 0.568 | 0.783 |
| | N10 | 0.047 | 0.32 | 0.61 | 0.846 |

Fig. 19

Jamming Model Parameters

| Parameter | Description | Value | Source |
|---|---|---|---|
| $E$ | Young's modulus of EcoFlex 30 silicone | 82 kPa | data sheet |
| $\nu$ | Poisson's ratio | 0.5 | data sheet |
| $L$ | Length of fibril | 120 mm | measured |
| $t_0$ | Initial thickness of silicone interface | 1 mm | measured |
| $A_c$ | Cross-sectional area of fibril | 1 mm$^2$ | measured |
| $A_m$ | Cross-sectional area of membrane | 25 mm$^2$ | measured |
| $A_{pp}$ | Area between polyester and polyester | 48 mm$^2$ | measured |
| $A_{ps}$ | Area between polyester and silicone spring | 48 mm$^2$ | measured |
| $A_{pm}$ | Area between polyester and membrane | 72 mm$^2$ | measured |
| $\alpha$ | Effective contact ratio | 0.15 | fitted |
| $e$ | Shear area ratio | 0.1 | fitted |
| $\mu$ | Coefficient of friction | 1.52 | fitted |

TENSILE JAMMING FIBERS

CROSS-REFERENCE TO RELATED APPLICATIONS

This application is a U.S. national phase application filed under 35 U.S.C. § 371 claiming benefit to International Patent Application No. PCT/US2022/077370, filed Sep. 30, 2022, which is entitled to priority of U.S. provisional application No. 63/250,402 filed on Sep. 30, 2021, the contents of which are each incorporated by reference herein in their entirety.

STATEMENT REGARDING FEDERALLY SPONSORED RESEARCH OR DEVELOPMENT

This invention was made with government support under Grant Nos. 1830870 and 1333468 awarded by the National Science Foundation. The government has certain rights in the invention.

BACKGROUND OF THE INVENTION

Biological organisms are able to adjust their anatomical structures, stiffness, and behaviors to accommodate a variety of tasks and environmental demands (Shah D et al., Advanced Materials. 2021 May, 33 (19): 2002882). Octopus tentacles, for example, can access nearly infinite trajectories, yet also form joint-like structures to adapt articulated limb control strategies for precise point-to-point movements (Sumbre G et al., Nature. 2005 February; 433 (7026): 595-6; Sumbre G et al., Current Biology. 2006 Apr. 18; 16 (8): 767-72). Caterpillars undulate and engage in inchworm gaits but can rapidly curl into a wheel form and propel themselves away from predators (Brackenbury J, Nature. 1997 December; 390 (6659): 453; Brackenbury J, Journal of insect physiology. 1999 Jun. 1; 45 (6): 525-33). Rapid reconfiguration capabilities make a body versatile; they are a hallmark of biological systems that thrive in the natural, unstructured world. Yet these capabilities have long eluded conventional robots, which are limited by rigid structures and discrete joints.

To extend reconfiguration capabilities to artificial systems, researchers have leveraged continuously deformable materials to create soft robot bodies and actuators. Commonly, multiple actuators are patterned into a soft robot body, and a subset of those actuators is activated to achieve a desired body configuration (Tadokoro S et al., Twelfth IEEE International Conference on Micro Electro Mechanical Systems (Cat. No. 99CH36291) 1999 Jan. 21 (pp. 37-42); Hawkes E et al., Proceedings of the National Academy of Sciences. 2010 Jul. 13; 107 (28): 12441-5; Nguyen C T et al., Sensors and Actuators A: Physical. 2017 Nov. 1; 267:505-16; Zhou J et al., IEEE Robotics and Automation Letters. 2018 Jun. 28; 3 (4): 3379-86; Shah D S et al., IEEE Robotics and Automation Letters. 2019 Feb. 27; 4 (2): 2204-11). For example, several works have presented 3-degree-of-freedom (DOF) actuator modules containing three pneumatic actuators evenly spaced in a cylindrical configuration (Suzumori K et al., IEEE Control systems magazine. 1992 February; 12 (1): 21-7; Shih B et al., 2017 IEEE/RSJ international conference on intelligent robots and systems (IROS) 2017 Sep. 24 (pp. 494-501); Robertson M A et al., Science Robotics. 2017 Aug. 30; 2 (9); Martinez R V et al., Advanced materials. 2013 Jan. 11; 25 (2): 205-12; Xie R et al., 2018 IEEE International Conference on Robotics and Biomimetics (ROBIO) 2018 Dec. 12 (pp. 618-623)). These pneumatic multi-actuator systems are capable of bending in various directions, yet multiple chambers take up significant radial space and make miniaturizing such systems difficult for applications like minimally invasive surgery, where a smaller outer diameter is desired (Elsayed Y et al., Soft Robotics. 2014 Dec. 1; 1 (4): 255-62; Runciman M et al., Soft robotics. 2019 Aug. 1; 6 (4): 423-43).

As an alternative to multi-chamber actuators, a single volumetrically expanding soft body can achieve controlled and complex motion when coupled with thin strain-limiting components (like woven meshes or fibers) that bias deformation in a programmed way (Galloway K C et al., 2013 16th International Conference on Advanced Robotics (ICAR) 2013 Nov. 25 (pp. 1-6); Sun Y et al., 2013 IEEE/RSJ International Conference on Intelligent Robots and Systems 2013 Nov. 3 (pp. 4446-4453); Deimel R et al., The International Journal of Robotics Research. 2016 January; 35 (1-3): 161-85; Connolly F et al., Proceedings of the National Academy of Sciences. 2017 Jan. 3; 114 (1): 51-6). Several recent studies have attempted to create inflatable soft actuators with re-programmable strain-limiting layers, thereby enabling a single actuator to attain multiple trajectories by controlling material properties at the actuator surface. One approach employed reconfigurable tensile strain-limiting adhesive patches that can be manually repositioned over the soft body to direct inflation (Kim S Y et al., Nature communications. 2019 Aug. 1; 10 (1): 1-8). Other approaches relied on thermally-responsive materials, such as low-melting point-alloy (LMPA) particulate composites (Buckner T L et al., Advanced Functional Materials. 2019 December; 29 (50): 1903368; Tonazzini A et al., Advanced Materials. 2016 December; 28 (46): 10142-8) and shape memory polymer (SMP) (Firouzeh A et al., 2015 IEEE/RSJ International Conference on Intelligent Robots and Systems (IROS) 2015 Sep. 28 (pp. 1117-1124); Santoso J et al., Smart Materials and Structures. 2019 Feb. 1; 28 (3): 035012) that change stiffness upon heating, to influence the trajectory of pneumatic actuators. Although thermally activated variable-stiffness mechanisms are disposed to large modulus changes and require no human intervention, they often suffer from long response times (Wang L et al., Materials Today. 2018 Jun. 1; 21 (5): 563-76). Furthermore, when in the rigid, bulk state (Rich S et al., Advanced Materials Technologies. 2017 December; 2 (12): 1700179; McEvoy M A et al., Journal of Composite Materials. 2015 June; 49 (15): 1799-808), materials like LMPA and SMP compromise the deformation ability of soft systems because they have coupled tensile and bending stiffnesses. Electrostatic clutches can also modulate tensile stiffness (Diller S et al., 2016 IEEE International Conference on Robotics and Automation (ICRA) 2016 May 16 (pp. 682-689); Hinchet R et al., Advanced Materials Technologies. 2020 April; 5 (4): 1900895). However, these clutches require high voltages (>300V) to operate, posing risks for human-orientated applications, and the non-stretchable, two-dimensional components of the clutches limit their free bending in three-dimensions.

A growing body of work seeks to utilize jamming, the sudden change of modulus due to interactions of many constituent parts within a system, to achieve rapid stiffness change in soft robots (Steltz E et al., Electroactive Polymer Actuators and Devices (EAPAD) 2010 Apr. 9 (Vol. 7642, p. 764225) Manti M et al., IEEE Robotics & Automation Magazine. 2016 Sep. 13; 23 (3): 93-106; Fitzgerald S G et al., Actuators 2020 December (Vol. 9, No. 4, p. 104); Aktaş B et al., 2020 3rd IEEE International Conference on Soft Robotics (RoboSoft) 2020 May 15 (pp. 879-884)). Existing jamming technologies predominately trigger interactions between subcomponents by applying a vacuum to a sealed domain of material, inducing a compressive force that drives the material together. There are three established classes of jamming-granular jamming, layer jamming, and fiber jamming. Each class is associated with a different dimensionality and tunes stiffness along particular axes (FIG. 4D). Granular jamming tunes the compressive and bending stiffnesses of a consolidated volume of particles (Brown E et al., Proceedings of the National Academy of Sciences. 2010 Nov. 2; 107 (44): 18809-14; Cheng N G et al., 2012 IEEE international conference on robotics and automation 2012 May 14 (pp. 4328-4333); Cianchetti M et al., Soft robotics. 2014 Jun. 1; 1 (2): 122-31; Jiang A et al., Soft Robotics. 2014 Sep. 1; 1 (3): 192-201; Ranzani T et al., Bioinspiration & biomimetics. 2015 May 13; 10 (3): 035008). Vacuum-packed granules are unable to resist tensile force that exceeds the vacuum pressure, making granular jamming unsuitable for constraining tensile strain on an inflating actuator. Layer jamming tunes the bending stiffness of surfaces consisting of stacked, flexible sheets (Ou J et al., Proceedings of the 8th International Conference on Tangible, Embedded and Embodied Interaction 2014 Feb. 16 (pp. 65-72); Narang Y S et al., Advanced Functional Materials. 2018 April; 28 (17): 1707136; Vasios N et al., European Journal of Mechanics-A/Solids. 2019 May 1; 75:322-9). Traditional layer jamming does not have any degrees of freedom in-plane since the layers are stiff and homogeneously connected to all sides of the system. Layer jamming thus cannot be used to tune tensile stiffness from the surface. Fiber jamming changes the bending stiffness of 1D elements composed of flexible fibers (Brancadoro M et al., 2018 IEEE International Conference on Soft Robotics (RoboSoft) 2018 Apr. 24 (pp. 258-263); Brancadoro M et al., Frontiers in Robotics and AI. 2019 Mar. 19; 6:12; Brancadoro M et al., Soft robotics. 2020 Dec. 1; 7 (6): 663-74; Jadhav S et al., Soft Robotics. 2021 Feb. 10). Similar to layer jamming, fiber jamming designs in the literature have employed homogeneous, inextensible fibers connected to both ends of a system, and consequently cannot be used to modulate tensile stiffness. Moreover, current fiber jamming systems possess a relatively high bending stiffness (even in the unjammed state) due to the incorporation of stiff fibers. High bending stiffness impedes large deformations and creates an undesirable rigid interface. Although all three jamming systems have been integrated with actively actuating structures like soft inflating bodies, their applications have been primarily restricted to locking shape (Cheng N G et al., 2012 IEEE international conference on robotics and automation 2012 May 14 (pp. 4328-4333); Ranzani T et al., Bioinspiration & biomimetics. 2015 May 13; 10 (3): 035008; Brancadoro M et al., Frontiers in Robotics and AI. 2019 Mar. 19; 6:12; Kim Y J et al., IEEE Transactions on Robotics. 2013 Apr. 15; 29 (4): 1031-42) or varying bending angles (Narang Y S et al., Advanced Functional Materials. 2018 April; 28 (17): 1707136; Yang Y et al., Soft robotics. 2020 Jun. 1; 7 (3): 292-308; Wang X et al., Cognitive Computation and Systems. 2020 Jun. 11; 2 (2): 44-9). The inability to independently tune tensile stiffness impedes current jamming systems from actively regulating the surface strains of soft systems to shift shape.

A recent variant of layer jamming technology, which is also referred to as "stretchable layer jamming," allows the tuning of tensile stiffness (Choi I et al., IEEE Robotics and Automation Letters. 2017 Oct. 11; 3 (1): 450-7; Choi W H et al., IEEE Robotics and Automation Letters. 2019 Apr. 1; 4 (3): 2539-46; Shah D S et al., Advanced Functional Materials. 2021 January; 31 (1): 2006915). In this technology, individual layers are not connected to all sides of the device, enabling the layers to slide past each other when pulled. Stretchable layer jamming could potentially be applied to modulate moderate tensile strains (<40%), but at the cost of drastically increased bending stiffness (see FIG. 4D), which severely limits the achievable curvature if it is incorporated as a strain limiter. Stretchable layer jamming sheets also cannot bend in all directions in space—even if made into long, narrow sheets resembling a fiber, these sheets only bend easily along the axis with minimal second moment of area, and thus would constrain the potential deformations of the soft system.

Thus, there is a need in the art for improved jamming-based strain-limiting technologies capable of controlling tensile stiffness while retaining low bending stiffness in any direction. The present invention meets this need.

SUMMARY OF THE INVENTION

The present invention relates in part to a tensile jamming fiber, comprising: a length extending between a first end and a second end; at least a first and a second segmented elastic fibril, each extending between the first end and the second end and each comprising alternating segments of an elastic material and an inextensible material; and an elastic membrane enclosing the first and second segmented elastic fibrils in an interior space and forming an airtight and watertight housing; wherein the first and second segmented elastic fibrils are fused to the elastic membrane at the first end and the second end, and wherein segments of inextensible material in the first segmented elastic fibril partially overlap segments of inextensible material in the second segmented elastic fibril.

In one embodiment, the interior space of the elastic membrane is configured to support a vacuum. In one embodiment, the elastic membrane comprises one or more ports fluidly connected to the interior space.

In one embodiment, the fiber comprises an unjammed state wherein the interior space of the elastic membrane comprises a positive pressure. In one embodiment, the fiber comprises a jammed state wherein the interior space of the elastic membrane comprises a negative pressure, such that each of the segmented elastic fibrils are compressed together by the elastic membrane.

In one embodiment, the fiber in the unjammed state comprises an elasticity configured to permit stretching the length of the fiber by 200% or more. In one embodiment, the fiber in the jammed state comprises an elasticity configured to permit little to no stretching of the length of the fiber. In one embodiment, the fiber in the unjammed state comprises a first tensile stiffness that is lesser than a second tensile stiffness of the fiber in the jammed state. In one embodiment, the second tensile stiffness is about 20× greater or more than the first tensile stiffness. In one embodiment, the fiber in the unjammed state comprises a first bending stiffness that is substantially the same as a second bending stiffness of the fiber in the jammed state. In one embodiment, the fiber is configured to switch between the unjammed state and the jammed state within a tenth of a second.

In one embodiment, the elastic material and the elastic membrane each comprise a material selected from the group consisting of: silicone rubber, neoprene rubber, nitrile rubber, and latex rubber. In one embodiment, the inextensible material comprises a material selected from the group consisting of: polyester, nylon, acrylic, cotton, and carbon fiber. In one embodiment, each segmented elastic fibril comprises a percentage of inextensible material relative to elastic material, in terms of cross-sections and geometry, that is between about 60% and about 80%.

The present invention relates in part to a linear actuator device comprising a flexible cylindrical body and one or more fibers of the present invention attached thereto.

The present invention relates in part to a planar actuator device comprising a flexible planar body and one or more fibers of the present invention attached thereto.

The present invention relates in part to a method of fabricating a tensile jamming fiber, comprising the steps of: embedding lengths of an inextensible material in parallel in a first sheet of a first elastic material; cutting the first sheet of the first elastic material into rectangular sections such that the embedded lengths of inextensible material in each rectangular section is cut to a desired segment length; arranging the rectangular sections into at least two adjacent rows, wherein each row comprises regularly spaced rectangular sections having embedded segment lengths of inextensible material in alignment, and adjacent rows are offset from each other such that rectangular sections of a first row at least partially overlap rectangular sections of a second row; coating the arranged rectangular sections in a second elastic material to form a second sheet; cutting the second sheet into fibers, wherein each fiber comprises a single row of regularly spaced embedded segment lengths of inextensible material in alignment; bundling at least two fibers in an elastic membrane, wherein the single row of regularly spaced embedded segment lengths of inextensible material in each fiber is offset from each other; and sealing the elastic membrane with the at least two fibers at their respective opposing ends to form an airtight and watertight interior space in the elastic membrane.

In one embodiment, each rectangular section is cut to a uniform size. In one embodiment, the first elastic material, second elastic material, and elastic membrane each comprise a material selected from the group consisting of: silicone rubber, neoprene rubber, nitrile rubber, and latex rubber. In one embodiment, the inextensible material comprises a material selected from the group consisting of: polyester, nylon, acrylic, cotton, and carbon fiber.

The present invention relates in part to a wearable clothing item comprising a fabric material configured to cover at least a portion of a subject's body; a plurality of tensile jamming fibers as described above; a pressure source fluidly connected to the plurality of tensile jamming fibers; and a power source electrically connected to the pressure source.

In one embodiment the fabric material covers at least one joint of the subject's body. In one embodiment the fabric material forms a glove configured to fit on the subject's hand. In one embodiment, the wearable clothing item further comprises a computing device comprising at least one processor, wherein the computing device is communicatively connected to the pressure source and is configured to control the jamming and unjamming of each tensile jamming fiber. In one embodiment the computing device is communicatively connected to a virtual reality or augmented reality device.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

FIG. 3 depicts a flowchart of an exemplary method of fabricating tensile jamming fibers.

(FIG. 4A) Schematic of SEFs and jamming fiber. Only two SEFs shown inside the jamming fiber for clarity. Real system has 4 to 10 SEFs. (FIG. 4B) Jamming fiber with 8 SEFs inside is highly flexible (scale bar, 1 cm). Fibers are 12 cm long. Close-up images of SEFs and a single polyester-silicone interface (scale bars top: 900 μm and bottom: 500 μm). (FIG. 4C) Upon application of vacuum, SEFs agglomerate and overlapping polyester sections yield high shear strength through friction, increasing tensile stiffness of the fiber. At atmospheric pressure, SEFs in the fiber can individually stretch and slide over each other. With a mass of 200 g attached to its end, the unjammed fiber (atmospheric pressure) stretched to 88% strain, while the jammed fiber (−80 kPa) stretched to only 4% strain. Scale bar: 2 cm. (FIG. 4D) Stiffness change ratios of jamming systems. Tensile jamming fibers occupy the desired range: low bending stiffness change and large tensile stiffness change. (FIG. 4E) Radially-constrained pneumatic actuator with three jamming fibers around its perimeter. The actuator executes different trajectories depending on which fibers are jammed. (FIG. 4F) A pneumatic membrane with jamming fibers attached to the top and bottom orthotropically expands when fibers are unjammed (top-left). By jamming certain fibers, the membrane can attain shapes with zero (bottom-left), positive (top-right), and negative (bottom-right) Gaussian curvatures.

(FIG. 6A) Fabricate a polyester-silicone composite laminae introduced in previous work (Kim S Y et al., Nature communications. 2019 Aug. 1; 10 (1): 1-8). Wind polyester around a drum at 1 mm spacing, and apply an even coating of uncured silicone (DragonSkin 10 Medium, Smooth-On). Let the silicone cure while the drum is rotating to get even thickness. Then, cut the laminate material off from the drum, and laser-cut the laminae into smaller patches (size depending on the length of polyester thread needed in the SEF). (FIG. 6B) Fabricate SEFs. Arrange the patches on a flat surface according to the type of SEF, coat with silicone (EcoFlex 50, Smooth-On), let cure, and cut into fibrils of width 1 mm (and height about 0.6 mm). (FIG. 6C) Combine constituent fibrils into jamming fiber. Stack alternating type A and type B SEFs, align them at both ends, and bond them with Silpoxy to make an unsealed fiber. Then, coat uncured silicone onto a flat surface for the silicone membrane. Allow that silicone to cure, put the membrane on two slide-able guide blocks, put the unsealed fiber inside, close the guide blocks, seal membrane with Silpoxy, and attach tubing.

(FIG. 7A) Acrylic sheets were laser-cut and then glued together with adhesives into molds. Wet silicone was poured into acrylic molds and cured at room temperature. De-molded silicone layers were adhered using uncured silicone. Pneumatic tubing was inserted and sealed with silicone glue.
(FIG. 7B) CAD drawing of the top surface mold for pneumatic bladder.
(FIG. 7C) CAD draw-
ing of the bottom surface mold for pneumatic bladder.

(FIG. 8A) Tensile behav-
ior at selected jamming pressures for fibers with the param-
eters of 70% polyester length fraction and 8 SEFs (70% N8).
Each solid line represents the average behavior of three
specimens. Clouds indicate one standard deviation from the
mean. Dashed lines are predictions from the analytical
model.
(FIG. 8B) Ratio of jammed stiffness over unjammed
tensile stiffness as a function of vacuum pressure, for the
70% N8 specimens. Average of three specimens reported.
Bars represent one standard deviation above and below the
mean.
(FIG. 8C, FIG. 8D) 3-point bending of tensile jam-
ming fibers. When jammed (at vacuum pressure of −85 kPa),
the fiber is approximately 2× stiffer than when unjammed.
However, the magnitude of the forces it sustains when
deforming are still very low.
FIG. 8D is test conducted with
specimen rotated 90 degrees from FIG. 8C. Approximately
the same force values are reached, testifying to the fact that
the tensile jamming fiber has isotropic bending stiffness.
Confidence cloud shows standard deviation. Solid line indi-
cates the mean.

FIG. 9A through FIG. 9C depicts schematics of an ana-
lytical model of jamming. (FIG. 9A) schematic showing the
fiber behavior in the unjammed and jammed cases. Only two
fibrils are shown for simplicity. (FIG. 9B) A detailed draw-
ing of the geometry of two jammed fibrils and their inter-
face. Equivalent spring constants of different sections are
shown. (FIG. 9C) Spring model of the unjammed and
jammed cases of a two-fibril system.

(FIG. 10A) Mean curves with
standard deviation clouds for uniaxial tension tests of indi-
vidual fibrils. Inset shows the small displacement regime to
more clearly visualize the mechanical behavior of polyester
fibers.
(FIG. 10B) Elongation at failure of the various SEF
specimens. Bars indicate a standard deviation above and
below the mean of five samples.

FIG. 11A through FIG. 11D depict the cyclic and dynamic
behavior of jamming fibers. (FIG. 11A) Cyclic tensile test-
ing up to a displacement of 8 mm, while jammed at −40 kPa.
(FIG. 11B) Cyclic tensile testing up to a displacement of 8
mm, jammed at −40 kPa and unjammed for every other
cycle. Average of three specimens reported. Error clouds
represent one standard deviation from the mean. Top green
curve shows the jammed response and bottom black curve
shows the unjammed response. Insets show the force versus
displacement curve for the last two cycles (jammed and
unjammed). (FIG. 11C) Dynamic transition from unjammed
to jammed at displacement of 6 mm, during a tensile pull to
12 mm. Inset shows the derivative of force with regard to
displacement (instantaneous stiffness) plotted against time,
to display the rapid timescale of the stiffness response. (FIG.
11D) Dynamic transition from jammed to unjammed at
displacement of 6 mm, during a tensile pull to 12 mm.

(FIG. 12A) Dynamic transition from unjammed to
jammed at displacement of 6 mm, at various pressures. Data
from three samples at each pressure are plotted.
(FIG. 12B)
Dynamic transition from jammed to unjammed. Data from
three samples at each pressure are plotted.

FIG. 13A through FIG. 13C depict a modular variable-
trajectory actuator. (FIG. 13A) Experimental setup and
simulation visualizations. The FEA model generated 12
trajectories, including some configurations with two differ-
ent pressures and thus two sets of stiffness, as was done in the experiment. However, the analytical model could only
account for one stiffness, limiting it to prediction of six of
the tested trajectories. (FIG. 13B) Comparison of motion-
capture data for the actuator's end-effector and the predic-
tions from the analytical and FEA models. Trajectories were
labeled 1 through 12, corresponding to combinations of
jammed fibers. Trajectories 1-3 (blue) are achieved by
jamming a single fiber to P=40 kPa, 4-6 (red) by jamming
two adjacent fibers to P=40 kPa, and 7-12 (green) by
jamming two adjacent fibers at different pressures (P=10 kPa
and 40 kPa and vice versa). (FIG. 13C) Left axis and blue
markers show final resting distance of the end effector from
the origin. Right axis and orange markers show error
between the measured bending angle of the actuator (as
projected into the XY plane) and the angles expected from
an ideal subdivision of the plane into 12 equal parts.

(FIG. 16A) Schematics for the
modular actuators.
(FIG. 16B) Three grasping modes
enabled by fiber jamming. Top row depicts jamming states
of the three actuators. Middle row shows pictures from
grasping trials: pinching a Rubik's cube, hooking a metal
bowl, and twisting a lid. Bottom row shows the FEA
simulated prediction of actuator positions in the absence of
an object.
(FIG. 16C) Multi-modal two-segment arm. Left
column shows the final shapes the arm attained after jam-
ming different sets of fibers (scale bar, 4 cm). Right column
shows the simulated arm position prediction with FEA.

FIG. 17A through FIG. 18C depict a shape-changing
membrane enabled by tensile jamming fibers. A circular
planarly expanding actuator was made and equipped with
grids of jamming fibers. By jamming different sets of fibers,
this unit was able to manifest ranges of Gaussian curvatures.
FEA and analytical modeling were used to predict and
understand the effect of varied tensile stiffness on the 2D
actuator. (FIG. 17A) Top longitudinal fibers jammed to
create an arch (zero Gaussian curvature). (FIG. 17B) Top
longitudinal and latitudinal fibers jammed to create a bowl
(positive Gaussian curvature). (FIG. 17C) Top longitudinal
and bottom latitudinal fibers jammed to create a saddle
shape (negative Gaussian curvature). Scale bar, 4 cm.

FIG. 18A through FIG. 18C depict complex shapes gen-
erated by a large membrane with jamming fibers. A single
simulated large-scale membrane with patterned jamming
fibers (six circles on top and orthogonal localized fibers on
bottom) was able to morph to multiple distinct and complex
topologies. (FIG. 18A) A topology with arches around three
sides, saddles around three corners, and a central bowl,
formed by activating orthogonal fibers on the bottom and
fibers patterned in a three of the circles on top. (FIG. 18B)
A shallow dome, formed by jamming just the bottom
orthogonal fibers. (FIG. 18C) An even more complex topol-
ogy formed when jamming all fibers.

FIG. 19 is a table listing stiffness values at varying
pressures and polyester compositions of an exemplary ten-
sile jamming fiber.

(FIG. 20A) Jammed fiber stiffness at various design parameters, holding $\gamma$=60%. (FIG. 20B) The same parameter sweep holding $\gamma$=70%. Reported values for A and B are mean values of three samples at each design point. (FIG. 20C, FIG. S4D) Ratio of jammed to unjammed stiffness values, holding $\gamma$=60% or $\gamma$=70%.

FIG. 21 is a table listing parameters for an exemplary minimal jamming model.

DETAILED DESCRIPTION OF THE INVENTION

Figure 1:
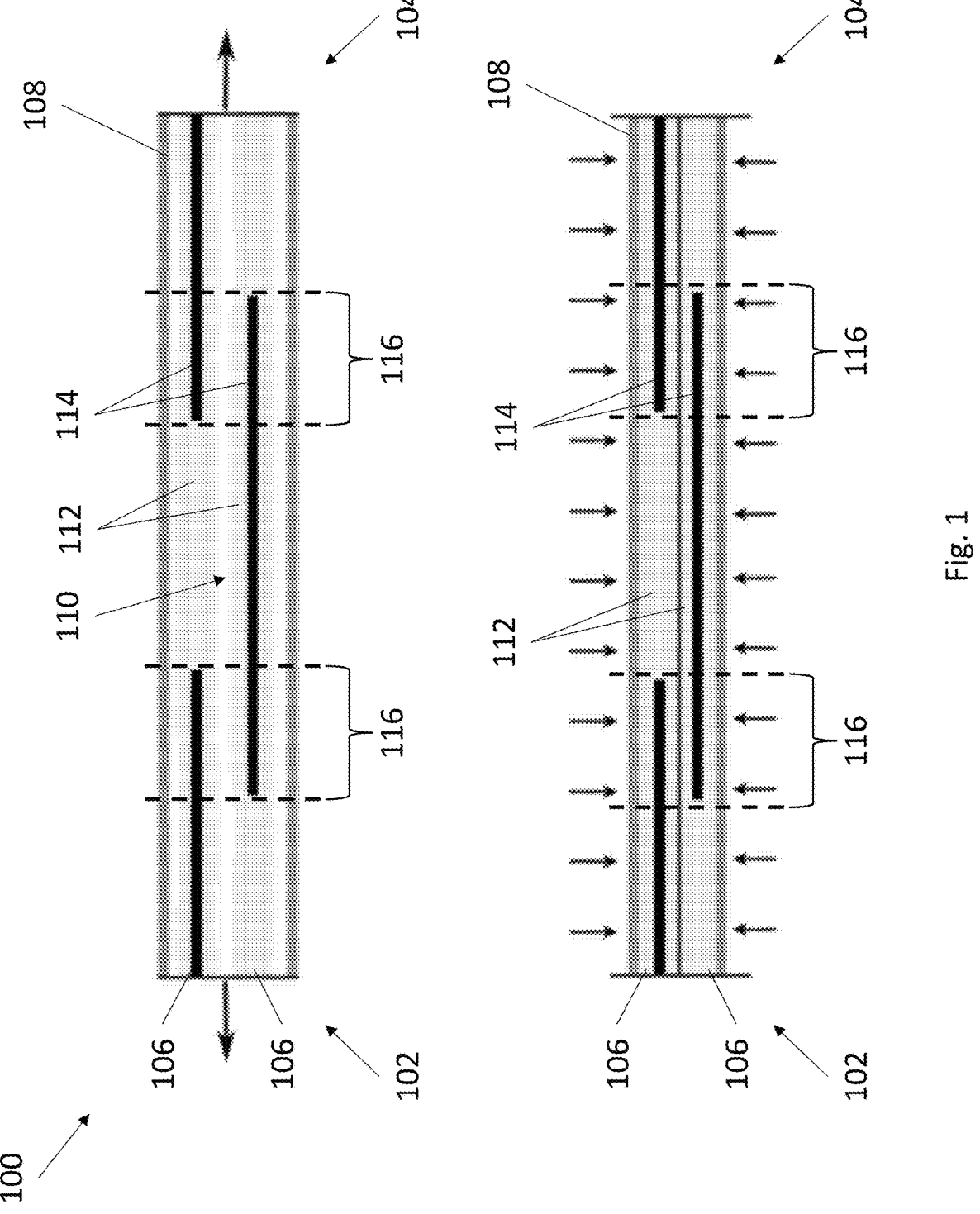
FIG. 1 depicts a schematic of an exemplary tensile jamming fiber in an unjammed state (top) and a jammed state (bottom)

The present invention relates to fiber jamming systems capable of tuning tensile stiffness of soft systems within seconds without the use of high voltage or temperature changes. The systems employ segmented fibrils of interspersed segments of stretchable and non-stretchable materials. Applying a vacuum to the fibrils in an enclosed volume elicits a large interfacial shear resistance to tensile displacement. In the absence of a vacuum, the fibrils are free to stretch and bend in any direction.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of +20%, +10%, +5%, +1%, and +0.1% from the specified value, as such variations are appropriate.

The terms "proximal," "distal," "anterior," "posterior," "medial," "lateral," "superior," and "inferior" are defined by their standard usage indicating a directional term of reference. For example, "proximal" refers to an upper location from a point of reference, while "distal" refers to a lower location from a point of reference. In another example, "anterior" refers to the front of a body or structure, while "posterior" refers to the rear of a body or structure. In another example, "medial" refers to the direction towards the midline of a body or structure, and "lateral" refers to the direction away from the midline of a body or structure. In some examples, "lateral" or "laterally" may refer to any sideways direction. In another example, "superior" refers to the top of a body or structure, while "inferior" refers to the bottom of a body or structure. It should be understood, however, that the directional term of reference may be interpreted within the context of a specific body or structure, such that a directional term referring to a location in the context of the reference body or structure may remain consistent as the orientation of the body or structure changes.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Tensile Jamming Fibers

The present invention relates to tensile jamming fibers as well as devices making use thereof. The tensile jamming fibers are configured to switch between jammed and unjammed states within a fraction of a second. Tensile jamming fibers in an unjammed state comprise a low tensile stiffness and a low bending stiffness. Tensile jamming fibers can be switched to a jammed state upon application of a vacuum or negative pressure and comprise a high tensile stiffness while maintaining a low bending stiffness.

Referring now to FIG. 1, a schematic of an exemplary tensile jamming fiber 100 is depicted. Tensile jamming fiber 100 extends for a length between a first end 102 and an opposing second end 104 and comprises two or more segmented elastic fibrils 106 enclosed by an elastic membrane 108, wherein the two or more segmented elastic fibrils 106 within membrane 108 may be referred to as a bundle of segmented elastic fibrils 106. Membrane 108 forms an airtight and watertight housing around a bundle of segmented elastic fibrils 106 to define an interior space fluidly connected to one or more ports (not pictured). The one or more ports are each connectable to a fluid pump or pressure source, wherein the fluid pump/pressure source is configured to provide a positive fluid pressure, a negative fluid pressure, or both. Any type of fluid/pressure source (e.g. a vacuum pump) understood by those skilled in the art may be used. Contemplated fluids include but are not limited to air, a gas, a liquid, and the like. By way of the fluid pump and the one or more ports, membrane 108 is configured to support, on demand, a negative fluid pressure forming a partial or total vacuum within its interior space as well as a neutral or positive fluid pressure within its interior space. In some embodiments, tensile jamming fiber 100 can further comprise a pressure transducer configured to measure an instant pressure within the interior space of membrane 108.

Each segmented elastic fibril 106 is fused to membrane 108 at first end 102 and second end 104 while lengths of each segmented elastic fibril 106 between first end 102 and second 104 remain separate from membrane 104 and adjacent segmented elastic fibrils 106 by spacing 110. It should be appreciated that spacing 110 is depicted merely to illustrate the separation between adjacent segmented elastic fibrils 106 and membrane 104. In some embodiments, a measurable spacing 110 is not necessary so long as the lengths of each segmented elastic fibril 106 between first end 102 and second 104 are able to move freely relative to adjacent segmented elastic fibrils 106 and membrane 108. Tensile jamming fibers 100 and elastic fibrils 106 therein may have any desired length. Elastic fibrils 106 may have any cross-sectional shape, including round, oval, square, rectangular, triangular, and the like. Likewise, each tensile jamming fiber 100 may have any cross-sectional shape, including round, oval, square, rectangular, triangular, and the like.

Each segmented elastic fibril 102 comprises alternating segments of an elastic material 112 and an inextensible material 114, such that segments of inextensible material 114 in a segmented elastic fibril 106 partially overlap segments of inextensible material 114 in at least one adjacent segmented elastic fibril 106. The regions of overlap between inextensible materials 114 are referred to hereinafter as interface regions 116. Overlapping of adjacent inextensible materials in interface regions 116 may be at least 1% of the total length of one or both elastic fibrils 106 forming the interface region 116. In other embodiments, the interface region 116 may be at least 2%, 3%, 4%, 5%, 10%, 15%, 20%, 30%, 40%, 50% or 60% of the total length of one or both elastic fibrils 106 forming the interface region 116. In some embodiments, the ratio of inextensible material 114 to extensible material 112 in any given elastic fibril 106 may be greater than 50%, greater than 55%, greater than or equal to 60%, greater than or equal to 65%, greater than or equal to 70%, greater than or equal to 75% or greater than or equal to 80%. In other embodiments, the ratio of inextensible material 114 to extensible material 112 in any given elastic fibril 106 is between 60-80%. Contemplated elastic materials 112 include but are not limited to silicone rubber, neoprene rubber, nitrile rubber, latex rubber, and the like. In some embodiments, membrane 108 is constructed from a similar elastic material. In some embodiments, membrane 108 is constructed from the same material as elastic material 112. Contemplated inextensible materials 114 include but are not limited to polyester, nylon, acrylic, cotton, carbon fiber, and the like. In some embodiments, inextensible material 114 is constructed from an elastic material having a higher tensile stiffness than elastic material 112. In some embodiments, segments of inextensible material 114 are embedded in a length of elastic material 112 to form a segmented elastic fibril 102. In some embodiments, a segmented elastic fibril 102 is formed from alternating segments of elastic material 112 and inextensible material 114 that are fused end to end. In some embodiments, a segmented elastic fibril 102 is formed from interwoven strands or fibers of elastic material 112 and inextensible material 114. In various embodiments, inextensible material 114 can be provided in the form of threads, strands, fibers, strips, cords, and the like.

Tensile jamming fiber 100 is depicted in FIG. 1 in an unjammed state (top) and a jammed state (bottom). In the unjammed state, tensile jamming fiber 100 comprises a low tensile stiffness and a low bending stiffness, wherein the interior space of membrane 108 comprises a positive pressure such that the lengths of each segmented elastic fibril 106 between first end 102 and second 104 are able to move freely relative to adjacent segmented elastic fibrils 106 and membrane 108. An unjammed tensile jamming fiber 100 is highly elastic and is configured to stretch to 200% of its original length or greater.

In the jammed state, tensile jamming fiber 100 comprises a high tensile stiffness while substantially maintaining a low bending stiffness, wherein the interior space of membrane 108 comprises a negative pressure such that membrane 108 compresses each segmented elastic fibril 106 against each other. In particular, interface regions 116 between overlapping segments of inextensible materials 114 generate a high shear force that resists tensile loads. In some embodiments, tensile jamming fiber 100 shortens in length in the jammed state. A jammed tensile jamming fiber 100 is highly inelastic and is configured to increase tensile stiffness to 20× of its unjammed tensile stiffness or greater. In some embodiments, a jammed tensile jamming fiber 100 is configured to increase bending stiffness to about 2× of its unjammed bending stiffness.

Each segmented elastic fibril 102 can be characterized by a loading fraction or a loading factor, wherein the loading fraction or factor is a percentage of a segmented elastic fibril 102 that comprises segments of inextensible material 114. Accordingly, a segmented elastic fibril 102 comprising a higher loading fraction or factor, and thereby a higher percentage of segments of inextensible material 114 and interface regions 116 of longer lengths, may have a higher tensile stiffness in an unjammed state and a higher tensile stiffness in a jammed state in comparison to a segmented elastic fibril 102 comprising a lower loading fraction or factor, and thereby a lower percentage of segments of inextensible material 114 and interface regions 116 of fewer lengths. In some embodiments, contemplated loading fractions or factors can be between about 5% and 95%, or about 50% and 90%, or about 70%.

Tensile jamming fiber 100 is configured to alternate between unjammed and jammed states by altering pressure within the interior space of membrane 108. As described above, fluid pumps connected to the one or more ports of membrane 108 enable rapid pressure changes to switch a tensile jamming fiber 100 between unjammed and jammed states within a fraction of a second, or at least within a tenth of a second. It should be understood that the manner in which a tensile jamming fiber 100 is switched between unjammed and jammed states may depend upon external environmental factors. For example, in environments where external pressure is low (e.g., shallow liquid depths, atmospheric pressure, and the like), tensile jamming fiber 100 may be in an unjammed state at rest and may be switched to a jammed state through the application of a negative pressure by fluid pumps connected to the one or more ports of membrane 108 and switched back to an unjammed state by releasing the negative pressure. In another example, in environments where external pressure is very high (e.g., deep ocean depths), tensile jamming fiber 100 may be in a jammed state at rest and may be switched to an unjammed state through the application of a positive pressure by fluid pumps connected to the one or more ports of membrane 108 and switched back to a jammed state by releasing the positive pressure.

In various embodiments, tensile jamming fiber 100 is configured to be switched between unjammed and jammed states under any tensile load. For example, an unjammed tensile jamming fiber 100 can comprise a first length at 0% strain and a second length at 100% strain or near 100% strain. Tensile jamming fiber 100 can be stretched to any length between the first length and the second length with a tensile load and can be jammed while under the tensile load to substantially fix the instant length of tensile jamming fiber 100.

In various embodiments, tensile jamming fiber 100 is configured to be switched to an intermediate state between unjammed and jammed states. For example, an unjammed tensile jamming fiber 100 having a zero or positive pressure within interior space of membrane 108 can comprise a minimum tensile stiffness and a jammed tensile jamming fiber 100 having a total or near total vacuum within interior space of membrane 108 can comprise a maximum tensile stiffness. In some embodiments, a negative pressure in interior space of membrane 108 is selected to tune a tensile stiffness of tensile jamming fiber 100 between the minimum tensile stiffness and the maximum tensile stiffness. In some embodiments, a negative pressure in interior space of membrane 108 is modulated over a period of time to vary a tensile stiffness of tensile jamming fiber 100.

In some embodiments, tensile jamming fibers 100 may include a system for controlling positive and negative pressures, or the inflow and outflow of air or other gas, into a plurality of tensile jamming fibers. For example, in certain embodiments the system may include a multiplexed arrangement of conduits in fluid communication with each tensile jamming fiber, and further may include one or more valves within the flow path to and from each tensile jamming fiber. Additionally, the system may include computing hardware and software programming/logic to control the output of each pressure source and/or the opening and closing of each valve in the system. In this manner, a plurality of tensile jamming fibers can be selectively jammed and unjammed in any combination with one or more pressure sources (e.g. vacuum pump). Accordingly, the system may include any sort of power source (battery or plug-in), microcontroller, microprocessor, computing device, or the like that is communicatively connected (wired or wirelessly) to each valves and each vacuum pump or other pressure source.

Tensile jamming fibers 100 are configured to be scalable to different sizes, both in diameter and length, and are configured to be adaptable to a variety of applications. For example, in some embodiments, tensile jamming fibers 100 may be attached to a harness or mechanical suit and function as artificial muscles, such that jammed tensile jamming fibers 100 may hold a position or hold a weight over prolonged periods of time without requiring input from a wearer or operator.

Figure 2:
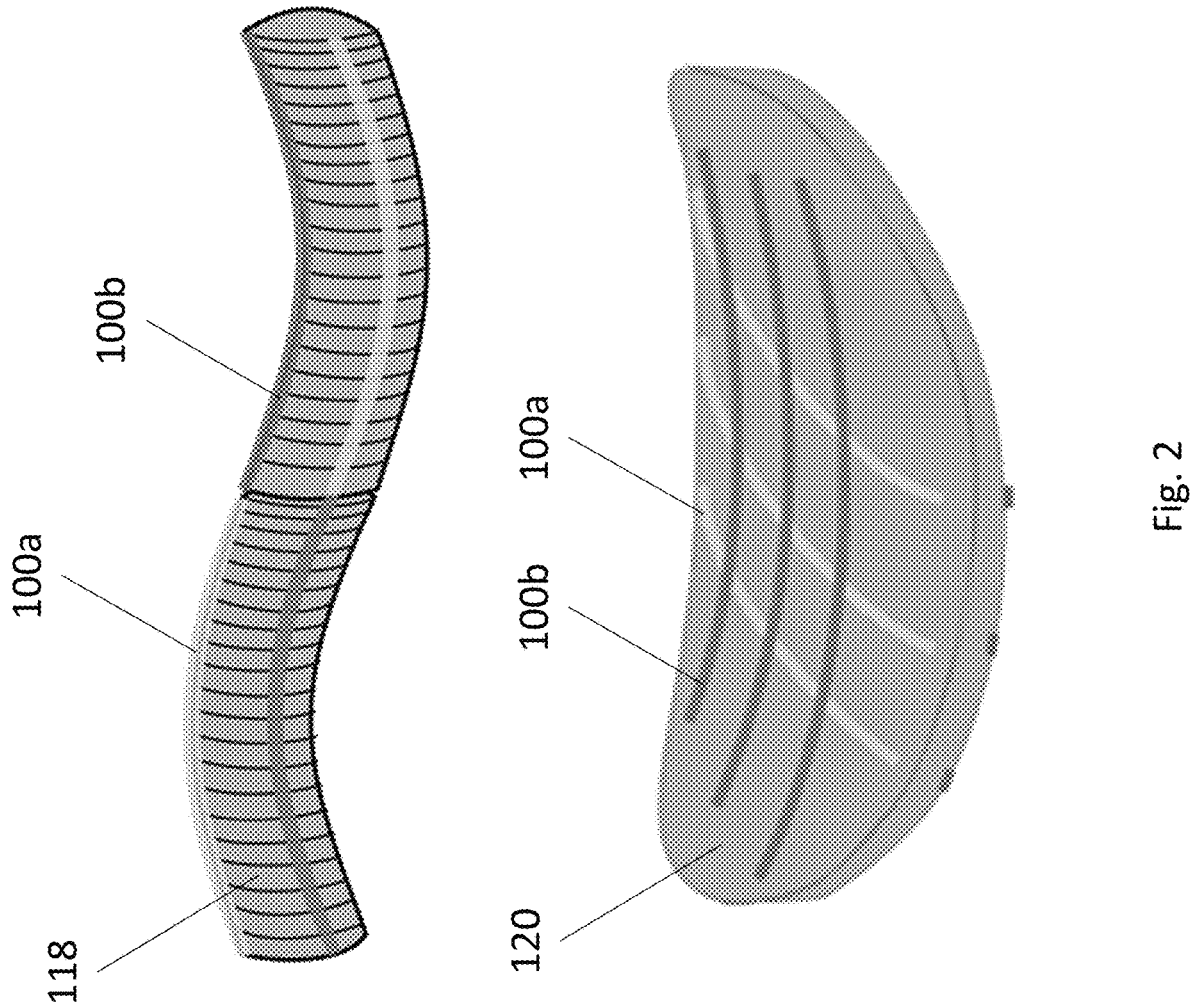
FIG. 2 depicts schematics of an exemplary linear actuator (top) and an exemplary planar actuator (bottom) employing tensile jamming fibers.

In some embodiments, tensile jamming fibers 100 may be attached to an actuator, such as in soft robotics. Referring now to FIG. 2, an exemplary linear actuator 118 and a planar actuator 120 are depicted. Tensile jamming fibers 100 may be positioned on or embedded in an actuator to influence movement, tensile stiffness, and the like. For example, the top image of FIG. 2 depicts two linear actuators 118 attached end to end, each linear actuator 118 having a cylindrical structure with a plurality of tensile jamming fibers 100 attached to their exterior surfaces in parallel alignment with a longitudinal axis of each linear actuator 118. Selectively jamming tensile jamming fibers 100b and unjamming tensile jamming fibers 100a can influence an alignment or shape of linear actuator 118. Alignment and shape can be further adjusted by modulating a degree of jamming in any tensile jamming fiber, inflating or deflating linear actuator 118, and combinations thereof. Contemplated linear actuator 118 applications include but are not limited to robotic mobility, graspers, manipulators, positioning and steering actuators, and the like. For example, linear actuators 118 may be scaled to fit within a catheter or to an endoscope and navigate patient anatomy or direct and position surgical tools. In another example, the bottom image of FIG. 2 depicts a planar actuator having a plurality of tensile jamming fibers 100 attached to a top surface and a bottom surface in cross hatch patterns. Selectively jamming tensile fibers 100b and unjamming tensile jamming fibers 100a can influence a shape of planar actuator 120 into a saddle shape (shown), bowl shape, arch shape, and the like. It should be understood that contemplated actuators are not limited to the depicted shapes and forms, and tensile jamming fibers 100 may be attached therein or thereto in any position and in any pattern.

Tensile jamming fibers 100 may overlay, be integrated into, or otherwise layered with any sort of rigid, flexible and/or expandable or retractable surface or material. For example, such surfaces or materials may include but are not limited to natural or synthetic textiles, metal, glass, plastic, wood, composite materials, solid materials, or the like. In certain embodiments, tensile jamming fibers may be applied to fabrics and wearable as clothing, such as gloves, sleeves, shirts, pants, suits, socks, hats, elastic bands or the like. Microplexing conduit systems, one or more pressure sources (e.g. micropumps), power sources, microprocessors, controllers, computing equipment and any processing software or logic may additionally be integrated into the surfaces or materials, including wearable fabrics, as needed. Tensile jamming fibers may also be used as connectors between surfaces or objects. For example, the tensile jamming fibers may function as an extensible cord between two objects, where the distance between the two connected objects is shorter when the fibers are jammed, and larger when the fibers are unjammed. Likewise, in a jammed state, the fibers can be more highly resistive to forces pulling two connected objects away from each other, as opposed to an unjammed state.

As contemplated herein, the tensile jamming fibers and systems of the present invention may be used in various different applications without limitation. For example, tensile jamming fibers may be used in conjunction with virtual or augmented reality platforms. In such embodiments, a computing device incorporated into the wearable item may be communicatively connected to a separate virtual reality or augmented reality device and programming, such that the virtual reality or augmented reality device can instruct the computing device of the wearable item to initiate the jamming and unjamming of selected tensile jamming fibers in the fabric. In certain embodiments, the fibers may be incorporated into wearable fabrics and other items to provide resistance in human joints, and/or to provide haptic forces, sensations or feedback while a person or subject is wearing the gear. In some embodiments, the controlled pattern of jamming and unjamming fibers may create force feedback in users joints via changing stiffness of a garment, or whatever piece of equipment the tensile fibers are integrated with. In other embodiments, the tensile jamming fibers may be integrated into gloves to generate kinaesthetic communication or simulated three-dimensional touch sensations via the pattern of jamming and unjamming fibers within the glove. In other embodiments, the present invention may also be incorporated into medical devices, such as inclusion into steering mechanisms for catheters, probes and other insertion instruments for minimally invasive procedures. For example, having one tensile jamming fibers around the circumference or perimeter of the distal end of a catheter, cannula or guide wire may allow precise angulation in any desired direction by pulling a portion of the distal end via fiber jamming. In still other embodiments, the present invention may be incorporated into the end effector of a robotic arm, wherein the various movements of the end effector are generated by a pattern of jamming and unjamming one or more tensile jamming fibers.

In some embodiments, a wearable clothing item comprises a fabric material configured to cover at least a portion of a subject's body, a plurality of tensile jamming fibers as described herein, a pressure source fluidly connected to the plurality of tensile jamming fibers, and a power source electrically connected to the pressure source. In one embodiment the fabric material covers at least one joint of the subject's body. In one embodiment the fabric material forms a glove configured to fit on the subject's hand. In one embodiment, the wearable clothing item further comprises a computing device comprising at least one processor, wherein the computing device is communicatively connected to the pressure source and is configured to control the jamming and unjamming of each tensile jamming fiber. In one embodiment the computing device is communicatively connected to a virtual reality or augmented reality device.

Methods of Fabrication

The present invention relates in part to methods of fabricating tensile jamming fibers. As described elsewhere herein, tensile jamming fibers comprise two or more segmented elastic fibrils encased in an airtight and watertight membrane, wherein the two or more segmented elastic fibrils comprise alternating elastic and inelastic segments arranged such that inelastic segments of adjacent segmented elastic fibrils at least partially overlap.

Referring now to FIG. 3, an exemplary method 200 of fabricating a tensile jamming fiber is depicted. Method 200 begins with step 202, wherein lengths of an inextensible material are embedded in parallel in a first sheet of a first elastic material. In step 204, the first sheet of the first elastic material is cut into rectangular sections, such hat the embedded lengths of inextensible material in each rectangular section is cut to a desired segment length. In step 206, the rectangular sections are arranged into at least two adjacent rows, wherein each row comprises regularly spaced rectangular sections having embedded segment lengths of inextensible material in alignment, and adjacent rows are offset from each other such that rectangular sections of a first row at least partially overlap rectangular sections of a second row. The partial overlap between rectangular sections of each row may define the interface region between adjacent segmented elastic fibers in the resultant tensile jamming fiber. In some embodiments, each rectangular section is cut to a uniform size to facilitate the arrangement step. In step 208, the arranged rectangular sections are coated in a second elastic material to form a second sheet. In various embodiments, the first and second elastic material can be the same or different material. In step 210, the second sheet is cut into fibers, wherein each fiber comprises a single row of regularly spaced embedded segment lengths of inextensible material in alignment. In step 212, at least two fibers are bundled in an elastic membrane, wherein the single row of regularly spaced embedded segment lengths of inextensible material in each fiber is offset from each other. In various embodiments, the elastic membrane can be fabricated from the same or different material as the first and second elastic material. In step 214, the elastic membrane is sealed with the at least two fibers at their respective opposing ends to form an airtight and watertight interior space in the elastic membrane. In other embodiments, all of, or portions of, the tensile jamming fibers may be 3D printed. It should be appreciated that the present invention is not limited by any particular method of manufacture. Any elastic or inextensible component, sheathing or sleeve material of the tensile jamming fibers as described herein may be composed of any materials described herein and further may include polypropylene fibers, polyethylene, nylon, microfiber, polyester, acrylic, or the like. Furthermore, monofilament and multifilament fibrils may be used to compose the tensile fibers. While monofilament fibers contain a single solid filaments and contain a diameter range of 100-2000 μm, multifilament fibers contain several threads twisted or braided together making their diameter quite larger; multifilament fibers may optionally be coated or encapsulated in coating and encapsulation materials as would be understood by those skilled in the art.

It should be appreciated that methods of fabricating tensile jamming fibers are not limited to the method steps described above. For example, coating steps may also be accomplished through casting, molding, stamping, and the like. In various embodiments, further postprocessing steps are contemplated, including but not limited to trimming excess material, adding ports to the elastic membrane, attaching the tensile jamming fibers to an actuator, and the like.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Example 1: Reprogrammable Soft Actuation and Shape-Shifting Via Tensile Jamming

Figure 4A:
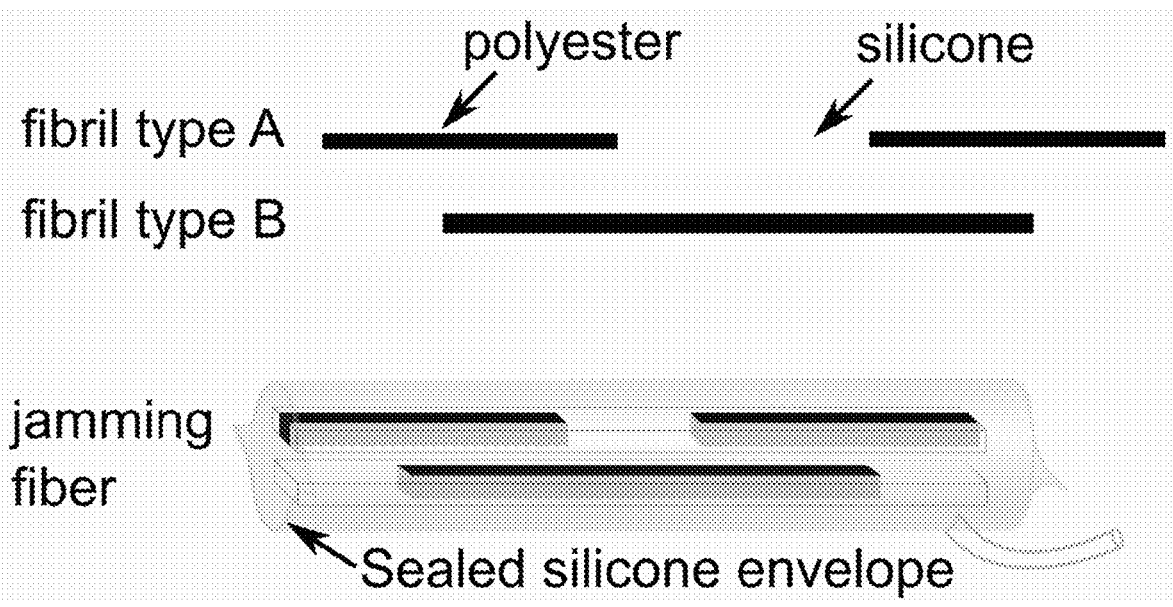
FIG. 4A through FIG. 4F depict tensile jamming fibers with segmented elastic fibrils (SEF).
Figure 4B:
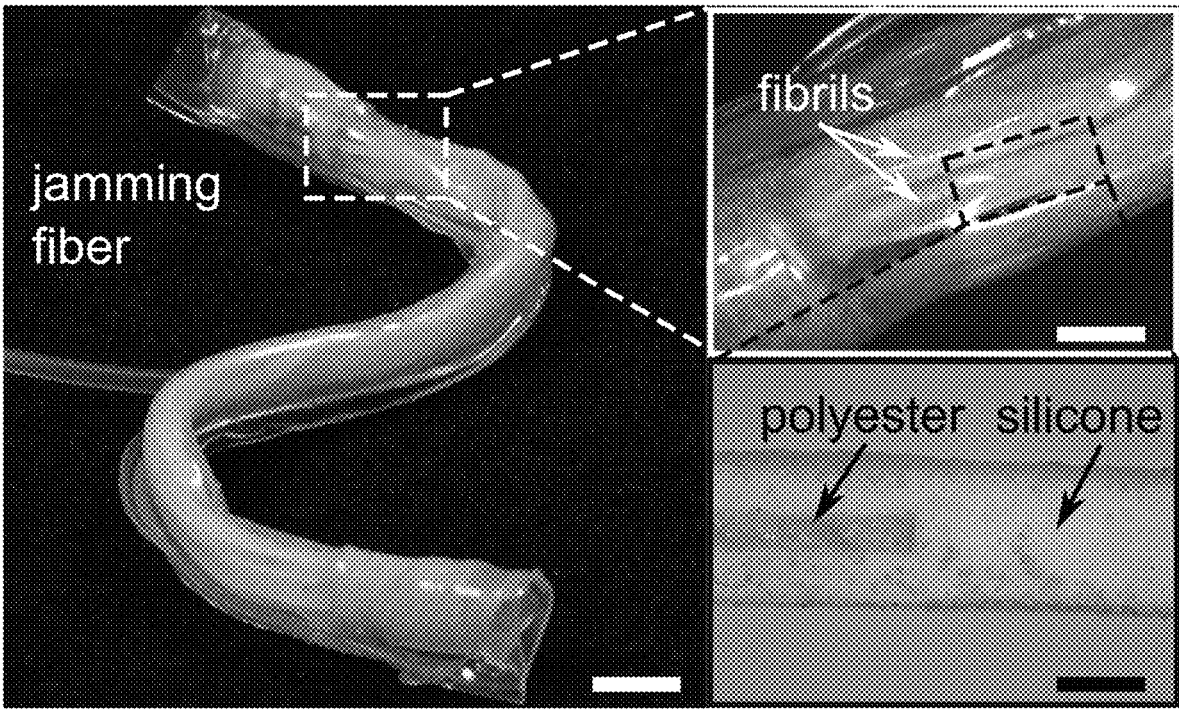
Figure 4C:
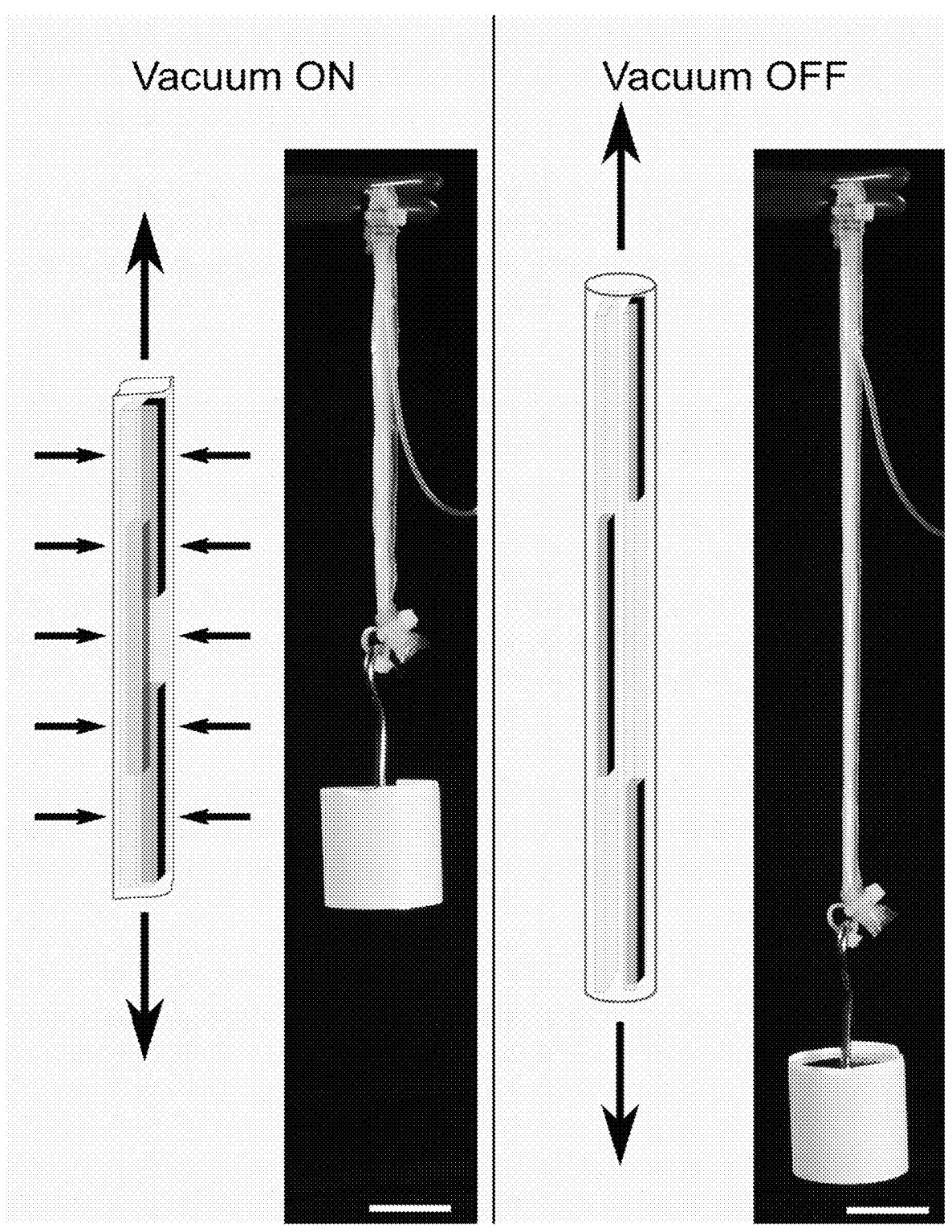
Figure 4D:
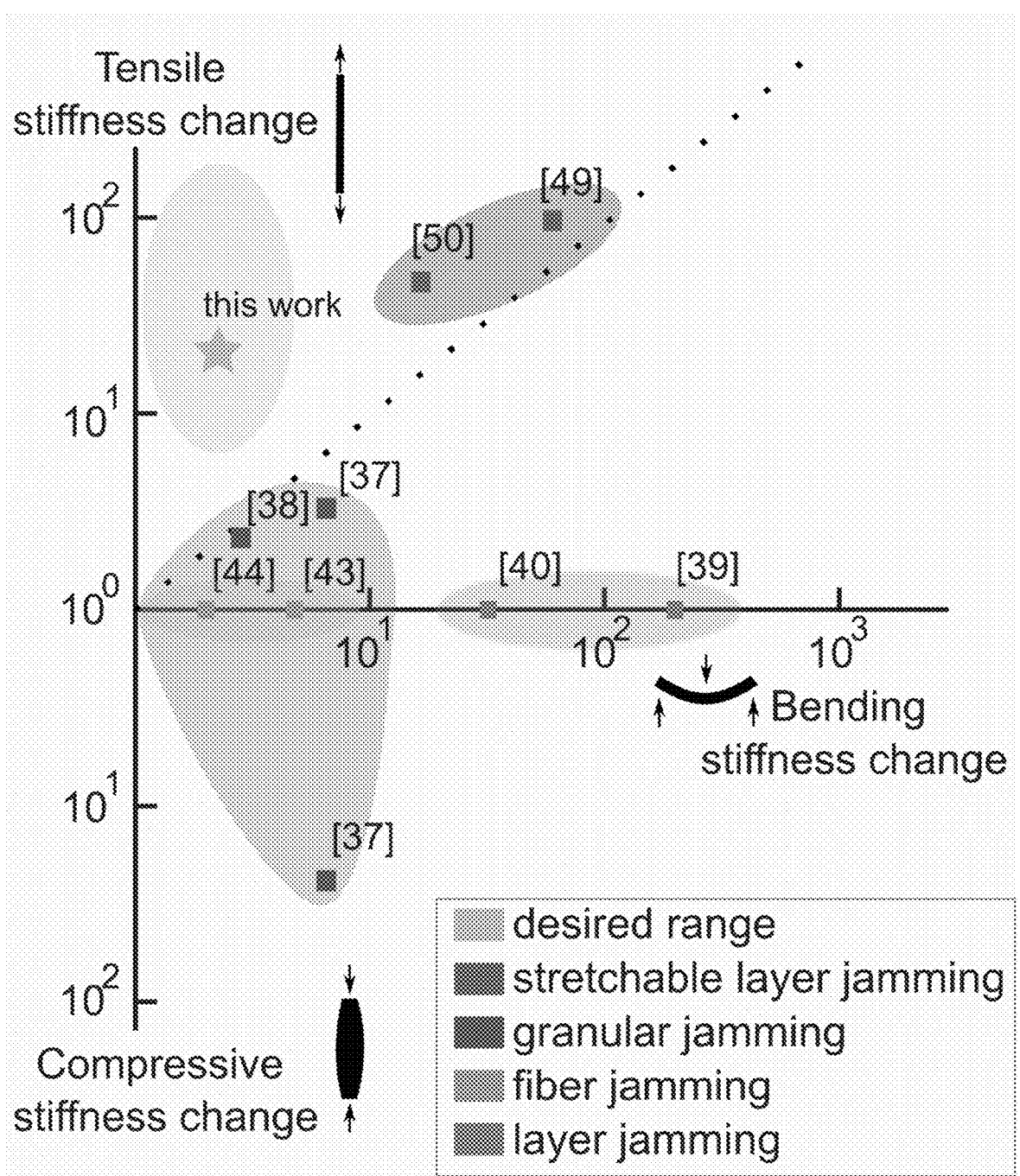

The following study describes "tensile jamming fibers," a system that rapidly modulates its tensile stiffness while maintaining low bending stiffness in all directions. Tensile jamming fibers are the first technology to occupy the desired range in FIG. 4D. A jamming fiber comprises a collection of segmented elastic fibrils (SEFs) (FIG. 4C). One SEF consists of an alternating pattern of inextensible polyester thread and elastic springs (see FIG. 4A and FIG. 4B). The segmented design of SEFs allows a jamming fiber to be highly stretchable—up to 200% of its original length without failure (FIG. 5)—in the absence of vacuum (unjammed). When vacuum is applied, the SEFs press together, and the interfaces between overlapping sections with embedded polyester thread generate high shear force that resists tensile loads (jammed).

Figure 4E:
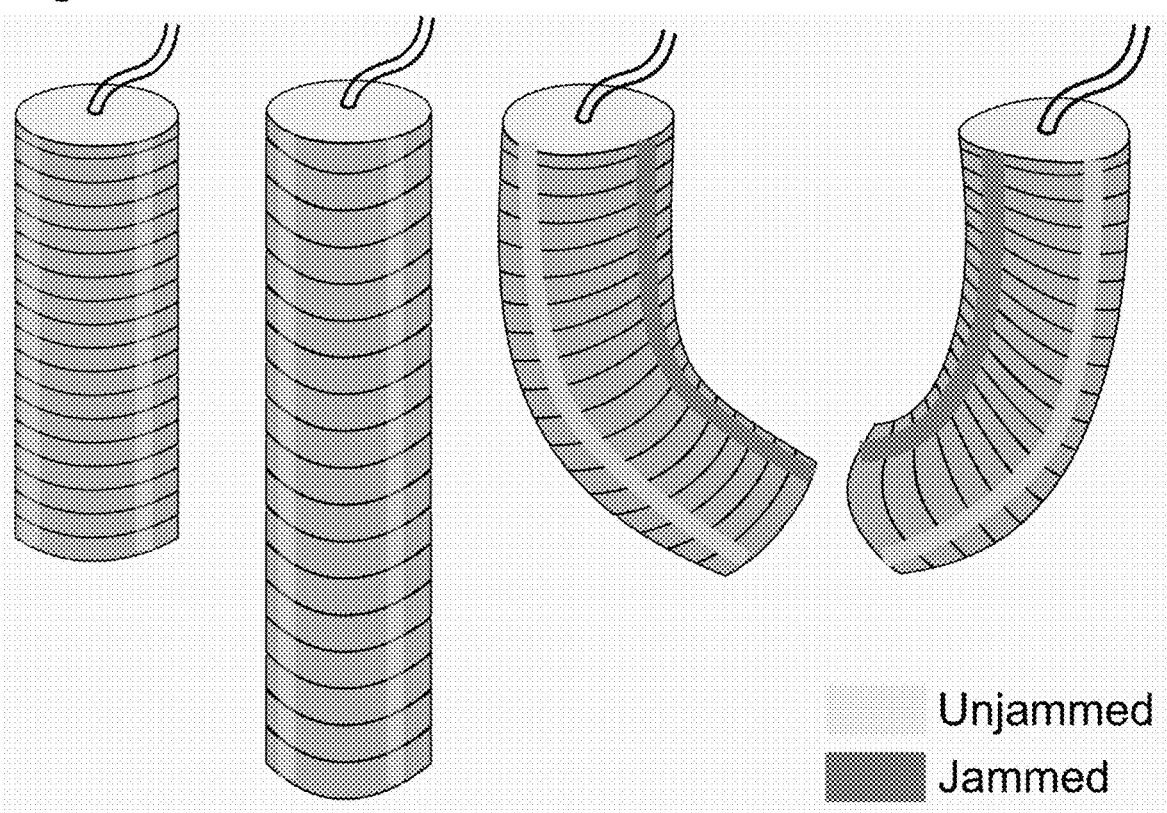
Figure 4F:
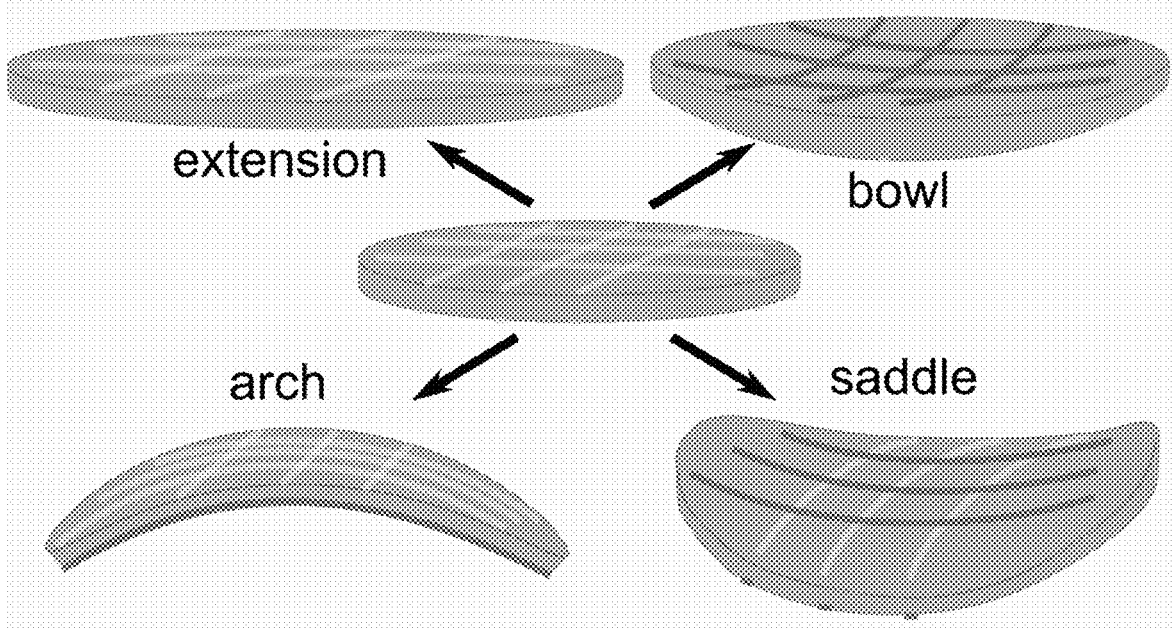

After affixing these jamming fibers to the surface of a single-chamber inflatable actuator, the local tensile stiffness is tuned to rapidly and predictably change its trajectory (FIG. 4E). Additionally, jamming fibers are integrated into a planarly-expanding actuator to create a rapidly shape-shifting bilayer capable of forming surfaces with zero, positive, and negative Gaussian curvatures (FIG. 4F). These demonstrations pave the way for shape-shifting robots and dynamic camouflage systems.

The materials and methods are now described.

Manufacturing of Fibers

Figures 6A, 6B, 6C:
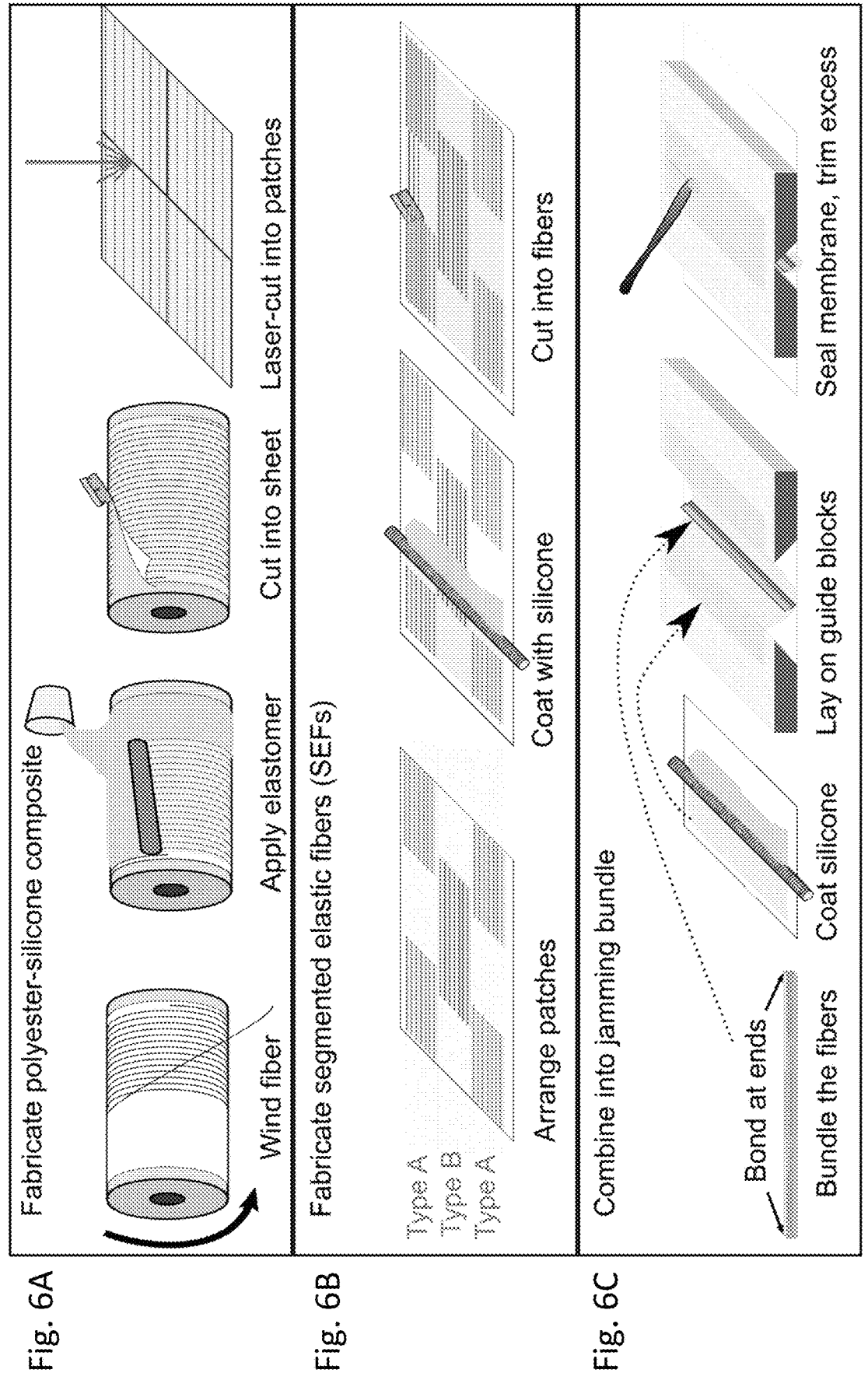
FIG. 6A through FIG. 6C depict an exemplary fabrication of jamming fibers.

Each segmented elastic fibril (SEF) had segments of polyester thread embedded discontinuously in a thin silicone substrate (EcoFlex 50, Smooth-On). Several SEFs were stacked and glued together on both ends with a silicone-based adhesive (Sil-Poxy, Smooth-On). A small amount of cornstarch was applied to the surfaces of SEFs to prevent adhesion of silicone. The bundle of SEFs was put inside a silicone membrane and sealed with Sil-Poxy. The detailed manufacturing process is depicted in FIG. 6A through FIG. 6C. Several designs were manufactured, with different linear loading fractions of SEF (=0%, 60%, 70%, and 100%) and different numbers of SEFs per fiber (N=4, 6, 8, 10).

Mechanical Testing

Quasi-static tensile testing of jamming fibers was done using an Instron 3345 material tester. For pull-to-failure and non-dynamic tensile tests, extension was applied at 20 mm/min. For three-point bending, compression was applied at 1 mm/min. For cyclic testing, extension was applied at 60 mm/min. Additional details and results regarding characterization are presented in the Supporting Information.

Fabrication of Actuators

The omnidirectional actuators were made by first creating a silicone (EcoFlex 50, Smooth-On) membrane with embedded parallel polyester threads, and then wrapping the membrane into a cylinder, as described in previous work (Kim S Y et al., Nature communications. 2019 Aug. 1; 10 (1): 1-8). Jamming fibers were attached on the outside of this cylinder, at even spacing (every 120°). A modular connection, made out of acrylic and Luer-lock connectors (51525K123 and 51525K213, McMaster-Carr), was added to each end of the cylindrical actuator using Silpoxy. For the gripper demonstration, three modules were attached to an acrylic plate, in a circular pattern (radius of 300 mm), at equal spacing (120°). The continuum arm was manufactured by attaching two omnidirectional actuators in series and mounting the free end of one of them to a base plate. The shape-shifting membrane was fabricated by casting silicone (EcoFlex30, Smooth-On) in an acrylic mold (FIG. 7A through FIG. 7C) and attaching 3×3 grids of jamming fibers on both sides of the membrane with Silpoxy. The resulting bilayer membrane is about 10 mm thick.

The results are now described.

Segmented Elastic Fibrils

The technology underpinning tensile jamming fibers is the segmented elastic fibrils (SEFs). Two SEF architectures are developed, each consisting of different interspersed segments of polyester and silicone, labeled as "type A" and "type B" in FIG. 4A. To make a jamming fiber, equal numbers of type A and type B SEFs are aligned and joined at their ends. They are then placed inside a sealed silicone envelope and connected to a vacuum source. An illustration of the process can be found in FIG. 6A through FIG. 6C. Within each type of SEF, the length of polyester content is higher than 50% of the total SEF length. This way, there will be overlapping polyester sections when the two types of SEF are placed adjacent to one another in the silicone envelope.

Figure 10B:
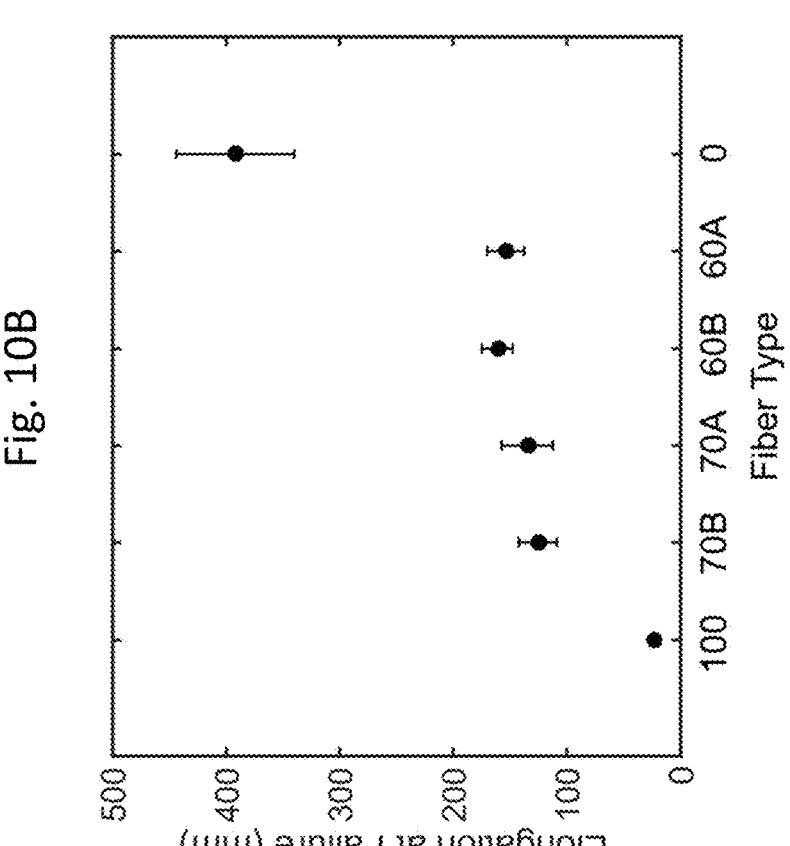
FIG. 10A and FIG. 10B depict the results of characteriz-
ing behavior of a single SEF.
Figure 10A:
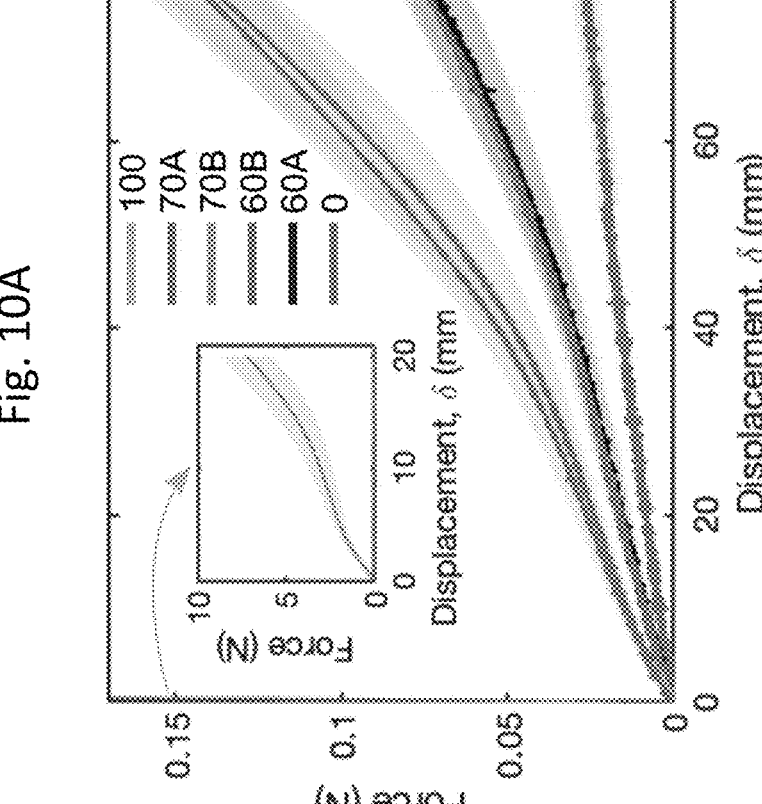

Tension tests were conducted on SEFs with varying polyester length percentages (γ) to understand how γ influences stiffness and maximum elongation before failure (FIG. 10A and FIG. 10B). As γ increases, so does the stiffness, which is consistent with the understanding of the mechanics of an SEF from the rule of mixtures:

$$E_{SEF} = \gamma E_f + (1 - \gamma)E_m \qquad \text{(Eq. 1)}$$

where ESEF is the Young's modulus of an SEF, and Ef and Em are Young's moduli of polyester and silicone matrix, respectively.

Tensile Jamming Fibers

Figures 8A, 8B, 8C, 8D:
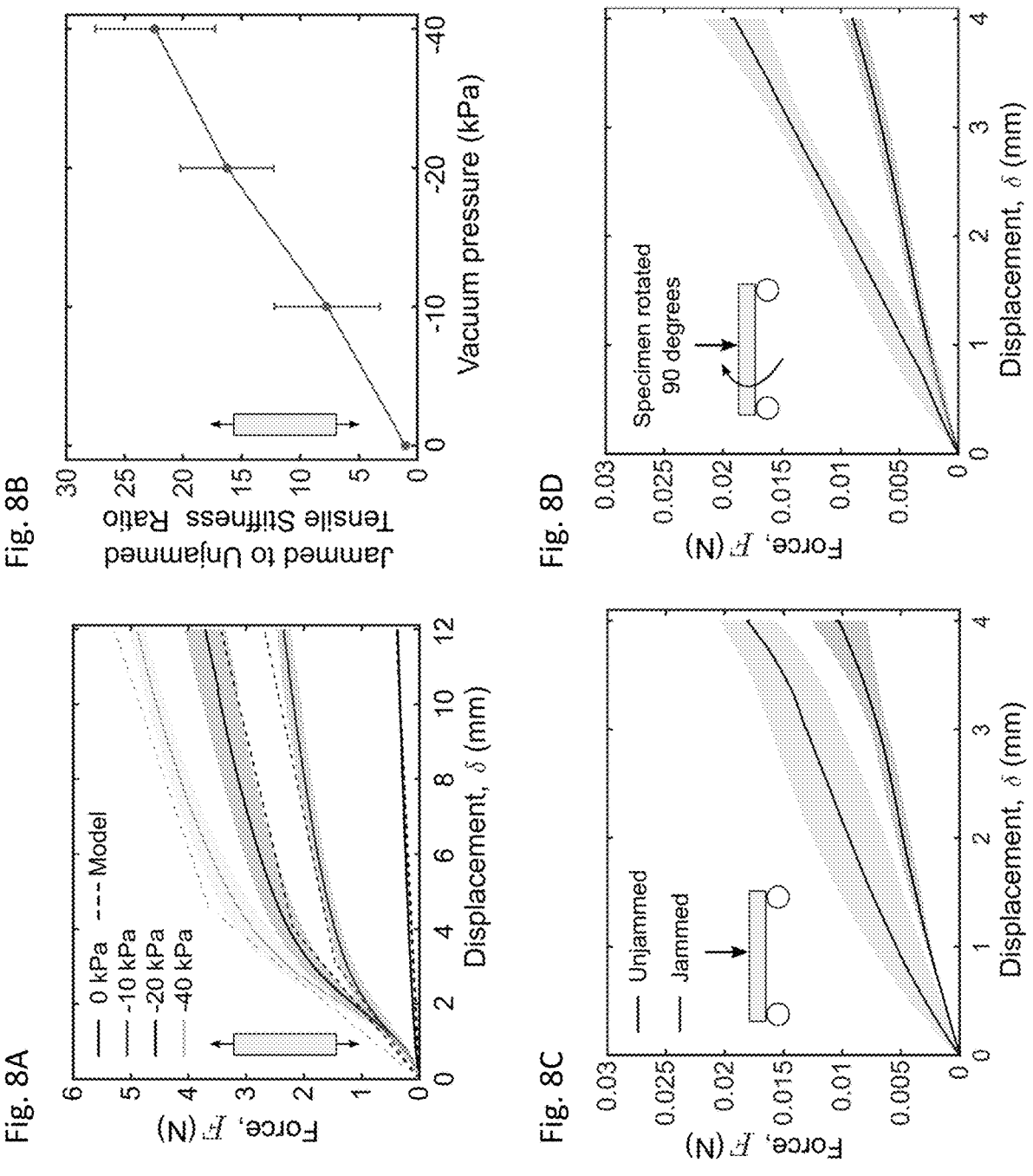
FIG. 8A through FIG. 8D depict the results of mechanical
characterization of jamming fibers.

The tensile force (F) required to stretch a tensile jamming fiber to a prescribed displacement (δ) was found to be able to be tuned, and thereby the fiber's tensile stiffness (k=F/δ) by varying the magnitude of vacuum (ΔP) (FIG. 8A). The ratio of jammed to unjammed stiffness rises to a maximum of more than 20× with increasing pressure (FIG. 8B). Despite this high tensile stiffness ratio, the fibers retain low bending stiffness in two orthogonal directions (FIG. 8C, FIG. 8D). Three-point bending tests reveal that the system has a bending stiffness of 0.0021 N/mm and 0.0048 N/mm when unjammed and jammed at −85 kPa, respectively. Thus, transitioning from unjammed to jammed, the bending stiffness increases about 2×. It is worth noting that these bending stiffnesses (unjammed and jammed) are less than 1/80 the reported stiffnesses of a benchmark fiber jamming system with similar dimensions (Brancadoro M et al., 2018 IEEE International Conference on Soft Robotics (RoboSoft) 2018 Apr. 24 (pp. 258-263)).

Other design parameters contribute to a tensile jamming fiber's effectiveness. A relationship was derived between k and design parameters including γ, vacuum pressure, and number of SEFs (N). The analytical model considers the interfacial shear stiffness (kshear) between SEFs as the primary contribution to the overall tensile stiffness (see FIG. 9A through FIG. 9C). The interfacial stiffness is expressed as:

$$k_{shear} = \alpha \frac{GA}{t} \qquad \text{(Eq. 2)}$$

where α is the effective contact ratio (a fitting parameter to account for imperfect contact), G is the shear modulus of silicone (G=E/(2(1+v)), where E is Young's modulus and v is the Poisson ratio), A is the area of contact, and t is the thickness of the silicone under shear on one fibril. t is a function of the applied pressure, since pressure will squeeze and flatten the silicone in the linear elastic regime according to t(ΔP) =t0 (1−(ΔP)/E), where to is the initial thickness of the silicone interface. Since the shear interfaces are parallel, the total stiffness of the jamming fiber is the sum of kshear from all interfaces (SM: Eqs. 13-17).

In the model, SEF slippage that captures the non-linearity of the force-displacement response was also considered. Slip happens when the shear force in the interface exceeds the maximum static friction that can be sustained by the silicone interface between polyester threads in adjacent fibrils. After slip, some interfacial stress is relieved (SM: Eqs. 18 and 19).

Figures 20A, 20B, 20C, 20D:
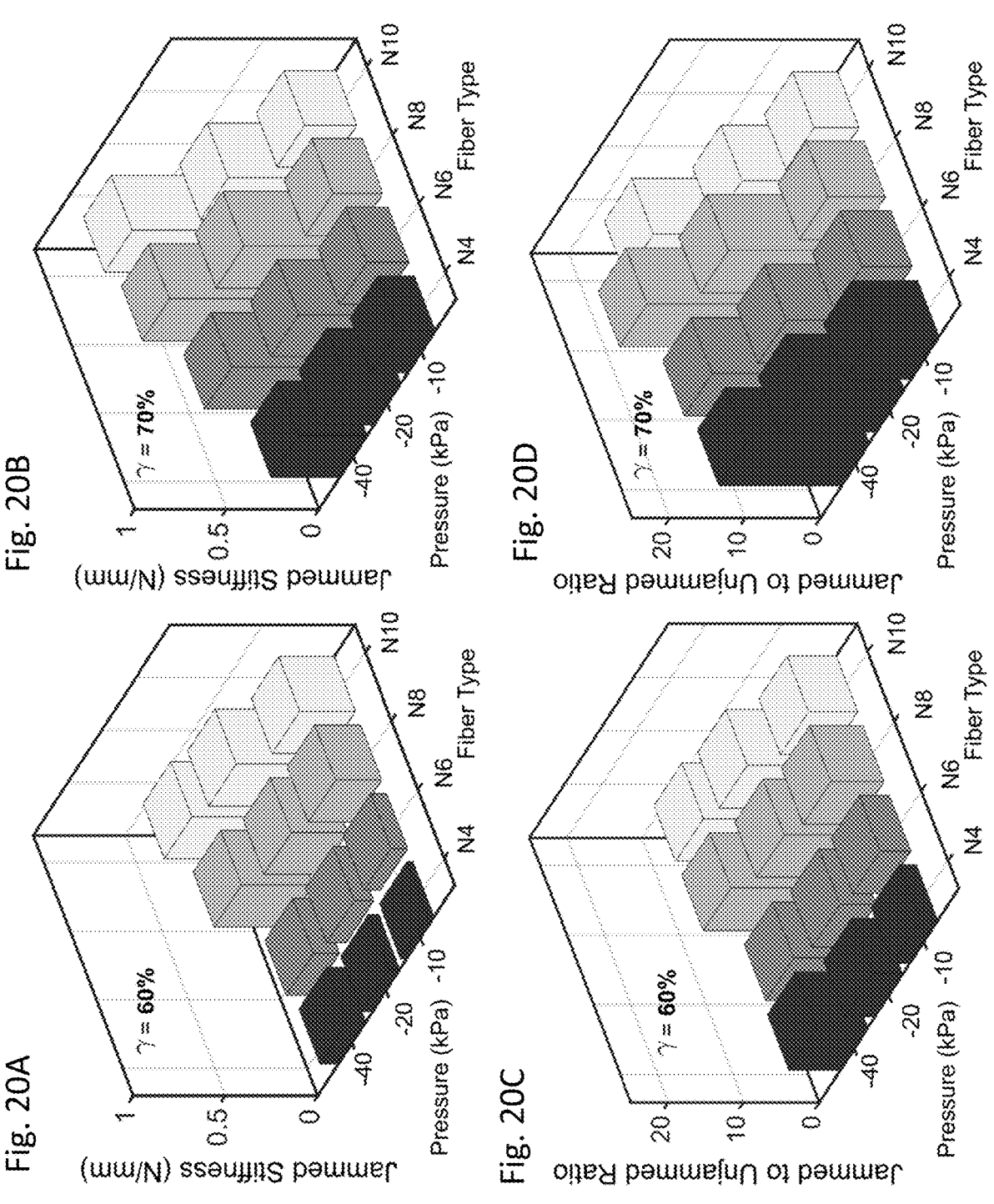
FIG. 20A through FIG. 20D depict the results of characterizing behavior of jammed fibers.

With only three fitting parameters (effective contact ratio (α), shear area ratio (e), and coefficient of friction (μ)), the model is able to predict the jamming behavior reasonably well. The model predicts that jamming fiber stiffness will increase with increasing γ, N, and ΔP. This prediction is consistent with uni-axial quasi-static tension tests conducted on jamming fibers while varying the same parameters (FIG. 20A and FIG. 20B). Theoretical predictions from the model are plotted in FIG. 8A as a dashed line. The average percentage error of force prediction at the maximum tested displacement of 8 mm is 8.60%. Based on the results of the tension tests, $\gamma=70\%$ and $N=8$ (referred to as 70% N8 in subsequent text) were chosen for further testing and demonstrations because it exhibited the highest tensile stiffness ratio, 22.2, between the jammed and unjammed states for $\Delta P=-40$ kPa (FIG. 20C and FIG. 20D).

Having quantified the influence of critical design variables on a jamming fiber's tensile stiffness, the reliability of the fiber jamming mechanism was evaluated in two ways. First, to assess how well the jammed fibers could induce the same actuator trajectory multiple times, a fiber was kept jammed and subjected to 1,000 cyclic tensile loads. After 1,000 cycles, the fiber retained over 70% of its original tensile force (dropping from 5.1 N to 3.6 N) (FIG. 11A). Second, to test how well the fibers would fare in reconfigurable applications (jamming and then unjamming to facilitate different sets of motions), vacuum was applied every other cycle for 100 cycles of tensile load. Throughout the 100 cycles of intermittent jamming and unjamming, negligible change was observed in F, despite reaching the same $\delta$ each cycle (FIG. 11B). The effective maintenance of k throughout the jam-unjam cycles gave confidence that jamming fibers could be jammed and unjammed repeatedly to perform reconfiguration tasks.

Figures 12A, 12B:
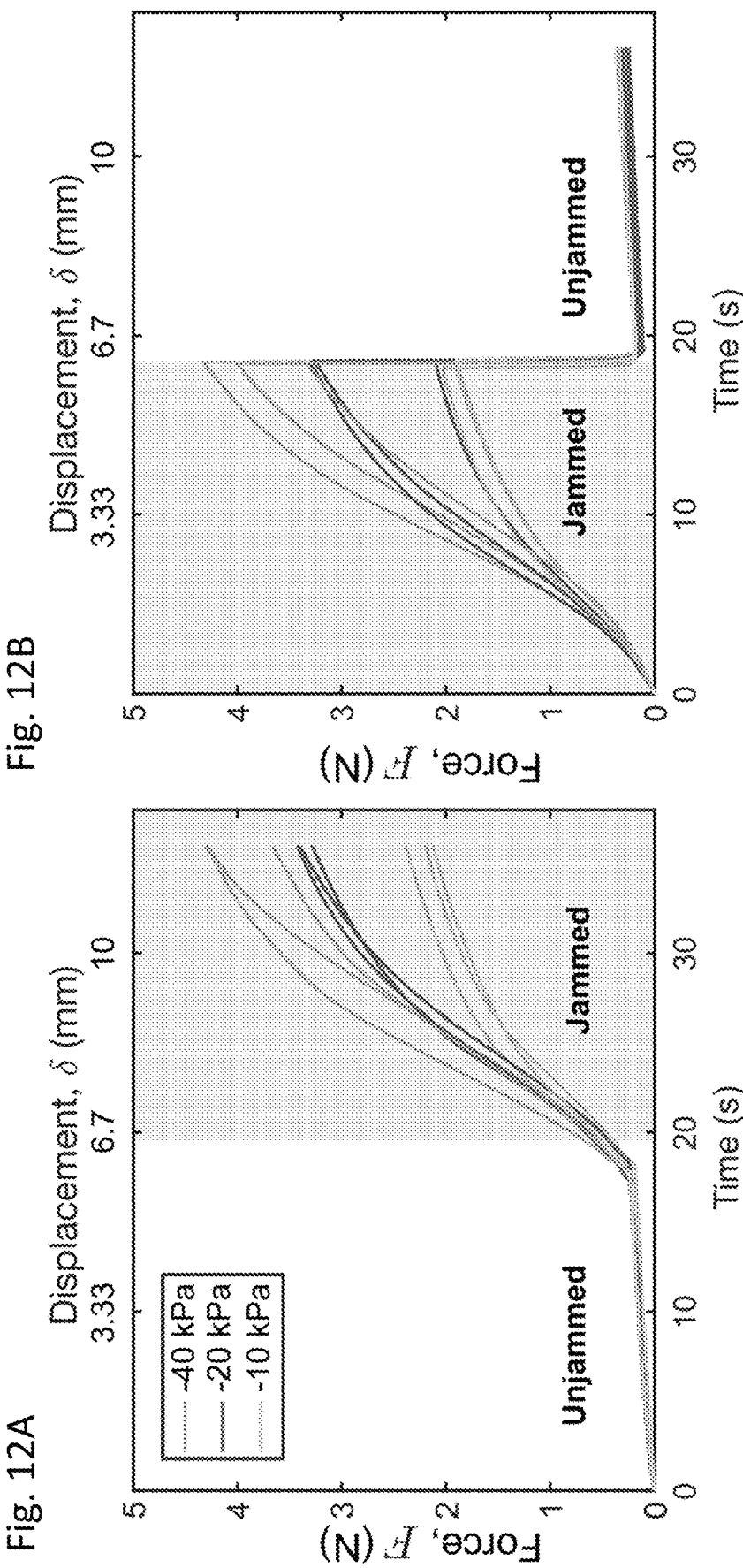
FIG. 12A and FIG. 12B depict the results of dynamic
jamming.

To quantify the time scale of stiffness change in a jamming fiber, jamming was initiated partway through a tensile test while monitoring the mechanical response (see FIG. 11C and additional data in FIG. 12A). The jamming transition was rapid, stiffening the fiber within a tenth of a second and stabilizing in the new jammed state in less than half of a second (see inset of FIG. 11C). The reverse process, going from jammed state to unjammed state, was also rapid, and exhibited no residual forces (see FIG. 11D and additional data in FIG. 12B). From this test, force sustained in the jammed state was observed to appear to be independent of the pre-strain on a fiber at the onset of jamming. For example, the maximum value attained by curves in the two gray shaded regions in FIG. 11C through FIG. 11H are within 5% of one another. Invariance in the mechanical response of jamming fibers to moderate pre-strains allows stiffness changes during inflation of an actuator.

Modular Variable-Trajectory Actuator

Figure 14:
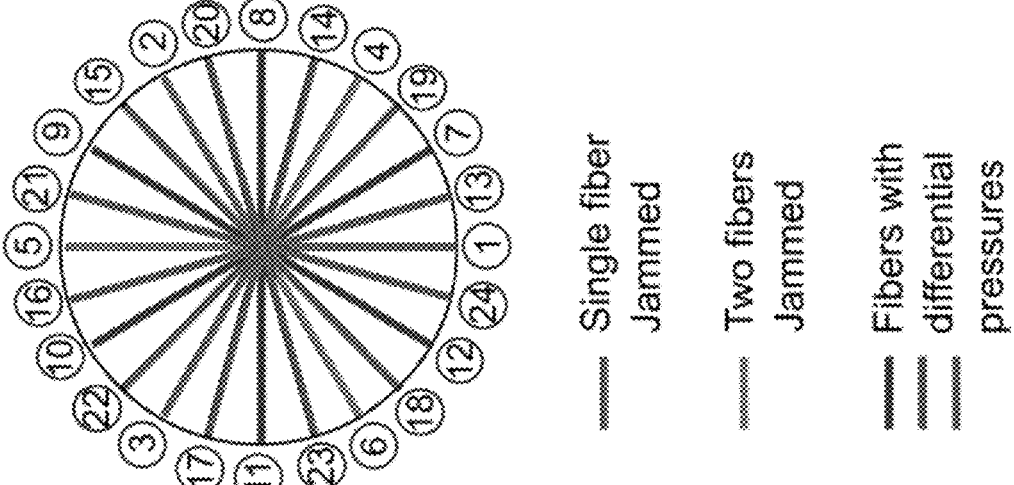
FIG. 14 depicts a schematic of a single actuator going in
24 directions in FEA. The coordinates are the final x-y-z
locations of the end effector.

To achieve multiple trajectories using a single actuator, three jamming fibers were integrated around the circumference of a modular, vertically-extending pneumatic chamber. By applying vacuum to subsets of the jamming fibers, the actuator could bend along various trajectories (FIG. 13A). The range of attainable trajectories grows combinatorially with increased resolution in pressures: even with only two levels of pressure ($P=-10$ kPa, $-40$ kPa), the actuator generated 12 distinct swept trajectories (FIG. 13B). Beyond the rapidity of reconfiguration, attaining 12 distinct trajectories sets the present system apart from multi-trajectory actuators based on phase-change materials like LMPA (Buckner T L et al., Advanced Functional Materials. 2019 December; 29 (50): 1903368; Tonazzini A et al., Advanced Materials. 2016 December; 28 (46): 10142-8), where only two states—ON and OFF—are available. The demonstration described herein represents a single-core soft actuator with the largest number of programmable trajectories to date. With finer variations in pressure, the actuator is able to bend in more directions, without requiring additional pneumatic chambers. As a conceptual illustration, 24 distinct trajectories were generated by varying the stiffness of fibers further in FE simulation (FIG. 14).

Figure 15:
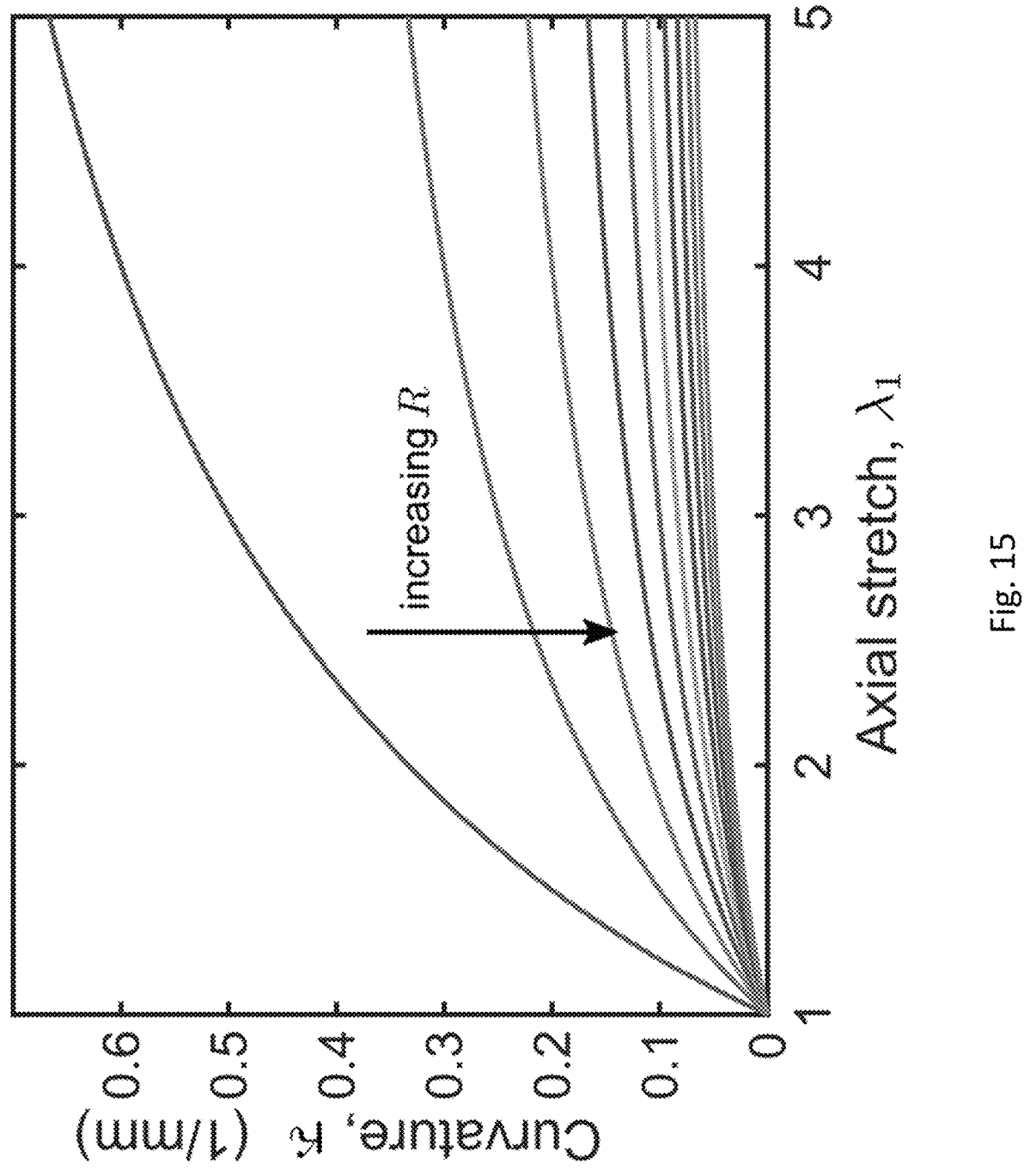
FIG. 15 depicts the results of an analytical model char-
acterizing curvature versus axial stretch A direct conse-
quence of a curvature model for the jamming-fiber clad
cylindrical actuators is a monotonically increasing relation
between axial stretch λ1 and curvature κ. Curves are shown
for a variety of different actuator radii spanning R=1 to 10
mm in 1 mm increments.

Analytical and finite-element (FE) models were used to predict the deformation trajectories of the single actuator outfitted with jamming fibers (FIG. 13A). With the analytical model, both the bending direction and the bending curvature of the actuator can be predicted fairly well. The bending direction can be approximated by calculating the geometric circumferential midpoint of the jammed fibers, while a hyperelastic constitutive model reasonably predicts the magnitude of curvature (FIG. 15). With the FE model, more nuanced phenomena were captured. These include how jamming multiple fibers to bisect a trajectory decreases curvature at a fixed pressure, and how jamming at intermediate pressures can be used to further hone bending angle and direction. The end effector distances defined by the Euclidean distance, $(x2+y2+z2)1/2$, were juxtaposed from its starting position with those predicted by the models (FIG. 13C left axis). The small discrepancies suggest that both models are useful in the design of variable-trajectory actuators. However, while the analytical model offers predictions with less required computation, it cannot predict the effects of jamming at intermediate pressures.

The angular deviation of the actuator's swept path was calculated from the intended path, which was to divide the hemisphere into twelve equal parts (FIG. 13D, right axis). Interestingly, the trajectories with least absolute angle error (1, 5, and 11) arose from different jamming configurations: single fiber jammed, two fibers jammed, and fiber partially jammed, respectively. This result suggests a desired direction—whether it is along the direction of one fiber or in between two fibers—can be achieved with high accuracy. By the same token, the result suggests that deformation trajectories, and in our case, angular deviations from perfect divisions of the x-y plane, are sensitive to fiber placement and actuator dynamics (see oscillations of swept paths projected in the x-y plane in FIG. 13B, especially trajectories 2, 3, 7, and 12).

Enhancing Performance by Combinations of Modules

Jamming fiber-enabled modular variable-trajectory actuators can be combined to create agile, reconfigurable soft robots. The resulting systems have myriad deformation modes, enabled by the versatility and modularity of individual variable-trajectory actuators. To demonstrate potential applications for this principle, a multi-modal gripper and a multi-trajectory continuum arm were created (FIG. 16A).

Figures 16A, 16B, 16C:
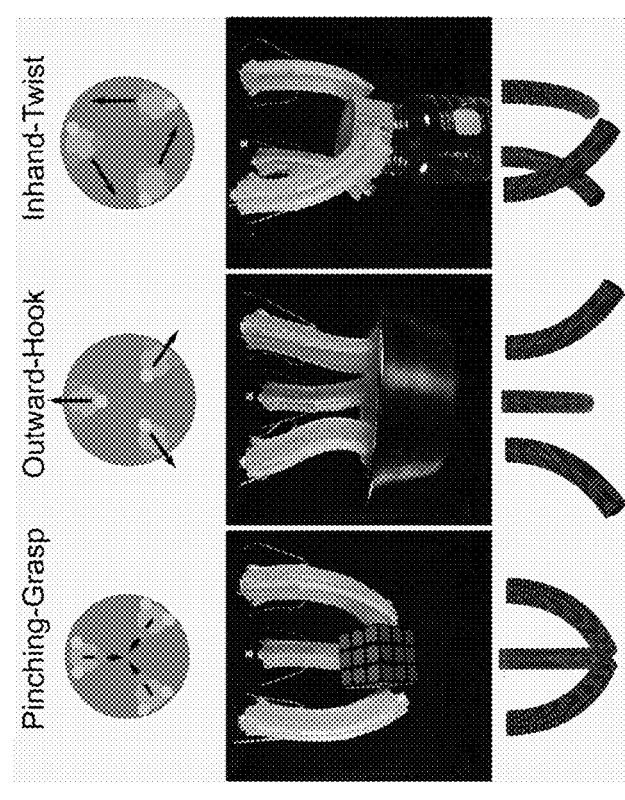
FIG. 16A through FIG. 16C depict modular actuators
combined to make multi-modal three-finger gripper and
two-segment continuum arm.

To make a multi-modal gripper, three actuators (each equipped with three jamming fibers) were mounted in parallel to an acrylic base-plate (FIG. 16B). Depending on the set of fibers that was jammed, the fingers engaged in three kinematically distinct grasping modes. When the fibers on the inside of the fingers were jammed, the gripper executed a "pinching grasp" for picking up relatively small objects. Jamming the outside fibers of each actuator led to an "outward-hooking" motion for latching onto the inside of concave objects. Finally, when two fibers on the oblique side of the fingers were jammed, the gripper executed a "twisting" motion. Utilizing the three grasp modes separately, the gripper was able to pick up a Rubik's cube, lift a bowl, and twist the cap off of a jar. Two grasping motions (pinching and outward-hooking) were also shown to be combinable in sequence to execute a pick-and-place operation. The ability to achieve diverse grasping modes within the same gripper with a single positive pressure input shows the enhanced re-programmability of motion trajectories enabled by tensile jamming. A superposition of these grasp modes, or optimization of fiber placement, could potentially open up a wider grasping space.

In addition to the parallel configuration embodied by the gripper, two actuators were joined in series to create a continuum manipulator with seven controllable degrees of freedom (six fibers and one contiguous inflating core) (FIG. 16C). By jamming the fibers of each segment on the same side, the whole manipulator bent to that side; by jamming fibers on different sides of each segment, the manipulator bent into more complex configurations. Such motions are reminiscent of the variety of deformation modes of biological hydrostats (Chapman G, Biological reviews. 1958 August; 33 (3): 338-71; Kier W M et al., Zoological journal of the Linnean Society. 1985 Apr. 1; 83 (4): 307-24). In each case, the deformed state was predicted well by FEA, reinforcing its utility as a design tool for jamming fiber-based robots.

Shape-Changing Membrane

The ability to adapt shape to environmental and developmental triggers is a core function of living beings, and a grand challenge for artificial machines (Shah D et al., Advanced Materials. 2021 May; 33 (19): 2002882). Many studies, both those in simulation (Kriegman S et al., arXiv preprint arXiv: 1905.09264. 2019 May 22) and hardware (Shah D S et al., IEEE Robotics and Automation Letters. 2019 Feb. 27; 4 (2): 2204-11; Ishida M et al., IEEE Robotics and Automation Letters. 2019 Jul. 25; 4 (4): 4163-9; Shah D S et al., Nature Machine Intelligence. 2021 January; 3 (1): 51-9; Lee D Y et al., Soft robotics. 2017 Jun. 1; 4 (2): 163-80; Lin H T et al., Bioinspiration & biomimetics. 2011 Apr. 26; 6 (2): 026007; Liu K et al., Science Robotics. 2021 Apr. 7; 6 (53)), attest to the benefits shape change confers on robots under changing task demands. Soft robots, in particular, hold promise as the next generation of shape-changing robots due to their capability to undergo large deformations. Inspired by botany (unfolding of flowers (Reyssat E et al., Journal of the Royal Society Interface. 2009 Oct. 6; 6 (39): 951-7) and natural curling of seed pods (Armon S et al., Science. 2011 Sep. 23; 333 (6050): 1726-30)), researchers have programmed thin, planar sheets to morph into complex surfaces through in-plane growth and out-of-plane buckling (van Rees W M et al., Proceedings of the National Academy of Sciences. 2017 Oct. 31; 114 (44): 11597-602). Such an arrangement enables local control of the shape tensor, thereby giving rise to a rich diversity of shapes.

Figures 17A, 17B, 17C:
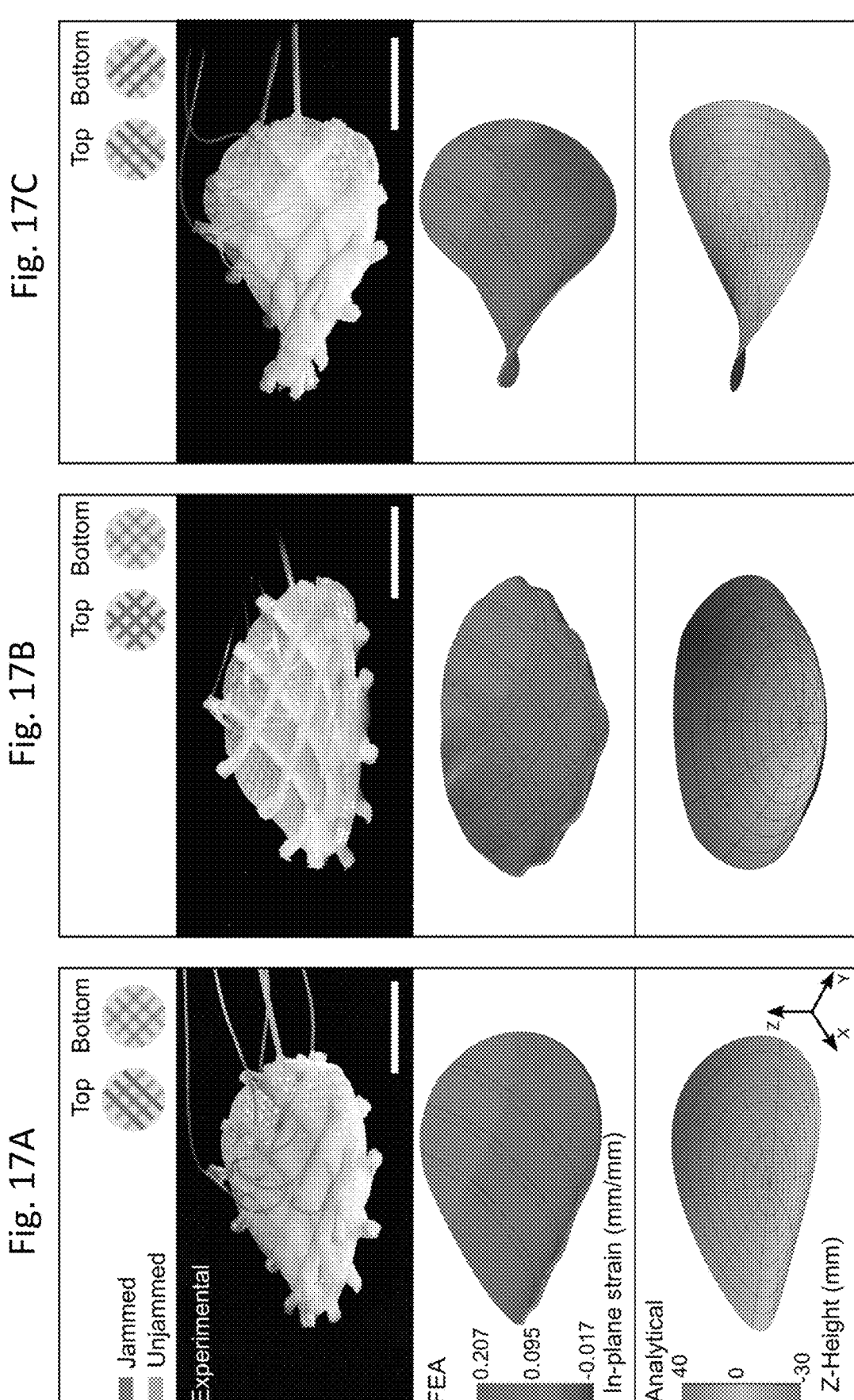

Current artificial shape-changing sheets-those made from composite hydrogels (Gladman A S et al., Nature materials. 2016 April; 15 (4): 413-8) or elastomers (Boley J W et al., Proceedings of the National Academy of Sciences. 2019 Oct. 15; 116 (42): 20856-62), for example—often have only one programmed shape and a slow response time. Recent work on liquid crystal elastomer composite shape-morphing surfaces increased the number of possible deformations with a single system, but still required minutes to switch between shapes (Liu K et al., Science Robotics. 2021 Apr. 7; 6 (53)). Fast shape-changing systems can be achieved by applying jamming fibers to planar inflatable geometries. The capability of the fibers to tune tensile stiffness on a higher magnitude than bending stiffness allows for effective redistribution of the elastic energy on the thin sheet between stretching and bending, thus effectively altering the resulting shape within seconds. Here, this concept was demonstrated by applying jamming fibers in a grid-like arrangement on each side of a planar pneumatic bladder (FIG. 17A through FIG. 17C).

Figures 7A, 7B, 7C:
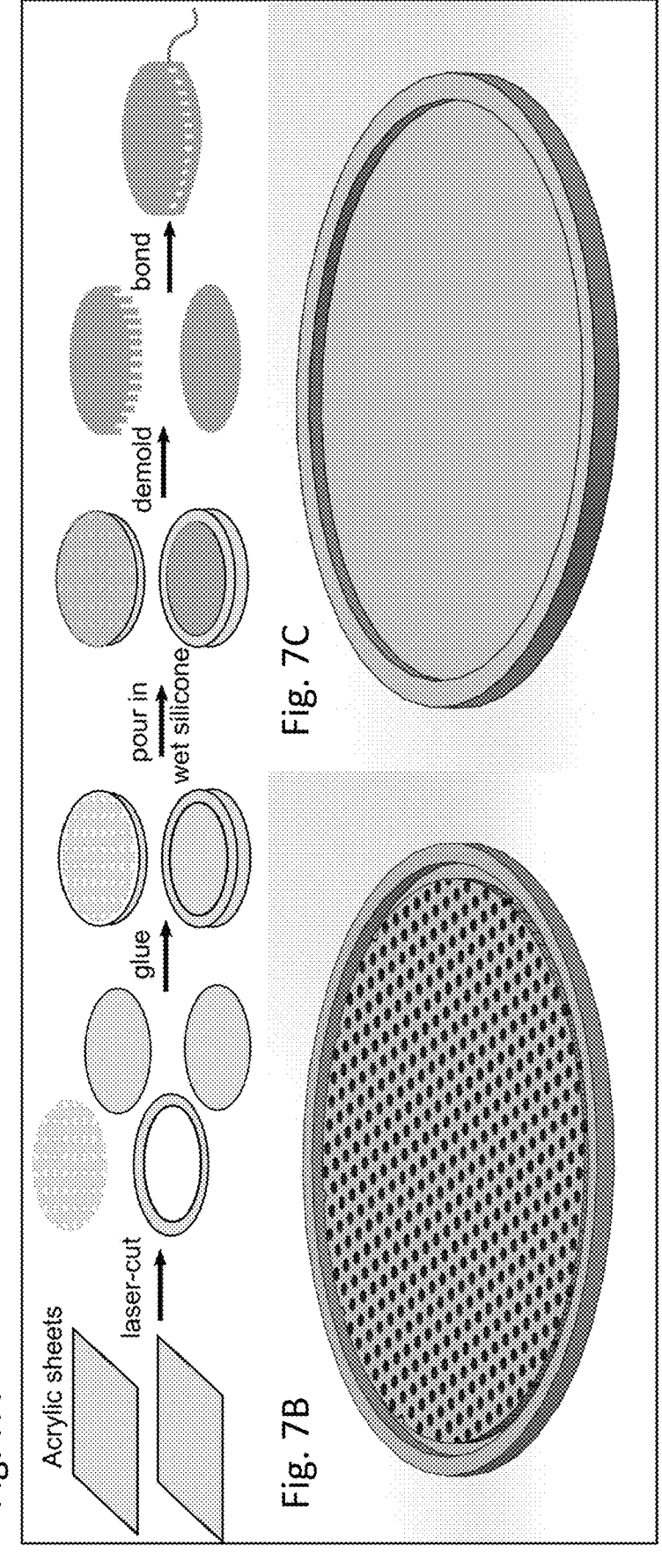
FIG. 7A through FIG. 7C depict an exemplary fabrication of a planar actuator.

The top and bottom faces of the bladder are connected by silicone pillars, preventing expansion through the thickness and creating a membrane that expands in-plane orthotropically (see FIG. 7A through FIG. 7C). When the membrane's surface is asymmetrically or anisotropically constrained by jamming fibers during inflation, the membrane bends out of plane as it equilibrates to a minimum energy state. For example, by jamming the top longitudinal fibers, the inflated bladder bent around a single axis, into a cylindrical arch (zero Gauss curvature, FIG. 17A). Jamming the bottom longitudinal and bottom latitudinal fibers, the bladder assumed the shape of a bowl or dome (positive Gauss curvature, FIG. 17B). Lastly, jamming the top longitudinal and bottom latitudinal fibers yielded a saddle shape (negative Gauss curvature, FIG. 17C). This is the first demonstration of a bilayer that is able to independently switch between all three types of Gaussian curvatures within seconds.

Figures 18A, 18B, 18C:
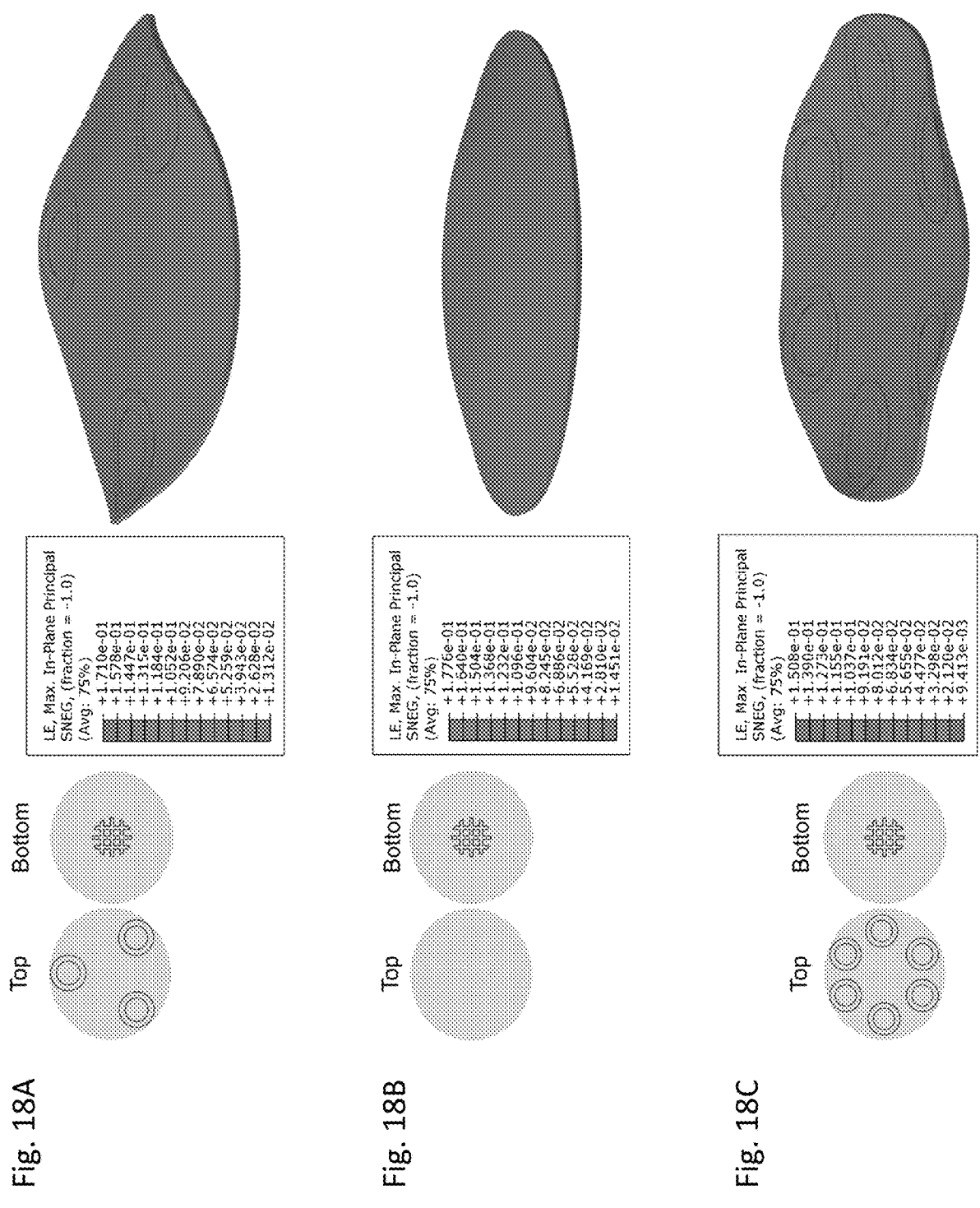

The qualitative deformation behavior of the bladder outfitted in jamming fibers is described well by FEA, while analytical methods reasonably predict deformation of the mid-plane. The local control of shape furnished by the jamming fibers is expected to propel the field of shape-morphing structures to the next level. As a demonstration of concept, a large-scale membrane with patterned jamming fibers was simulated and found to be able to morph to distinct and complex topologies contingent on the subsets of locally jammed fibers (FIG. 18A through FIG. 18C).

Jamming Fiber Optimization and Additional Characterization

Pull-to failure tensile tests were conducted (20 mm/min using an Instron 3345 fitted with a 50 N load cell) on individual segmented elasticity fibrils (SEFs) to shed light on the behavior of jamming fibers containing that type of SEF. Six types of SEF, containing differing volume fractions of polyester), were studied: 0%, 60% type A, 60% type B, 70% type A, 70% type B, and 100%. Note that 0% and 100% were selected as control specimens—0% is pure elastomer; 100% is pure polyester thread. A force versus displacement plot of the tests (FIG. 10A) reveals that the 0% SEFs were the least stiff (initial stiffness of 0.0012 N/mm). Increasing the volume fraction of polyester caused an increase in stiffness, peaking at pure polyester thread (initial stiffness of 0.47 N/mm).

Average elongation at failure was calculated from the force-displacement curves (FIG. 10B). There is a monotonically increasing trend in elongations at failure. Starting at around 23 mm for 100%, elongation rises to 130 mm for 70% of both types, to 160 mm for 60% of both types, and then 400 mm for 0%. SEFs of the same polyester volume fraction exhibited similar elongations at failure, regardless of whether there were type A or type B. This result implies that jamming fibers constituted of equal amounts type A and type B SEF should have relatively homogeneous stiffness properties along their length.

With an understanding of the mechanics of a single SEF, the fundamental unit that composes jamming fibers, next tested were the fibers themselves. To explore the design space for jamming fibers, unidirectional tensile tests were conducted on combinations of fiber parameters. In particular, three vacuum pressures (−10 kPa, −20 kPa, and −40 kPa), four different numbers of SEFs (N=4, 6, 8, 10), and two ratios of polyester (60% and 70%) were chosen— yielding a representative, though not comprehensive, range of designs. Each fiber used in the tensile tests was 120 mm long.

A set of tensile tests entailed a pull to 12 mm—what was deemed normal operational range for the jamming fibers. 10% strain represents a factor of safety from performance degradation. The test was stopped at 10% strain because it was empirically determined that after 20% strain, the performance of a fiber was markedly degraded. The mean jammed stiffness of each combination is reported in FIG. 20A and FIG. 20B in 3D space to visualize the various parameter contributions to stiffness (in N/mm). The mean was also extracted and placed into FIG. 19, for ease of reference to specific values.

In addition, FIG. 20C and FIG. 20D give the ratio of jammed to unjammed stiffnesses. The 70% N8 was chosen for subsequent testing and demonstrations because it exhibited the highest stiffness differential between jammed and unjammed states (aside from the 70% N10), and also demonstrated more repeatability than the 70% N10 specimens (perhaps due to the lower probability that SEFs would shift).

Figure 5:
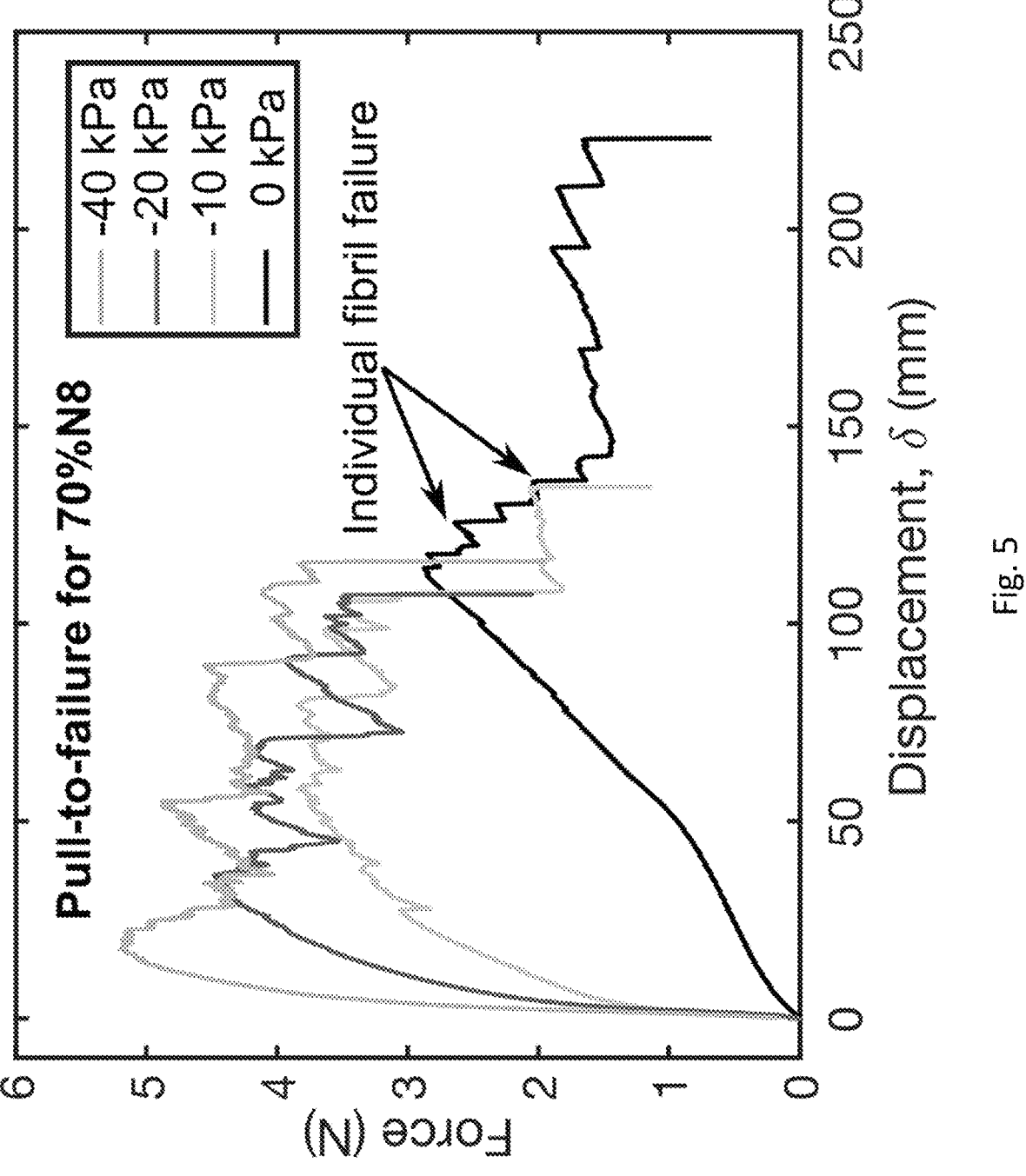
FIG. 5 depicts the results of a pull-to-failure test on 70% N8 fiber at various pressures.

Pull-to-failure tests were performed on several specimens of the selected type (70% N8) to study the maximum elongation and force of the type of fiber at different pressures (FIG. 5). Expectantly, as the absolute value of pressure increased, the maximum load sustained by the fiber increased. This test revealed that fiber failure modes are characterized by three stages. The first is slip of the SEFs relative to one another, which caused subtle drops in force over a longer duration. The second is incremental individual SEF failure inside the fiber. Incremental failure can be seen in the frequent "stair-step" drops in force toward the end of each curve. Notably, the lower the pressure, the more consistently and strongly a specimen was able re-accumulate force after a drop in force caused by internal SEFs failing. For example, the −40 kPa and −20 kPa curves exhibit sharp drops (it was observed at these moments individual SEFs were failing), followed by steep rises in force. On the other hand, the 0 kPa specimen had only meager gains in force once it experienced a drop. The third stage of fiber failure occurs when most of the individual SEFs have failed. At this point, the elastomer sleeve supports the majority of the load. It tended to fail in the gauge length, causing a final steep drop in force.

To evaluate the selected jamming fiber's behavior over a number of uses, two cyclic tensile tests were carried out at 60 mm/min displacement rates. Each cyclic test had max extension of 8 mm. In the first test, a fiber was jammed and subjected to 1000 cycles (FIG. 8B). This test simulated cases where a fiber would be jammed for a long duration to coerce a single actuator trajectory multiple times. Some hysteresis occurred until about 50 cycles. After 50 cycles, the rate of hysteresis decreased, and began to plateau around 900 cycles. By cycle 1000, the force sustained by the jamming fiber only dropped from 5.1 N to 3.6 N (29% relaxation)—a testament to the long lifetime of the jamming fiber.

In the second cyclic test, three fibers were intermittently unjammed and jammed for 100 cycles and the change in force at each iteration was tracked (FIG. 8C). This test mimicked real use cases for reconfigurable trajectories, where a given fiber might be jammed or unjammed, depending on the desired deformation. During the test, the maximum force at each cycle fluctuated, likely due to internal SEF shifting upon each unjam-jam cycle. In fact, the average force rises slightly over time. The rise is attributed to SEF re-alignment. As the sample is strained and subsequently released over and over, SEFs can "settle in" to favorable spots of overlap.

Additionally, tension tests were performed at 20 mm/min to quantify the effect of suddenly transitioning from a jammed state to an unjammed state, and vice-versa. The tests sought to replicate a robotic application where changes to actuator trajectory occur mid-inflation. Three trials on different specimens, corresponding to different jammed pressures, were conducted (FIG. 12A and FIG. 12B).

From these jamming transition tests, it was observed that the extent of pre-strain does not significantly influence the resultant force experienced by the fiber. In fact, there is less than 5% difference in maximum force sustained by any of the pressure cases between a and b. However, pre-strain does make the silicone material stiffer due to non-linearity of the elastomeric material and explains the slightly higher final force in the case with pre-strain (FIG. 12A). As the pre-strain strain approaches the overlap percent of the SEFs, it is suspected that the peak force would be very different (i.e., the overlap regions will have decreased in area, yet the SEFs will be much stiffer due to non-linearity).

Lastly, 3-point bending tests were conducted on tensile jamming fibers to assess the change in bending modulus between the jammed and unjammed states. Three specimens were tested in both jammed and unjammed states, and at 0 and 90-degree rotations, recording force and displacement (Instron 3345 fitted with a 10 N load cell). The supports on the two ends are separated by 4 cm. Displacement was applied in a quasi-static regime at 40 mm/min. Each specimen was subjected to −80 kPa when jammed. A linear fit of the force displacement curves indicates that bending stiffness (slope of a fitted line) increases by approximately 2-fold when jammed compared to unjammed (FIG. 8C and FIG. 8D). Furthermore, the slope and max forces seen for both rotations are within 5% of one another, attesting to the isotropy of the fiber in bending. Even though there is a 2-fold stiffness increase from the unjammed to jammed state, the magnitude of the forces is still very small relative to the bending force exerted by soft robotic actuators. The benefit conferred by this low bending stiffness, namely negligible influence on system deformation when unjammed, are exemplified through demonstrations described herein.

Minimal Model of Jamming Behavior

To understand the relationship between key design parameters and the jammed stiffness of the fibers, a minimal mechanical model was constructed. The purpose of the model is twofold. First, it is not tractable to manufacture tensile jamming fiber specimens to test all possible combinations of parameters in the design space, so an analytical model helps depict the general trend of stiffness change when different parameters are tuned. Second, the model can be used to estimate a suitable range of stiffnesses for a jamming fiber to accomplish a set of tasks, effectively providing a lightweight design tool.

Before the derivation, some preliminaries are stated. The individual segmented elastic fibril (SEF) is referred to simply as "fibril" for the rest of this section. The model only considers two fibrils and their shared interface for simplicity of analysis, but at the end of this section, it is proposed how the model could be generalized to include more fibrils. It is assumed that tensile forces are all in-line, due to the fact that the length of the fibril is much greater than its width or height. Polyester and silicone are the two materials in the fibril. Since the Young's modulus of polyester is much larger than that of silicone, it is further assumed for polyester to be inextensible.

In the unjammed state, it is assumed there is no contact between fibrils. Since polyester is treated as inextensible, the jamming fiber's stiffness in the tensile direction is a function of only the stiffness of silicone segments in each fibril ($k_s$) as well as in the surrounding membrane ($k_m$). In the jammed state, the fibrils are compressed together by uniform external pressure ($\Delta P$). Thin interfaces form between overlaps of polyester-polyester, polyester-silicone, and polyester-membrane segments; shearing of these interfaces, when pulled, contributes additional stiffness terms ($k_{pp}$, $k_{ps}$, and $k_{pm}$, respectively). See the schematic in FIG. 9A through FIG. 9C for a visual reference to quantities in the following derivation.

These various stiffness terms are defined using material properties and dimensions of fibrils. The tensile stiffness of a single fibril (ks) is modeled as linear:

$$k_s = \frac{EA_c}{L_{silicone}} = \frac{EA_c}{L(1-\gamma)} \qquad \text{(Eq. 3)}$$

where E is the Young's modulus of silicone, L is the total length of the fibril, Ac is the cross-section area of that fibril ($A_c = d2$, assuming square shaped cross-section), and $\gamma$ is the loading factor (length percentage of the fibril that is polyester). The tensile stiffness of a membrane ($k_m$) is likewise modeled as linear:

$$k_m = \frac{EA_m}{L} \qquad \text{(Eq. 4)}$$

where $A_m$ is the cross-sectional area of the silicone membrane.

The shear interfaces are modeled as Bingham plastics—a nonlinear spring that is linear with displacement until reaching a maximum constant force. The nonlinear behavior arises due to slip, which will be discussed later. Before slip, the slope of the linear region of these springs is simply the shear stiffness of the thin silicone interfaces: $k_{pp}$, $k_{ps}$ and $k_{pm}$.

The pre-slip shear stiffness of the polyester-polyester interface reads as:

$$k_{pp} = \alpha \frac{GA_{pp}}{2t} \qquad \text{(Eq. 5)}$$

where $\alpha$ is the effective contact ratio (a fitting parameter to account for imperfect contact), G is the shear modulus of silicone $$\left( G = \frac{E}{2(1+v)} \right)$$

where v is the Poisson ratio), $A_{pp}$ is the area of shear between polyester and polyester ($A_{pp} = L_{pp}d$), and t is the thickness of the silicone under shear on one fibril. This thickness is a function of the applied pressure, since pressure will squeeze and flatten the silicone. Thickness is also represented with a linear elastic model:

$$t(\Delta P) = t_0 - t_0 \frac{\Delta P}{E} \qquad \text{(Eq. 6)}$$

where $t_0$ is the initial thickness of the silicone interface. The shear stiffness of the polyester-silicone interface can be written as:

$$k_{ps} = \alpha \frac{GeA_{ps}}{t} \qquad \text{(Eq. 7)}$$

where $A_{ps}$ is the area between polyester and silicone spring ($A_{ps} = L_{ps}d$), t is the same as in Eq. 6, and e is a parameter to account for the fact that not all the area between polyester and the silicone spring is under shear ($e \leq 1$). Lastly, the shear stiffness of the polyester-membrane interface is defined as:

$$k_{pm} = \alpha \frac{GA_{pm}}{t} \qquad \text{(Eq. 8)}$$

where $A_{pm}$ is the area of shear between polyester and silicone membrane ($A_{pm} = L_{pm}d$).

Collections of fibrils within the jamming fiber were modeled as springs in parallel, together with the external membrane. For the system of fibrils in the unjammed state, the only stiffness contributions are $k_s$ and $k_m$. Thus, the unjammed stiffness of the system is:

$$k_u = Nk_s + k_m \qquad \text{(Eq. 9)}$$

where N is the number of fibrils in the fiber. Note that neither the membrane dimensions nor its material composition are varied in the present study, so $k_m$ is a constant.

In the jammed state, stiffness arising from all the interfaces as well as from the silicone spring and membrane are considered (see FIG. 9C, right). The total stiffness can be calculated through a combination of serial and parallel springs. For a two-fibril system:

$$k_{j,N=2} = \frac{\begin{array}{c} 2k_{pm}(k_s+k_{ps})^2 + 2k_{pm}(k_s+k_{ps})k_{pp} + \\ 2k_{pm}^2(k_s+k_{ps}) + k_{pm}^2 k_{pp} + (k_s+k_{ps})^2 k_{pp} \end{array}}{\begin{array}{c} 2k_{pm}(k_s+k_{ps}) + 2k_{pm}k_{pp} + k_{pm}^2 + \\ (k_s+k_{ps})^2 + 2(k_s+k_{ps})k_{pp} \end{array}} + k_m \qquad \text{(Eq. 10)}$$

This long expression can be simplified based on the observation that $k_{pm}$ and $k_{pp}$ are much larger quantities than $k_s$ and $k_{ps}$ (for example, for one sample, $k_s = 2:28$ and $k_{ps} = 115:26$, while $k_{pp}$ and $k_{pm}$ are over 1000.) By eliminating terms with $k_s$ and $k_{ps}$ from Eq. 10:

$$k_{j,N=2} = \frac{k_{pm}^2 k_{pp}}{2k_{pm} + k_{pm}^2} + k_m \qquad \text{(Eq. 11)}$$

To generalize to jamming fibers with N>2, it is observed that, under single stacking, each additional fibril increases the total number of polyester-polyester interfaces by one. Since these interfaces are in parallel, the $k_{pp}$ term can simply be multiplied by the number of interfaces, z=N−1.

$$k_j = \frac{k_{pm}^2 z k_{pp}}{2k_{pm}z k_{pp} + k_{pm}^2} + k_m \qquad \text{(Eq. 12)}$$

The expression can further be simplified by observing that $k_{pm}$ and $k_{pp}$ are approximately equal, as they are both shear stiffnesses of thin silicone: $k_{pm} \approx k_{pp} \approx k_{shear}$. Eq. 12 thus simplifies to:

$$k_j = \frac{zk_{shear}^3}{2zk_{shear}^2 + k_{shear}^2} = \frac{zk_{shear}^3}{(2z+1)k_{shear}^2} = \frac{z}{2z+1}k_{shear} \qquad \text{(Eq. 13)}$$

Plugging in some numbers for n and p into the expression above elucidates a general trend:

$$k_j|_{N=2,z=1} = \frac{1}{3}k_{shear} \qquad \text{(Eq. 14)}$$

$$k_j|_{N=3,z=2} = \frac{2}{5}k_{shear} \qquad \text{(Eq. 15)}$$

$$k_j|_{N=\infty,z=\infty} = \frac{1}{2}k_{shear} \qquad \text{(Eq. 16)}$$

Namely, the model predicts higher stiffness with increased number of fibrils, which the experiments confirmed.

So far, stiffness of the jammed fiber has been considered before slip. Slip happens when the shear force in the interface exceeds the maximum static friction that can be sustained by the silicone interface between polyester threads in adjacent fibrils. The maximum force is defined as:

$$F_f^{max}(\Delta P) = \mu \Delta P A_{pp} \qquad \text{(Eq. 17)}$$

where $\mu$ is the coefficient of static friction. After slip, the $k_{pp}$ term vanishes in Eq. 10. The stiffness reduces to:

$$k_{j,post-slip} = \frac{2k_{pm}(k_s + k_{ps})}{2(k_s + k_{ps}) + k_{pm}} + k_m \qquad \text{(Eq. 18)}$$

In FIG. 21, all the parameters in the minimal jamming model are presented along with their values used in generating the analytical predictions (dashed lines) in FIG. 8A (tensile force versus displacement for 70% N8 samples). Three fitting parameters were used: $\alpha$, e, and $\mu$. The values of the fitting parameters were determined via subjective perception of similarity between data and model.

The root-mean-square deviation of the model prediction from the experimental results in FIG. 8A is 0.0296 N, 0.1331 N, 0.2346 N, and 0.2962 N, for the four pressure inputs (from 0 kPa to −40 kPa), respectively.

Overall, the presented minimal analytical model predicts a larger stiffness for higher number of fibrils, higher pressure, as well as a higher polyester content (higher tensile stiffness for fibrils), which were also observed in the experimental results (FIG. 20A and FIG. 20B). For example, in the experimental results, increasing from N=4 to N=10 at P=40 kPa and =60% elevated the jammed stiffness by 420%. With N=8 at P=40 kPa, increasing from 60% to 70% increased the stiffness by 52%.

Minimal Model of Cylindrical Jamming Fiber-Reinforced Actuators

Here, the equilibrium center line $\mathcal{D} \in \mathbb{R}^3$ is attained by cylindrical thin-walled inflating elastomeric actuators radially outfitted in jamming fibers. Selected are a number of segments i=1 . . . n, an input pressure P for each segment, the number of SEFs on each segment j=1 . . . q, radial locations of jammed fibers for each segment $\theta_{ij}$, and initial undeformed geometry (i.e. radius, R, wall thickness, T, length L).

Consider radially-constrained cylindrical pneumatic actuators outfitted in jamming fibers along their length such that input pressure P elicits only longitudinal stretch M, curvature $\kappa$, if applicable, and negligible radial stretch $\lambda 2$. It is assumed that k appears only in the kinematics, and therefore not as a coupled energetic contribution with stretching. The actuators have small thickness relative to their radii (i.e., R>10T).

To predict the deformation of an inflating actuator, a hyperelastic constitutive model is first derived mapping P to $\lambda_1$. For the inflating actuator, $B=FF^T$ is the left Cauchy-Green deformation tensor and F is the deformation gradient. Assuming the elastomeric material which it is made from is incompressible gives $$\det(F) = \lambda_1\lambda_2\lambda_3 = 1 \rightarrow \lambda_3 = \frac{1}{\lambda_1\lambda_2}.$$

The N-term strain energy density of a deformed elastomer is:

$$W = \sum_{p=1}^{N} \frac{\mu_p}{\alpha_p}\left(\lambda_1^{\alpha_p} + \lambda_2^{\alpha_p} + \lambda_3^{\alpha_p} - 3\right) \qquad \text{(Eq. 19)}$$

Here, $\mu_p$ and $\alpha_p$ are fitting constants. Evoking the assumption of incompressibility:

$$W = \sum_{p=1}^{N} \frac{\mu_p}{\alpha_p}\left(\lambda_1^{\alpha_p} + \lambda_2^{\alpha_p} + \frac{1}{\lambda_1^{\alpha_p}\lambda_2^{\alpha_p}} - 3\right) \qquad \text{(Eq. 20)}$$

The Cauchy stress tensor may be found from W by the following:

$$\sigma_{ij} = -\overline{p}\delta_{ij} + F_{jk}\frac{\partial W}{\partial F_{jk}} \qquad \text{(Eq. 21)}$$

where $\overline{p}$ is an undetermined hydrostatic pressure to be found using the boundary conditions, and $\delta_{ij}$ is the Kronecker delta. Pure homogeneous deformation is considered to be associated with uniaxial tension which makes F diagonal. Thus, the expression for Cauchy stress simplifies to:

$$\sigma_i = \overline{p} + \lambda_i\frac{\partial W}{\partial \lambda_i} \qquad \text{(Eq. 22)}$$

By substituting W into the expression above:

$$\sigma_i = \sum_{p=1}^{N} \mu_p\lambda_i^{\alpha_p} - \overline{p} \qquad \text{(Eq. 23)}$$

For uniaxial tension, $\sigma_2$ and $\sigma_3$=0, so:

$$\sigma_1 = \sum_{p=1}^{N} \mu_p\lambda_1^{\alpha_p} - \overline{p} \qquad \text{(Eq. 24)}$$

From the boundary conditions given above, the unknown hydrostatic pressure can be solved as:

$$\bar{p} = \sum_{p=1}^{N} \mu_p \lambda_1^{-\frac{\alpha_p}{2}} \qquad \text{(Eq. 25)}$$

Finally, plugging $\bar{p}$ to the expression for $\sigma_1$ gives:

$$\sigma_1 = \sum_{p=1}^{N} \mu_p \left( \lambda_1^{\alpha_p} - \lambda_1^{-\frac{\alpha_p}{2}} \right) \qquad \text{(Eq. 26)}$$

Modeling the cylinder as a thin-walled pressure vessel, by Laplace's law:

$$\sigma_1 = \frac{Pr}{2t} \qquad \text{(Eq. 27)}$$

Note, the capital variables R; T specify the undeformed configuration, while r; t denote the deformed configuration of the actuator. Yet r=R due to the radially constraining fibers. Since volume is conserved in the incompressible material, $$t = \frac{T}{\lambda_1}.$$

Plugging in Eq. 26 to Eq. 25 and re-arranging gives:

$$P = \frac{2T}{R} \sum_{p=1}^{N} \mu_p \left( \lambda_1^{\alpha_p - 1} - \lambda_1^{-\frac{\alpha_p}{2} - 1} \right) \qquad \text{(Eq. 28)}$$

Inflating in a quasi-static regime, Eq. 27 was able to be fit for N=2 to experimental data of P versus $\lambda_1$ via a least-squares method in MATLAB. The adjusted $R^2$ value for the fit was 0.984. The two-term Ogden model parameters are tabulated as follows: $\alpha_1$=1.915; $\alpha_2$=3.019; $\mu_1$=3.842; $\mu_2$=−0.3533. Utilizing Eq. 27, a given input P may be mapped to $\lambda_1$. Assuming that jamming fibers, when jammed, are completely inextensible, induced bending of the actuator is assumed to be of a constant $\kappa$. $\theta_{i,j}$ of the jamming fibers determines $\phi_1$, the direction of curvature, of the $i^{th}$ segment. Three distinct cases are considered for the direction of curvature based on empirical observations: 1) If only one fiber is jammed, curvature is assumed to occur circumferentially aligned with the jammed fiber; 2) if multiple but not all fibers are jammed, curvature is assumed to occur as the geometric midpoint about the circumference of the actuator between jammed fibers (for example, if there are jamming fibers on segment 1 at two locations $\theta_{1,1}=\pi/2$ and $\theta_{1,2}=\pi$, bending occurs at the angle $\phi_1=3\pi/4$); 3) if jammed fibers are directly opposite one another or all fibers are jammed, then no extension will occur. To find the value of $\kappa$, $\lambda_1$ is used, by projecting onto the plane of curvature and evoking the relation:

$$\kappa = \frac{\lambda_1 - 1}{r(\lambda_1 + 1)} \qquad \text{(Eq. 29)}$$

To account for n cylindrical segments placed in series to form continuum manipulators, the P to $\lambda_1$ relationship is applied to each individually. Relative positions of segments are accounted for via homogeneous transformation matrices.

Construction of possible D for arbitrary design parameters is thus achieved. Quantitatively, the analytical model tended to under-predict the extent of deformation in actual systems, suggesting that it is a conservative estimate of the actuator's capabilities. However, it captures deformations within a reasonable margin of error (FIG. 13C). The governing physics of the cylindrical actuator outfitted in jamming fibers can thus be encapsulated with the assumptions made in this minimal model.

The minimal analytical model allows for simple prediction of how changing the relative radii of the actuator to jamming fiber would influence deformation. By Eq. 27, for a fixed input pressure, decreasing R will consequently decrease $\sigma$. The decrease in $\sigma$ will correspond to a decrease in axial stretch ($\lambda_1$) given by a nonlinear relationship defined by the two-term Ogden hyper elastic model. The decrease in $\lambda_1$ correspondingly reduces the curvature defined in Eq. 29. In FIG. 15, $\kappa$ is shown to change as a function of $\lambda_1$, for a variety of fixed R.

Minimal Model of Jamming Membranes

Here, possible shapes that can be elicited by inflating a planar, membrane-like surface with jamming fibers on either side are considered. An approximate model of the system gives insight into the rapid, localized shape change that can be demonstrated. The membrane is approximated as a bilayer system with each layer having equal thickness. Findings from non-Euclidian plates are leveraged, as well as incompatible elasticity theory (Efrati E et al., Physical Review E. 2009 Jul. 10; 80 (1): 016602; Efrati E et al., Journal of the Mechanics and Physics of Solids. 2009 Apr. 1; 57 (4): 762-75), the 3D problem is treated in a dimensionally-reduced fashion. Namely, the membrane is modeled as a 2D mid-plane surface. In differential geometry, 2D surfaces may be fully characterized by two tensors: a metric tensor, (the first fundamental form) a, which contains all information about lateral distances between points, and a curvature tensor, b, (the second fundamental form) which contains information about the local curvatures (Struik D J. Lectures on classical differential geometry. Courier Corporation; 1961). An elastic sheet is characterized by two additional tensors: a natural metric $\bar{a}$, and the natural curvature $\bar{b}$. These tensors represent the lateral distances and curvatures that would make the sheet locally stress-free (Klein Y et al., Science. 2007 Feb. 23; 315 (5815): 1116-20).

The constrained membrane system, when inflated, is hypothesized to deform so as to minimize the sum of its elastic bending and stretching energies. The total elastic energy of an incompatible non-Euclidean plate is given by (Klein Y et al., Science. 2007 Feb. 23; 315 (5815): 1116-20):

$$U_{total} = \int \left[ (1 - v) tr\left( (a - \bar{a})^2 \right) + v tr^2 (a - \bar{a}) \right] \sqrt{|\bar{a}|} \, dA + \qquad \text{(Eq. 30)}$$
$$\frac{h^2}{3} \int \left[ (1 - v) tr\left( (b - \bar{b})^2 \right) + v tr^2 (b - \bar{b}) \right] \sqrt{|\bar{a}|} \, dA$$

Here, v is the Poisson ratio (assumed at 0.5), and h is the thickness of the bilayer system. The first addend of the energy term corresponds to stretching energy and the second to bending energy. Expressions for the natural metric and curvature tensors read as:

$$\bar{a} = \begin{bmatrix} \Lambda_{0,1}^2 & 0 \\ 0 & \Lambda_{0,2}^2 \end{bmatrix}, \quad \bar{b} = \begin{bmatrix} k_{0,1} & 0 \\ 0 & k_{0,2} \end{bmatrix} \qquad \text{(Eq. 31)}$$

Here, $\Lambda_{0,i}$ and $k_{0,i}$ are mid-plane stretch and curvature of a fictional 1D bilayer beam cut from the 2D bilayer surface in principal direction i. A 1D beam cut from the surface can satisfy the deformation behaviors of individual layers of the bilayer when adhered together, while the 2D system cannot, since it is incompatible. Mid-plane stretch and curvature of the fictional beam can be computed analytically as (Timoshenko S, Analysis of bi-metal thermostats. Josa. 1925 Sep. 1; 11 (3): 233-55):

$$\Lambda_0 = \frac{\left(\lambda_{tb}\left(\lambda_{tb} + mn\left(3 + \lambda_{tb} + m\left(3 + m + m^2n + 3(1+m)\lambda_{tb}\right)\right)\right)\right)}{\left(m^4n^2 + 2m(2 + m(3+2m))n\lambda_{tb} + \lambda_{tb}^2\right)} \quad \text{(Eq. 32)}$$

$$k_0 = \frac{\left(6(\lambda_{tb}-1)m(1+m)^2 n\left(m^4n^2 + 2m(2+m(3+2m))n\lambda_{tb} + \lambda_{tb}^2\right)\right)}{\left(-h\lambda_{tb}\left(\lambda_{tb} + mn\left(3 + \lambda_{tb} + m\left(3 + m + m^2n + 3(1+m)\lambda_{tb}\right)\right)\right)^2\right)} \quad \text{(Eq. 33)}$$

where $\lambda_{tb}$ is the stretch of the top layer relative to the bottom layer in a given principal direction, n is the ratio of moduli of top to bottom layer, and m is the ratio of thickness of top to bottom layer. In this case, m and n=1 since the layers are made of the same material and have the same thicknesses.

The exact orientation of the jamming fibers on either side of the membrane surface will govern the way it deforms when inflated, and result in different equilibrium surfaces. It is assumed that any fibers placed on the membrane act as a homogeneous composite and that the strain gradient across the surface is zero. Three distinct cases of fiber orientation are considered: 1) One side with $90°+0°$ and the other with $0°$ or $90°$ will elicit a cylindrical shape; 2) One side with $90°+0°$ and the other unconstrained (isotropic growth) will elicit a hemispherical cap shape at lower stretch; 3) Sides with orthogonal activated jamming fibers will exhibit a saddle-like shape.

For case 1, bending is only along one axis, resulting in zero Gaussian curvature. Natural tensors $\bar{a}$ and $\bar{b}$ will have only one non-zero diagonal entry each. The problem is thus reduced further to a one-dimensional case in the principal direction of interest, analogous to the classical bimetallic thermostat of Timoshenko (Timoshenko S, Analysis of bi-metal thermostats. Josa. 1925 Sep. 1; 11 (3): 233-55). Due to reduction to a 1D beam, relations Eq. 31 and Eq. 32 may be used to compute the resulting midsurface shape.

Cases 2 and 3 are a bit more complicated, since both stretching and bending energy terms compete to inform the equilibrium shape. For case 2, following the example presented in work by Pezzulla et al. (Soft matter. 2016; 12 (19): 4435-42), the total energy can be minimized, consisting of the sum of stretching and bending energies given by Eq. 29. Note that before the bifurcation regime exhibited by spherical caps wherein bending becomes energetically favorable over stretching, the natural metric does not diverge much from the metric (Pezzulla M et al., Soft matter. 2016; 12 (19): 4435-42). Thus it can be assumed that a=ā. Natural tensor $\bar{b}$ will have two equal non-zero diagonal entries. Generic entries of the second fundamental form read as:

$$b = \begin{bmatrix} L & M \\ M & N \end{bmatrix} \quad \text{(Eq. 34)}$$

and note that M=0; L=N due to the emergence of symmetric, hemispherical cap. Minimization of the energy in Eq. 29 with respect to L gives analytic relation that can be solved for a single value of $\hat{L}$ as a function of the non-dimensionalized natural curvature $\hat{k}_0$:

$$\hat{L} + \gamma^4\left(\hat{L} - \hat{k}_0\right) = 0 \quad \text{(Eq. 35)}$$

where the hats indicate non-dimensionalization of the term by $1/h$ and $\gamma$ is a dimensionless, shape-dependent parameter (Pezzulla M et al., Soft matter. 2016; 12 (19): 4435-42).

Case 3 is tackled by similar energetic arguments as case 2. Natural tensors $\bar{a}$ and $\bar{b}$ will have only two non-zero diagonal entries of equal magnitudes, while the natural curvature tensor has entries with opposite-signed values. Fundamental forms of an energetically equivalent monolayer for case 3 are presented eloquently as (van Rees W M et al., Proceedings of the National Academy of Sciences. 2017 Oct. 31; 114 (44): 11597-602):

$$a = \frac{1+\lambda^2}{2}\begin{bmatrix} 1 & 0 \\ 0 & 1 \end{bmatrix}, b = \frac{3(\lambda-1)(\lambda+1)}{4h}\begin{bmatrix} -1 & 0 \\ 0 & 1 \end{bmatrix} \quad \text{(Eq. 36)}$$

here, $\lambda$ is the midplane stretch of the bilayer system.

Using the first and second fundamental forms, the principal curvatures of a surface can be found by solving (Struik D J. Lectures on classical differential geometry. Courier Corporation; 1961):

$$\det(b - k_i a) = 0, i = 1, 2 \quad \text{(Eq. 37)}$$

The Gaussian curvature and mean curvature are then, respectively:

$$K = k_1 k_2, H = \frac{1}{2}(k_1 + k_2) \quad \text{(Eq. 38)}$$

Since homogeneous fiber distribution is assumed in a given principal direction, local buckling of material between each fiber and thereby much of the topographical nuance of the physical systems are not captured. Furthermore, this simplified model does not account for variations in in-plane strain across the surface. Despite the mechanical simplifications, qualitatively, predictions from this minimal model of jamming-fiber clad membrane midplanes matches the corresponding experiments (FIG. 17A through FIG. 17C). Qualitative agreement suggests some of the governing mechanics at play have been identified in the actual system.

Finite Element Analysis (FEA) Simulations

To validate the experiments with a higher degree of fidelity than analytical methods, finite element analysis (FEA) simulations were performed in a commercial software package (ABAQUS). Nonlinear quasi-static analyses considering gravity were performed.

The cylindrical actuators of FIG. 13A through FIG. 13C and FIG. 16A through FIG. 16C were modeled as elastomeric chambers wound with radially constraining polyester fibers and axially-constraining jamming fibers. The dimensions of the individual cylindrical actuator units matched those of the experiment, with inner radius 11.3 mm, outer radius 12.5 mm, and length 120 mm. One end of the actuator is completely fixed, and a pressure load of 10 kPa, matching experimental conditions, is applied to the actuator's inner surface. The elastomeric chamber of each was modeled as an incompressible Mooney-Rivlin ($C_{01}$=0.0104 Mpa, $C_{10}$=0.0214 Mpa for Elastosil 50 (Lee J K et al., 2012 IEEE 62nd Electronic Components and Technology Conference 2012 May 29 (pp. 86-91))) hyperelastic material and implemented as 10-node quadratic tetrahedron elements, with hybrid formulation (C3D10H). The radially constraining fibers (E=31:1 GPa, v=0:36) and axially oriented jamming fibers were modeled as linear elastic materials and implemented as 2-node linear beam elements with a hybrid formulation (B31H). The stiffness values used for fully jammed, partially jammed, and unjammed fibers were computed from tensile tests, and are tabulated in FIG. 19.

Nonlinear quasi-static analysis was performed in ABAQUS/Explicit to simulate the shape deformation of the circular membrane of FIG. 17A through FIG. 17C. For these simulations, a pressure load of 10 kPa was applied radially to the membrane's inner surface. The shape-changing membrane was modeled as an enclosed circular shell. Jamming fibers were approximated as shell patches atop the circular membrane. The jamming patches were constrained to the surface of the circular membrane using a *TIE constraint. The membrane was modeled as an incompressible Mooney-Rivlin hyperelastic material, and jamming patches were modeled as a linear elastic material, analogous to the cylindrical actuator simulations. 4-node doubly curved shell elements (S4R) were used for circular membrane and jamming fibers. The jamming fibers' width was 5 mm, and the fibers were separated by a distance of 25 mm center-to-center.

The ability to actively tune stiffness is critical to devising next-generation robots that replicate the control and fluidity of biological organisms' motions and shape changes. In lieu of traditional approaches that rely on strain-limiters with immutable material properties, the present study introduces controllable tensile strain-limiters. Jamming fibers combine the desirable features from many different existing stiffness modulation techniques, such as state-of-the-art jamming and thermally activated variable stiffness materials. Jamming fibers exhibit dramatic tensile stiffness changes, rapid response times, minimal contribution to system bulk properties or weight, and highly isolated material changes. They stand in contrast to thermal stiffness-changing systems, where heat diffusion leads to undesired local interference, and stretchable layer jamming, where bending stiffness and tensile stiffness are coupled. At atmospheric pressure, the jamming fibers stretch with low tensile stiffness, having little influence on the trajectory of an actuator. When vacuum is applied, the jamming fibers' tensile stiffness increases by over 20× in less than a tenth of a second, imposing strong directional bias while retaining flexibility in bending.

Tensile jamming technology demonstrates far-reaching potential in soft robotics, enabling great improvements to the workspaces of single-chamber, volumetrically expanding soft actuators, without adding large volume or inducing high bending stiffness. With rapid response and an ability to influence actuator dynamics mid-inflation, such multi-modal actuators are more responsive in applications compared to thermally-activated strain-limiting components and safer for human-oriented applications than high voltage-activated clutches. This improvement in control of trajectories without undesired increases in volume is especially relevant for applications where the cross-sectional area of the actuator needs to be minimized, such as in endoscopic minimally invasive surgery. The radially-constrained single-chamber actuator, with small-footprint 1D elements (tensile jamming fibers), can potentially be made more slender than current multi-chamber actuators (Elsayed Y et al., Soft Robotics. 2014 Dec. 1; 1 (4): 255-62; Runciman M et al., Soft robotics. 2019 Aug. 1; 6 (4): 423-43) and avoid the large radial expansion needed for multi-chamber actuators to achieve bending.

In the surface (2-dimensional) cases, varying tensile stiffness (coupled with underlying inflation) allows control of Gaussian curvature. The result is the first demonstration of active transition between three types of Gaussian curvatures-on the order of seconds-within the same system. The ability of the tensile jamming fibers to increase tensile stiffness while maintaining a low bending stiffness enables a redistribution between bending energy and stretching energy for the thin surface, which facilitates dramatic shape change. Theoretically, with sufficient number of jamming fibers, an inflating 2D sheet can grow into any target surface (van Rees W M et al., Proceedings of the National Academy of Sciences. 2017 Oct. 31; 114 (44): 11597-602), and then change between such shapes. This demonstration paves the way for next-generation shapeshifting robots with ability to adapt to environmental demands and adopt shapes for dynamic camouflage.

Beyond the robotics space, jamming fibers are a useful technology in exosuit-assisted rehabilitation, where selective mobility is tantamount to patient recovery. Additional possible use cases include on-demand sizing for smart garments, and other applications where predictable, rapid, and localized tensile stiffness changes are desired.

Computing Environment

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 22:
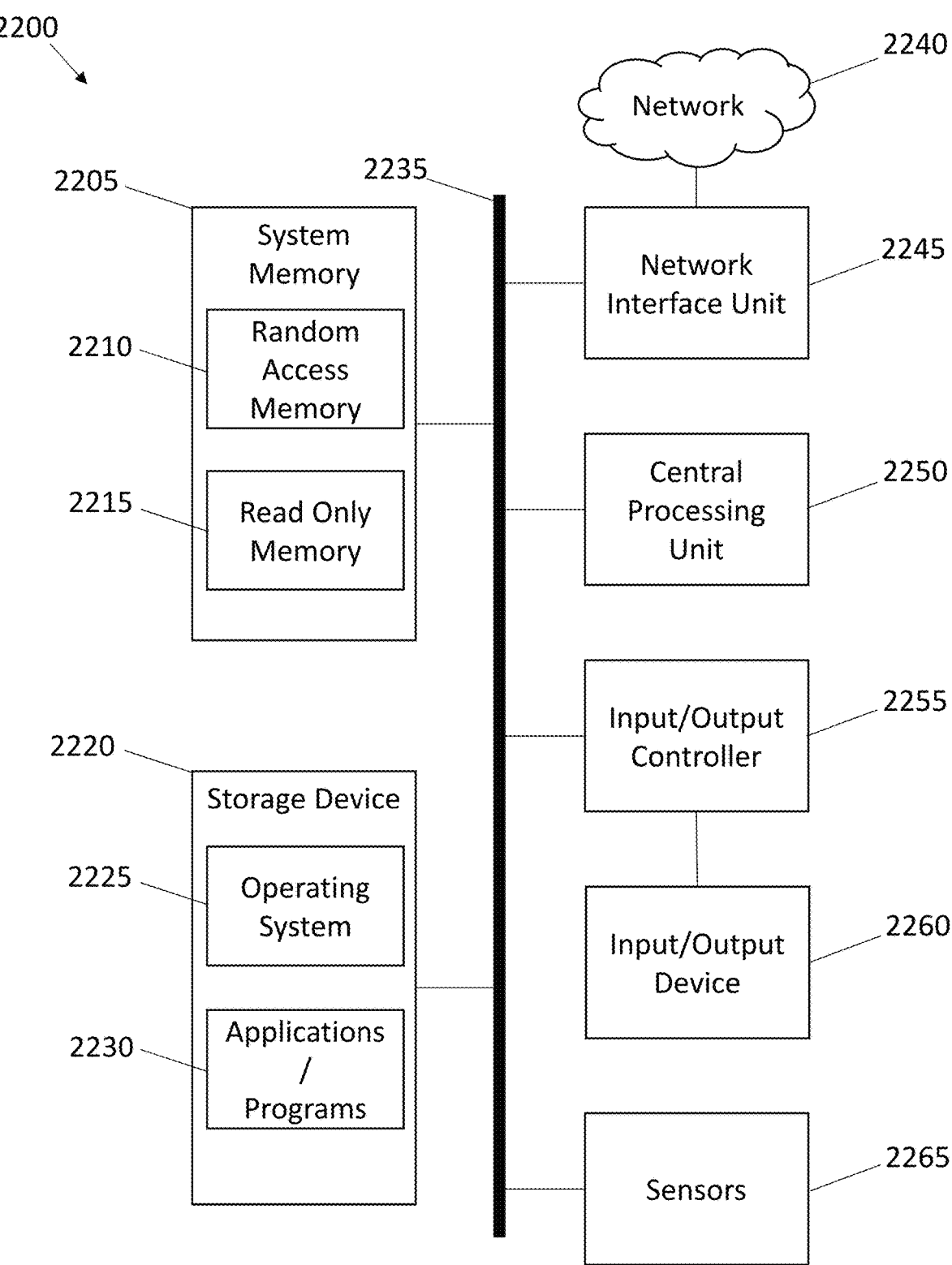
FIG. 22 depicts an exemplary computing environment in which aspects of the invention may be practiced in accordance with some embodiments.

FIG. 22 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 22 depicts an illustrative computer architecture for a computer 2200 for practicing the various embodiments of the invention. The computer architecture shown in FIG. 22 illustrates a conventional personal computer, including a central processing unit 2250 ("CPU"), a system memory 2205, including a random-access memory 2210 ("RAM") and a read-only memory ("ROM") 2215, and a system bus 2235 that couples the system memory 2205 to the CPU 2250. A basic input/output system containing the basic routines that help to transfer information between elements within the computer, such as during startup, is stored in the ROM 2215. The computer 2200 further includes a storage device 2220 for storing an operating system 2225, application/program 2230, and data.

The storage device 2220 is connected to the CPU 2250 through a storage controller (not shown) connected to the bus 2235. The storage device 2220 and its associated computer-readable media, provide non-volatile storage for the computer 2200. Although the description of computer-readable media contained herein refers to a storage device, such as a hard disk or CD-ROM drive, it should be appreciated by those skilled in the art that computer-readable media can be any available media that can be accessed by the computer 2200.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 2200 may operate in a networked environment using logical connections to remote computers through a network 2240, such as TCP/IP network such as the Internet or an intranet. The computer 2200 may connect to the network 2240 through a network interface unit 2245 connected to the bus 2235. It should be appreciated that the network interface unit 2245 may also be utilized to connect to other types of networks and remote computer systems.

The computer 2200 may also include an input/output controller 2255 for receiving and processing input from a number of input/output devices 2260, including a keyboard, a mouse, a touchscreen, a camera, a microphone, a controller, a joystick, or other type of input device. Similarly, the input/output controller 2255 may provide output to a display screen, a printer, a speaker, or other type of output device. The computer 2200 can connect to the input/output device 2260 via a wired connection including, but not limited to, fiber optic, ethernet, or copper wire or wireless means including, but not limited to, Bluetooth, Near-Field Communication (NFC), infrared, or other suitable wired or wireless connections.

As mentioned briefly above, a number of program modules and data files may be stored in the storage device 2220 and RAM 2210 of the computer 2200, including an operating system 2225 suitable for controlling the operation of a networked computer. The storage device 2220 and RAM 2210 may also store one or more applications/programs 2230. In particular, the storage device 2220 and RAM 2210 may store an application/program 2230 for providing a variety of functionalities to a user. For instance, the application/program 2230 may comprise many types of programs such as a word processing application, a spreadsheet application, a desktop publishing application, a database application, a gaming application, internet browsing application, electronic mail application, messaging application, and the like. According to an embodiment of the present invention, the application/program 2230 comprises a multiple functionality software application for providing word processing functionality, slide presentation functionality, spreadsheet functionality, database functionality and the like.

The computer 2200 in some embodiments can include a variety of sensors 2265 for monitoring the environment surrounding and the environment internal to the computer 2200. These sensors 2265 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A tensile jamming fiber, comprising:
a length extending between a first end and a second end;
at least a first and a second segmented elastic fibril, each extending between the first end and the second end and each comprising alternating segments of an elastic material and an inextensible material; and an elastic membrane enclosing the first and second segmented elastic fibrils in an interior space and forming an airtight and watertight housing;

wherein the first and second segmented elastic fibrils are fused to the elastic membrane at the first end and the second end, and wherein segments of inextensible material in the first segmented elastic fibril partially overlap segments of inextensible material in the second segmented elastic fibril.

2. The fiber of claim 1, wherein the interior space of the elastic membrane is configured to support a vacuum.

3. The fiber of claim 1, wherein the elastic membrane comprises one or more ports fluidly connected to the interior space.

4. The fiber of claim 1, wherein the fiber comprises an unjammed state wherein the interior space of the elastic membrane comprises a positive pressure.

5. The fiber of claim 4, wherein the fiber comprises a jammed state wherein the interior space of the elastic membrane comprises a negative pressure, such that each of the segmented elastic fibrils are compressed together by the elastic membrane.

6. The fiber of claim 5, wherein the fiber in the unjammed state comprises an elasticity configured to permit stretching the length of the fiber by 200% or more.

7. The fiber of claim 5, wherein the fiber in the jammed state comprises an elasticity configured to permit little to no stretching of the length of the fiber.

8. The fiber of claim 5, wherein the fiber in the unjammed state comprises a first tensile stiffness that is lesser than a second tensile stiffness of the fiber in the jammed state.

9. The fiber of claim 8, wherein the second tensile stiffness is about 20× greater or more than the first tensile stiffness.

10. The fiber of claim 5, wherein the fiber in the unjammed state comprises a first bending stiffness that is substantially the same as a second bending stiffness of the fiber in the jammed state.

11. The fiber of claim 5, wherein the fiber is configured to switch between the unjammed state and the jammed state within a tenth of a second.

12. The fiber of claim 1, wherein the elastic material and the elastic membrane each comprise a material selected from the group consisting of: silicone rubber, neoprene rubber, nitrile rubber, and latex rubber.

13. The fiber of claim 1, wherein the inextensible material comprises a material selected from the group consisting of: polyester, nylon, acrylic, cotton, and carbon fiber.

14. The fiber of claim 1, wherein each segmented elastic fibril comprises a percentage of inextensible material relative to elastic material that is between about 50% and about 90%.

15. A linear actuator device comprising a flexible cylindrical body and one or more fibers of claim 1 attached thereto.

16. A planar actuator device comprising a flexible planar body and one or more fibers of claim 1 attached thereto.

17. A method of fabricating a tensile jamming fiber, comprising the steps of:

providing rectangular sections of a first sheet of a first elastic material;

arranging the rectangular sections into at least two adjacent rows, wherein each row comprises regularly spaced rectangular sections having embedded segment lengths of an inextensible material in alignment, and adjacent rows are offset from each other such that rectangular sections of a first row at least partially overlap rectangular sections of a second row;

coating the arranged rectangular sections in a second elastic material to form a second sheet;

cutting the second sheet into fibers, wherein each fiber comprises a single row of regularly spaced embedded segment lengths of inextensible material in alignment;

bundling at least two fibers in an elastic membrane, wherein the single row of regularly spaced embedded segment lengths of inextensible material in each fiber is offset from each other; and sealing the elastic membrane with the at least two fibers at their respective opposing ends to form an airtight and watertight interior space in the elastic membrane.

18. The method of claim 17, wherein the step of providing rectangular sections of a first sheet of a first elastic material includes embedding lengths of an inextensible material in parallel in the sheet of the first elastic material.

19. The method of claim 18, further comprising cutting the first sheet of the first elastic material into rectangular sections such that the embedded lengths of inextensible material in each rectangular section are cut to a desired segment length.

20. The method of claim 17, wherein the inextensible material comprises a material selected from the group consisting of: polyester, nylon, acrylic, cotton, and carbon fiber, and wherein the first elastic material, second elastic material, and elastic membrane each comprise a material selected from the group consisting of: silicone rubber, neoprene rubber, nitrile rubber, and latex rubber.

21. A wearable clothing item, comprising:

a fabric material configured to cover at least a portion of a subject's body;

a plurality of tensile jamming fibers of claim 1;

a pressure source fluidly connected to the plurality of tensile jamming fibers; and a power source electrically connected to the pressure source.

22. The wearable clothing item of claim 21, wherein the fabric material covers at least one joint of the subject's body.

23. The wearable clothing item of claim 21, wherein the fabric material forms a glove configured to fit on the subject's hand.

24. The wearable clothing item of claim 21, further comprising a computing device comprising at least one processor, wherein the computing device is communicatively connected to the pressure source and is configured to control the jamming and unjamming of each tensile jamming fiber.

25. The wearable system of claim 24, wherein the computing device is communicatively connected to a virtual reality or augmented reality device.

* * * * *